(12) United States Patent
Rapoport et al.

(10) Patent No.: US 7,102,563 B2
(45) Date of Patent: Sep. 5, 2006

(54) METHODS AND APPARATUSES OF ESTIMATING THE POSITION OF A MOBILE USER IN A SYSTEM OF SATELLITE DIFFERENTIAL NAVIGATION

(75) Inventors: Lev Borisovich Rapoport, Moscow (RU); Ivan Barabanov, Moscow (RU); Alexander Khvalkov, Moscow (RU)

(73) Assignee: Topcon GPS LLC, Pleasanton, CA (US)

( * ) Notice: Subject to any disclaimer, the term of this patent is extended or adjusted under 35 U.S.C. 154(b) by 278 days.

(21) Appl. No.: 10/788,575

(22) Filed: Feb. 26, 2004

(65) Prior Publication Data

US 2005/0190103 A1    Sep. 1, 2005

(51) Int. Cl.
*G01S 5/14* (2006.01)

(52) U.S. Cl. .................................. 342/357.04
(58) Field of Classification Search ............ 342/357.04
See application file for complete search history.

(56) References Cited

U.S. PATENT DOCUMENTS

| | | | |
|---|---|---|---|
| 4,812,991 A | 3/1989 | Hatch | 701/225 |
| 5,451,964 A | 9/1995 | Babu | 342/357.06 |
| 5,502,641 A | 3/1996 | Isomura | 701/215 |
| 6,268,824 B1 * | 7/2001 | Zhodzishky et al. | 342/357.04 |
| 6,373,432 B1 * | 4/2002 | Rabinowitz et al. | 342/357.16 |
| 6,950,059 B1 * | 9/2005 | Rapoport et al. | 342/357.03 |
| 2005/0151683 A1 * | 7/2005 | Sharpe et al. | 342/357.04 |

OTHER PUBLICATIONS

Shu-xin, Chen et al, "A Rapid Algorithm for GPS Ambiguity Decorrelation" IEEE 5th Int'l Conf on Intelligent Transportation Systems, Sep. 2002, pp. 904-909.*

J. Wilkinson and C. Reinsch, *Linear Algebra, Handbook for Automatic Computation*, vol. 2, publisher: Springer-Verlag, New York, 1971, pp. 10-30.

"Methods for Modifying Matrix Factorizations" by P.E. Gill, G.H. Golub, W. Murray, and M.A. Saunders (Mathematics of Computation, vol. 28, No. 126, Apr. 1974, pp. 505-535).

Kendall E. Atkinson, *An Introduction to Numerical Analysis*, publisher: John Wiley & Sons, 1978, pp. 450-454.

(Continued)

*Primary Examiner*—Gregory C. Issing
(74) *Attorney, Agent, or Firm*—Sheppard Mullin Richter & Hampton LLP

(57) ABSTRACT

Disclosed are methods and apparatuses for estimating the floating ambiguities associated with the measurement of the carrier signals of a plurality of global positioning satellites, such that the floating ambiguities are preferably consist for a plurality of different time moments. In one aspect of the invention, a real-time iterative matrix refactorization process is provided which reduces processor load and retains history of the measurements.

51 Claims, 6 Drawing Sheets

OTHER PUBLICATIONS

Gene Golub and Charles Van Loan, *Matrix Computations*, publisher: The Johns Hopkins University Press, Baltimore, Maryland, pp. 81-86, 1983.

Bradford W. Parkinson, James J. Spilker, Jr., Global Positioning System: Theory and Applications; vol. 163, Progress in Astronautics and Aeronautics, Published by American Institute of Aeronautics and Astronautics, Inc., Copyright 1996, pp. 245-433.

Bradford W. Parkinson, James J. Spilker, Jr., Global Positioning System: Theory and Applications; vol. II; vol. 163, Progress in Astronautics and Aeronautics, Published by American Institute of Aeronautics and Astronautics, Inc., Copyright 1996, pp. 3-50 and 275-301.

Elliott Kaplan, Chapter 8 of "Understanding GPS: principles and applications," Artech House, 1996, pp. 321-383, ISBN 0-89006-793-7.

Janet Brown Neumann, et al., "Test Results from a New 2 cm Real Time Kinematic GPS Positioning System," Proceedings of the 9th International Technical Meeting of the Satellite Division of the Institute of Navigation ION GPS-96, Sep. 17, 1996, pp. 873-882.

Dr. Dariusz Lapucha, Richard A. Barker, "Dual Baseline Real-Time OTF Kinematics GPS," Proceedings of the 9th International Technical Meeting of the Satellite Division of the Institute of Navigation ION GPS-96, Sep. 17, 1996, pp. 883-888.

P.J.G. Teunissen, et al., "The Volume of the GPS Ambiguity Search Space and its Relevance for Integer Ambiguity Resolution," Proceedings of the 9th International Technical Meeting of the Satellite Division of the Institute of Navigation ION GPS-96, Sep. 17, 1996, pp. 889-898.

Davis Walsh, et al., "GPS and GLONASS Carrier Phase Ambiguity Resolution," Proceedings of the 9th International Technical Meeting of the Satellite Division of the Institute of Navigation ION GPS-96, Sep. 17, 1996, pp. 899-907.

Dmitry Kozlov et al., "Instant RTK cm with Low Cost GPS–Glonass C/A Receivers," Proceedings of the 10th International Technical Meeting of the Satellite Division of the Institute of Navigation ION GPS-97, Sep. 16, 1997, pp. 1559-1569.

* cited by examiner

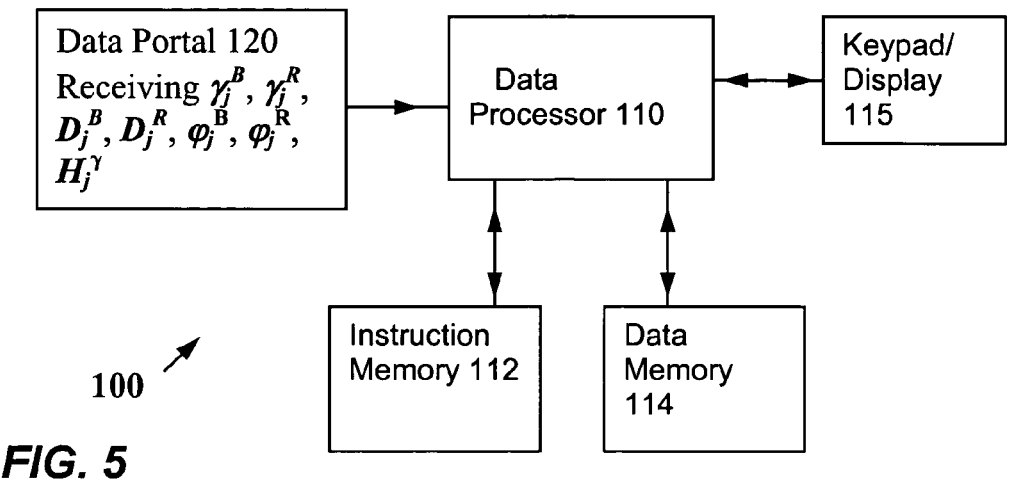

FIG. 5

Instruction Set #1 directs data processor 110 to receive the measured data from data portal 120.

Instruction Set #2 directs the data processor to generate, for each time moment $j$, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$, the set of range residuals being denoted as $\Delta\gamma_k$, $k=1,..,j$ Instruction Set #3 directs the data processor 110 to generate, for each time moment $j$, a vector $\Delta\varphi_j$ of a plurality of phase residuals of full phase measurements made by the first and second navigation receivers in the form of: $\Delta\varphi_j = (\varphi_j^R - \varphi_j^B) - \Lambda^{-1} \cdot (D_j^R - D_j^B)$, where $\Lambda^{-1}$ is a diagonal matrix comprising the inverse wavelengths of the satellites, the set of phase residuals being denoted as $\Delta\varphi_k$, $k=1,..,j$ Instruction Set #4 directs the data processor 110 to generate an LU-factorization of matrix M or a matrix inverse of matrix M, the matrix M being a function of at least $\Lambda^{-1}$ and $H_k^\gamma$, for index $k$ of $H_k^\gamma$ covering at least two of the time moments $j$ Instruction Set #5 directs the data processor 110 to generate a vector N of estimated floating ambiguities as a function of at least the set of range residuals $\Delta\gamma_k$, the set of phase residuals $\Delta\varphi_k$, and the LU-factorization of matrix M or the matrix inverse of matrix M

COMPUTER-READABLE MEDIUM

FIG. 6

| Instruction Set #1 directs data processor 110 to receive the measured data from data portal 120. |
|---|

| Instruction Set #2 directs the data processor to generate, for each time moment $j$, a vector $\Delta \gamma_j$ of a plurality of range residuals of pseudo-range measurements made by the first and second navigation receivers in the form of: $\Delta \gamma_j = (\gamma_j^R - \gamma_j^B) - (D_j^R - D_j^B)$, the set of range residuals being denoted as $\Delta \gamma_k$, $k=1, ..,j$ |

| Instruction Set #3 directs the data processor 110 to generate, for each time moment $j$, a vector $\Delta \varphi_j$ of a plurality of phase residuals of full phase measurements made by the first and second navigation receivers in the form of: $\Delta \varphi_j = (\varphi_j^R - \varphi_j^B) - \Lambda^{-1} \cdot (D_j^R - D_j^B)$, where $\Lambda^{-1}$ is a diagonal matrix comprising the inverse wavelengths of the satellites, the set of phase residuals being denoted as $\Delta \varphi_k$, $k=1, ..,j$ |

| Instruction Set #4 directs the data processor 110 to generate, for time moment $j = 1$, an LU-factorization of a matrix $M_1$ or a matrix inverse of matrix $M_1$, the matrix $M_1$ being a function of at least $\Lambda^{-1}$ and $H_j^\gamma$ |

| Instruction Set #5 directs the data processor 110 to generate, for time moment $j = 1$, a vector $N_1$ as a function of at least $\Delta \gamma_1$, $\Delta \varphi_1$, and the LU-factorization of matrix $M_1$ or the matrix inverse of matrix $M_1$ |

| Instruction Set #6 directs the data processor 110 to generate, for one or more additional time moments $j \neq 1$, an LU-factorization of a matrix $M_j$ or a matrix inverse of matrix $M_j$, the matrix $M_j$ being a function of at least $\Lambda^{-1}$ and $H_j^\gamma$ |

| Instruction Set #7 directs the data processor 110 to generate, for one or more additional time moments $j \neq 1$, a vector $N_j$ as a function of at least $\Delta \gamma_j$, $\Delta \varphi_j$, and the LU-factorization or matrix $M_j$ or the matrix inverse of matrix $M_j$ |

| Instruction Set #8 directs the data processor 110 to report vector $N_j$ as having estimates of the floating ambiguities, and to repeat Instruction Sets #6 and #7 if vector does not have sufficient (or desired) accuracy, or if it is desired to keep the process going even through sufficient accuracy has been reached. |

<u>COMPUTER-READABLE MEDIUM</u>

FIG. 8

METHODS AND APPARATUSES OF ESTIMATING THE POSITION OF A MOBILE USER IN A SYSTEM OF SATELLITE DIFFERENTIAL NAVIGATION

FIELD OF THE INVENTION

The present invention relates to methods of information processing in satellite navigation systems with differential positioning of a mobile user.

BACKGROUND OF THE INVENTION

Satellite navigation systems, such as GPS (USA) and GLONASS (Russia), are intended for high accuracy self-positioning of different users possessing special navigation receivers. A navigation receiver receives and processes radio signals broadcasted by satellites located within line-of-sight distance. The satellite signals comprise carrier signals that are modulated by pseudo-random binary codes, which are then used to measure the delay relative to local reference clock or oscillator. These measurements enable one to determine the so-called pseudo-ranges ($\gamma$) between the receiver and the satellites. The pseudo-ranges are different from true ranges (D, distances) between the receiver and the satellites due to variations in the time scales of the satellites and receiver and various noise sources. To produce these time scales, each satellite has its own on-board atomic clock, and the receiver has its own on-board clock, which usually comprises a quartz crystal. If the number of satellites is large enough (more than four), then the measured pseudo-ranges can be processed to determine the user location (e.g., X, Y, and Z coordinates) and to reconcile the variations in the time scales. Finding the user location by this process is often referred to as solving a navigational problem or task.

The necessity to guarantee the solution of navigational tasks with accuracy better than 10 meters, and the desire to raise the stability and reliability of measurements, have led to the development of the mode of "differential navigation ranging," also called "differential navigation" (DN). In the DN mode, the task of finding the user position is performed relative to a Base station (Base), the coordinates of which are known with the high accuracy and precision. The Base station has a navigation receiver that receives the signals of the satellites and processes them to generate measurements. The results of these measurements enable one to calculate corrections, which are then transmitted to the user that also uses a navigation receiver. By using these corrections, the user obtains the ability to compensate for the major part of the strongly correlated errors in the measured pseudo-ranges, and to substantially improve the accuracy of his or her positioning.

Usually, the Base station is immobile during measurements. The user may be either immobile or mobile. We will call such a user "the Rover." The location coordinates of a moving Rover are continuously changing, and should be referenced to a time scale.

Depending on the navigational tasks to be solved, different modes of operation may be used in the DN mode. They differ in the way in which the measurement results are transmitted from the Base to the Rover. In the Post-processing (PP) mode, these results are transmitted as digital recordings and go to the user after all the measurements have been finished. In the PP mode, the user reconstructs his or her location for definite time moments in the past.

Another mode is the Real-Time Processing (RTP) mode, and it provides for the positioning of the Rover receiver just during the measurements. The RTP mode uses a communication link (usually it is a radio communication link), through which all the necessary information is transmitted from the Base to the Rover receiver in digital form.

Further improvement of accuracy of differential navigation may be reached by supplementing the measurements of the pseudoranges with the measurements of the phases of the satellite carrier signals. If one measures the carrier phase of the signal received from a satellite in the Base receiver and compares it with the carrier phase of the same satellite measured in the Rover receiver, one can obtain measurement accuracy to within several percent of the carrier's wavelength, i.e., to within several centimeters.

The practical implementation of those advantages, which might be guaranteed by the measurement of the carrier phases, runs into the problem of there being ambiguities in the phase measurements.

The ambiguities are caused by two factors. First, the difference of distances $\Delta D$ from any satellite to the Base and Rover is much greater than the carrier's wavelength $\lambda$. Therefore, the difference in the phase delays of a carrier signal $\Delta\phi=\Delta D/\lambda$ received by the Base and Rover receivers exceeds several cycles. Second, it is not possible to measure the integer number of cycles in $\Delta\phi$ from the incoming satellite signals; one can only measure the fractional part of $\Delta\phi$. Therefore, it is necessary to determine the integer part of $\Delta\phi$, which is called the "ambiguity".

More precisely, we need to determine the set of all such integer parts for all the satellites being tracked, one integer part for each satellite. One has to determine this set along with other unknown values, which include the Rover's coordinates and the variations in the time scales.

In a general way, the task of generating highly-accurate navigation measurements is formulated as follows: one determines the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite that broadcasts a carrier in the $L_1$ frequency band and a carrier in the $L_2$ frequency band. If the receiver processes the carrier signals in both of the $L_1$ and $L_2$ bands, the number of satellite channels (n) increases correspondingly.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal, the latter of which may contain ambiguities. Each pseudo-range is obtained by measuring the time delay of a code modulation signal of the corresponding satellite. The code modulation signal is tracked by a delay-lock loop (DLL) circuit in each satellite-tracking channel. The full phase of a satellite's carrier signal is tracked by phase counter (as described below) with input from a phase-lock-loop (PLL) in the corresponding satellite tracking channel (an example of which is described below in greater detail). An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. In the latter case, conventional statistical methods are used to solve the system: the least-squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor. The present invention is directed to novel methods and apparatuses for accelerating the obtaining of reliable estimates for the integer ambiguities at an acceptable processor load.

More particularly, the present invention is directed to novel methods and apparatuses for more quickly obtaining such estimates in floating-point form (non-integer form) which are close to the integer values. With these floating-point forms, which we call floating ambiguities, conventional methods may be used to derive the corresponding integer ambiguities.

BRIEF DESCRIPTION OF THE DRAWINGS

FIG. 5 is a schematic diagram of an exemplary apparatus according to the present invention.

FIG. 6 is a diagram of an exemplary computer program product according to the present invention.

FIG. 8 is a diagram of another exemplary computer program product according to the present invention.

SUMMARY OF THE INVENTION

Figure 1:
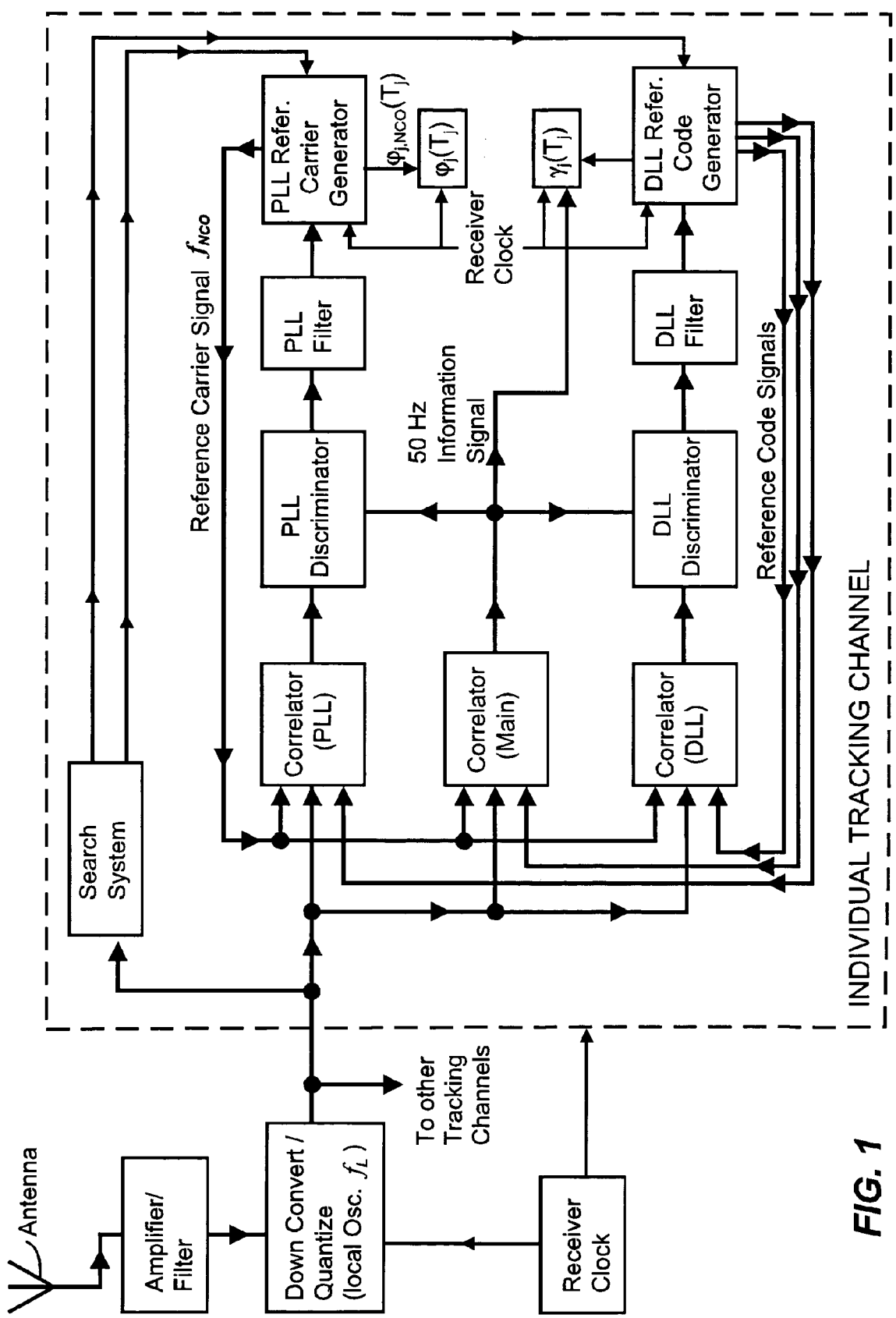
FIG. 1 is schmatic diagram of an exemplary receiver which may be used in practicing the present invention.

Broadly stated, the present invention encompasses methods and apparatuses for estimating the floating ambiguities associated with the measurement of the carrier signals of a plurality of global positioning satellites, such that the floating ambiguities are preferably consist for a plurality of different time moments.

The floating ambiguities are associated with a set of phase measurements of a plurality n of satellite carrier signals made by a first navigation receiver (B) and a second navigation receiver (R) separated by a distance, wherein a baseline vector $(x^o, y^o, z^o)$ relates the position of the second receiver to the first receiver. Each satellite carrier signal is transmitted by a satellite and has a wavelength, and each receiver has a time clock for referencing its measurements. Any difference between the time clocks may be represented by an offset. Methods and apparatuses according to the present invention receive, for a plurality of two or more time moments j, the following inputs: a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), and a geometric Jacobian matrix $H_j^\gamma$ whose matrix elements are representative of the changes in the distances between the satellites and one of the receivers that would be caused by changes in that receiver's position and time clock offset. (As used herein, the term "representative of," as used for example used when indicating that a first entity is representative of a second entity, includes cases where the first entity is equal to the second entity, where the first entity is proportional to the second entity, and where the first entity is otherwise related to the second entity.)

The present invention may be practiced in real time, where estimates of the floating ambiguities are generated as the above satellite information is being received. The present invention may also be practiced in post-processing mode, where the floating ambiguities are estimated after all the above satellite information has been received. In the latter case, block processing according to the present invention may be done.

Preferred methods and apparatuses according to the present invention generate, for each time moment j, a vector $\Delta\gamma_j$ of a plurality of range residuals of pseudo-range measurements made by the first and second navigation receivers in the form of:

$$\Delta\gamma_j = (\gamma_j^R - \gamma_j^B) - (D_j^R - D_j^B);$$

and also generate, for each time moment j, a vector $\Delta\phi_j$ of a plurality of phase residuals of full phase measurements made by the first and second navigation receivers in the form of:

$$\Delta\phi_j = (\phi_j^R - \phi_j^B) - \Lambda^{-1} \cdot (D_j^R - D_j^B),$$

where $\Lambda^{-1}$ is a diagonal matrix comprising the inverse wavelengths of the satellites. In the case of real-time processing, an LU-factorization of a matrix $M_1$, or a matrix inverse of matrix $M_1$, is generated for a first time moment (denoted as j=1), with the matrix $M_1$ being a function of at least $\Lambda^{-1}$ and $H_1^\gamma$. Also for this initial time moment, an initial vector $N_1$ of floating ambiguities is generated as a function of at least $\Delta\gamma_1$, $\Delta\phi_1$, and the LU-factorization of matrix $M_1$ or the matrix inverse of matrix $M_1$. For an additional time moment j, an LU-factorization of a matrix $M_j$, or a matrix inverse of matrix $M_j$, is generated, with the matrix $M_j$ being a function of at least $\Lambda^{-1}$ and $H_j^\gamma$. Also for an additional time moment j, a vector $N_j$ of estimated floating ambiguities is generated as a function of at least $\Delta\gamma_j$, $\Delta\phi_j$, and the LU-factorization or matrix $M_j$ or the matrix inverse of matrix $M_j$.

Exemplary forms of matrices $M_j$ and vectors $N_j$ are provided below. In this manner, a set of successively more accurate estimates of the floating ambiguities are generated in real-time with the vectors $N_j$. This method, of course, may also be practiced in a post-processing environment, where the data has been previously recorded and then processed according to the above steps.

In the post-processing environment, the following block processing approach according to the present invention may be practiced. As with above-described embodiments for real-time processing, the vectors of pseudo-range residuals $\Delta\gamma_k$ and vectors of phase residuals $\Delta\phi_k$, k=1, . . . j, are generated. Thereafter, a general matrix M is generated from the data, with M being a function of at least $\Lambda^{-1}$ and $H_k^\gamma$, for index k of $H_k^\gamma$ covering at least two of the time moments j, and an LU-factorization of matrix M or a matrix inverse of matrix M is generated. Thereafter, a vector N of estimated floating ambiguities is generated as a function of at least the set of range residuals $\Delta\gamma_k$, the set of phase residuals $\Delta\phi_k$, and the LU-factorization of matrix M or the matrix inverse of matrix M.

As an advantage of the present invention, the nature of matrix M, as described in greater detail below, enables a compact way of accumulating the measured data in order to resolve the floating ambiguities. As a further advantage, forms of matrix M provide a stable manner of factorizing the matrix using previous information. In preferred embodiments, matrix M is substantially positive definite, and also preferably symmetric.

Accordingly, it is an objective of the present invention to improve the stability of generating estimates of the floating ambiguities, and a further objective to reduce the amount of computations required to generate estimates of the floating ambiguities.

This and other advantages and objectives of the present invention will become apparent to those of ordinary skill in the art in view of the following description.

DETAILED DESCRIPTION OF THE PRESENT INVENTION

Nomenclature

All vectors presented herein are in column form. The transpose of a vector or matrix is indicated by the conventional superscript "$T$" affixed to the end of the name of the vector or matrix. The inverse of a matrix is indicated by the conventional superscript "$-$" affixed to the end of the name of the matrix. For the convenience of the reader, we provide a summary notation symbols below:

$\gamma$—denotes a pseudorange measurement, also called a code measurement; a pseudorange is the approximate distance between a satellite and a receiver is equal to the speed of light c multiplied by the time it takes the satellite signal to reach the receiver.

$\phi$—denotes a phase measurement.

n—denotes the number of satellites from which measurements are collected $^S$—is a superscript index that is attached to a measurement quantity (e.g., $\gamma$, $\phi$) or other data to identify the satellite to which the quantity corresponds.

$_j$ and $_k$—are subscript indices that are attached to a measurement quantity (e.g., $\gamma$, $\phi$) or other data to identify the moment in time (e.g., epoch) to which the measure the quantity corresponds.

c—speed of light in air.

$\lambda^S$—denotes a wavelength of a carrier signal emitted by the S-th satellite. The wavelength may denote either the L1-band carrier or the L2-band carrier, as indicated by the context of the discussion.

$\Lambda$—denotes a diagonal matrix of wavelengths: $\Lambda$=diag $(\lambda^1, \ldots, \lambda^n)$.

$O_{l,m}$ or $O_{l\times m}$—denotes an $l\times m$ zero matrix (all matrix elements are zero). The indices l and m take on the appropriate values in the context that the matrix is used. In other words, specific numerical values or other indices may appear in the places of l and m.

$I_l$ or $I_{l\times l}$—denotes a square identity matrix of size $l\times l$. The index l takes on the appropriate value in the context that the square identity matrix is used. In other words, specific numerical values or other indices may appear in place of l.

$\mu$—is a vector of observable equations, preferably linearized observable equations.

$\mu=(\Delta\gamma^1, \ldots, \Delta\gamma^n, \Delta\phi^1, \ldots, \Delta\phi^n)^T$ where each element of $\mu$ is associated with a corresponding satellite, where the superscript indices affixed to the elements identify the satellites.

$H_k^\gamma$—denotes the observation matrix H associates with the pseudo-ranges $\gamma$. In the art, is also called the Jacobian matrix, the Jacobi matrix, the geometric function matrix, the Jacobian geometric matrix, the matrix of directional cosines, and the directional cosine matrix. $H_k^\gamma$ has dimensions of n×4.

$Q_k$—denotes a compound matrix formed by $H_k^\gamma$ and $\Lambda$ as follows:

$$Q_k = \begin{bmatrix} H_k^\gamma \\ \Lambda^{-1} H_k^\gamma \end{bmatrix},$$

having dimensions of 2n×4.

G—denotes a compound matrix $$G = \begin{bmatrix} O_{n,n} \\ I_n \end{bmatrix}$$

formed by the zero matrix $O_{n,n}$ and the identity matrix $I_n$, having dimensions of 2n×n. The matrix G has many purposes. One purpose is to select the lower-right n×n submatrix of a larger 2n×2n matrix as follows:

$$G^T C G = C_{22}, \text{ where } C = \begin{bmatrix} C_{11} & C_{12} \\ C_{21} & C_{22} \end{bmatrix}.$$

$H_j^\mu$—denotes a compound matrix $H_j^\mu=[Q_j|G]$, which is a 2n×(4+n) matrix, $\|\cdot\|_{F^{-1}}$ denotes $F^{-1}$- weighted norm, $\|X\|_{F^{-1}}^2 = X^T F^{-1} X$.

Brief Background on the Structure of the Satellite Signals

Before describing the present invention, we briefly describe the structure of the satellite signals and of a typical receiver suitable for differential navigation applications. Each of the satellites radiates signals in two frequency bands: the L1 band and the L2 band. Two carrier signals are simultaneously transmitted in the L1-band; both carrier signals have the same frequency, but are shifted in phase by $\pi/2$ (90°). The first L1 carrier signal is modulated by the clear acquisition C/A-code signal and the second L1 carrier signal is modulated by the precision P-code signal. One carrier signal is transmitted in the L2 band, and uses a different frequency than the L1 carrier signals. The L2 carrier signal is modulated by the same P-code signal used to modulate the second L1 carrier signal. These carrier frequencies are between 1 GHz and 2 GHz in value. Each C/A-code signal and P-code signal comprises a repeating sequence of segments, or "chips", where each chip is of a predetermined time period ($\Delta$) and has a pre-selected value, which is either +1 or −1. The segment values follow a pseudo-random pattern, and thus the C/A-codes and the P-codes are called pseudo-random code signals, or PR-code signals. Additionally, before each C/A-code signal and P-code signal is modulated onto its respective carrier signal, each code signal is modulated by a low frequency (50 Hz) information signal (so-called information symbols).

The approximate distance between a satellite and a receiver is equal to the speed of light c multiplied by the transmission time it takes the satellite signal to reach the receiver. This approximate distance is called the pseudorange $\gamma$, and it can be corrected for certain errors to find a corrected distance D between the satellite and the receiver. There is a pseudorange between each visible satellite and the receiver. The transmission time from satellite to receiver is measured with the aid of clocks in the receiver and the satellite, and with the aid of several time scales (i.e., timing marks) present within the received satellite signal. The clocks in the satellites and the receiver are set to substantially the same time, but it is assumed that the receiver clock has a time offset $\tau$ because the receiver clock is based upon a quartz-crystal whereas each satellite clock is based upon a more accurate atomic reference clock. The receiver has the orbital patterns of the satellites stored in a memory, and it can determine the orbital position of the satellites based on the time of its clock. The receiver reads the timing marks on the satellite's signal, and compares them against it own clock to determine the transmission time from satellite to receiver. The satellite's low-frequency (50 Hz) information signal provides the least precise timing information, the C/A-code signal provides the next most precise timing information, and the P-code signal provides the most precise timing information. The pseudorange is determined from the low-frequency information signal and the C/A-code signal for civilian users and some military users, and is determined from the low-frequency information signal and the P-code signal for most military users. Accurate use of the P-code signal requires knowledge of a certain code signal that is only known to military users. Precision better than that provided by the P-code signal can be obtained by measuring the phase of the satellite carrier signal in a differential navigation mode using two receivers.

Referring to FIG. 1, a typical receiver for differential navigation applications has an antenna, an amplifier/filter unit that receives the antenna's output, a frequency down-conversion unit that receives the output of the amplifier/filter unit, and several individual tracking channels of the coherent type, each of which receives the down-converted satellite signals. The receiver also comprises a receiver clock, which provides base timing signals to the local oscillator of the down-conversion unit, and to components within each individual tracking channel. The down-conversion unit provides down-converted and quantized versions of the satellite signals to the channels, with the down-converted signals having frequencies generally in the range of 10 MHz to 20 MHz. Each channel tracks a selected one of the satellite signals. Each tracking channel measures the delay of one PR-code signal within the satellite signal (e.g., C/A-code or P-code signal), and also the phase of the down-converter version of the satellite's carrier signal. A typical tracking channel comprises a Delay-Lock Loop (DLL) circuit for tracking the delay of the PR-code, a Phase-Lock Loop (PLL) circuit for tracking the phase of the satellite's carrier signal, and three correlators which generate the input signals for the DLL and PLL circuits.

Referring to FIG. 1, the DLL circuit has a reference code generator that generates a set of reference code signals, each of which tracks the PR-code of the satellite signal, and each of which is provided as an input to a respective correlator. Each correlator output is representative of the degree to which the reference code signals are tracking the satellite code signal (i.e., the amount by which the reference signals are advanced or retarded in time with respect to the satellite signal). The DLL circuit also has a DLL discriminator and a DLL filter. The DLL discriminator receives inputs from two correlators, a DLL correlator that generates a base signal for controlling the DLL circuit and a main correlator that generates a signal useful for normalizing the base signal from the DLL correlator. The DLL discriminator generates an error control signal from these inputs; this error signal is filtered by the DLL filter before being provided to the DLL reference code generator as a control signal. The value of the DLL error signal varies by the amount that the reference code signals of the DLL generator are delayed or advanced with respect to the satellite code signal being tracked, and causes the code generator to adjust the timing of the reference code signals to better match the satellite's code signal. In this manner, tracking is achieved. The pseudorange $\gamma$ may be generated by methods known to the art from the receiver's clock, the 50 Hz information signal, and any one of the reference code signals generated by the DLL. This is indicated in the "$\gamma_j(T_j)$" box.

In a similar manner, the PLL has a reference carrier generator that generates a reference carrier signal that tracks the down-converter version of the satellite's carrier signal. We denote the frequency of the reference carrier signal as $f_{NCO}$ since the reference carrier frequency is often generated by a numerically-controlled oscillator (NCO) within the reference carrier generator. Referring to FIG. 1, the PLL circuit also has a PLL discriminator and a PLL filter. The PLL discriminator receives inputs from two correlators, a PLL correlator that generates a base signal for controlling the PLL circuit, and the main correlator that generates a signal useful for normalizing the base signal from the PLL correlator. Each correlator output is representative of the degree to which the reference carrier signal is tracking the satellite's carrier signal (i.e., the amount by which the reference carrier signal is advanced or retarded in time with respect to the satellite's carrier signal). The PLL discriminator generates an error control signal from these inputs; this error control signal is filtered by the PLL filter before being provided to the PLL reference carrier generator as a control signal. The value of the PLL error signal varies by the amount that the reference carrier signal of the PLL reference carrier generator is delayed or advanced with respect to the satellite carrier signal being tracked, and causes the reference carrier generator to adjust the timing of the reference carrier signal to better match the satellite's carrier signal. The reference carrier generator provides a phase signal $\phi_{jNCO}(T_j)$ representative of the phase (integrated frequency) of the PLL's reference oscillator. This signal may be combined with other information, as described below, to provide a signal representative of the full phase of the satellite signal (but possibly with ambiguities in it). This is indicated in the "$\phi_j(T_j)$" box.

Finally, each individual tracking channel usually comprises a search system which initially varies the reference signals to bring the PLL and DLL circuits into lock mode. The construction of this and the other above components is well known to the art, and a further detailed description thereof is not needed in order for one of ordinary skill in the art to make and use the present invention.

Brief Background on the Navigation Parameters.

Because of the time offset $\tau$ and other error effects, the pseudorange $\gamma$ between a satellite and a receiver is usually not the actual distance between the satellite and the receiver. By looking at the pseudoranges of four or more satellites, there are well-known methods of estimating the time offset $\tau$ of the receiver and of accounting for some of the error effects to generate the computed distance D between the satellites and the receiver. The receiver's position may then be computed. However, because of various sources of noise and the relatively low resolution of the pseudo-random code signal, the true distances (i.e., true ranges), and receiver's position coordinates will not be exactly known, and will have errors.

In theory, more precise values for the receiver's position and clock offset could be obtained by measuring the number of carrier cycles that occur between each satellite and the receiver. The phase of the carrier of the satellite signal as transmitted by a satellite can be expressed as:

$$\phi^S(t) = \Phi_0^S + \int_0^t f_S \cdot dt \qquad (2)$$
$$= \Phi_0^S + f_S \cdot t$$

where $\Phi_0^S$ is an initial phase value, $f_S$ is the satellite carrier frequency, and t is the satellite's time. Because the satellite carrier frequency is generated from a very precise time base, we may assume that $f_S$ is a constant and not time dependent, and we may replace the above integral with $f_S \cdot t$, as we have shown in the second line in the above equation. The phase of this signal when it reaches the receiver's antenna over the range distance D(t) is denoted as $\phi_A^S(t)$, and its value would be:

$$\phi_A^S(t) = \phi^S(t - D(t)/c - \tau_{ATM}(t)) \qquad (3)$$
$$= \Phi_0^S + f_S \cdot (t - D(t)/c - \tau_{ATM}(t))$$
$$= \Phi_0^S + f_S \cdot t - f_S \cdot D(t)/c - f_S \cdot \tau_{ATM}(t),$$

where c is the speed of light, and where $\tau_{ATM}(t)$ is a delay due to anomalous atmospheric effects which occur mostly in the upper atmosphere. The number of cycles $f_S \cdot \tau_{ATM}(t)$ due to the atmospheric effects cannot be predicted or determined to within an accuracy of one carrier cycle by a stand-alone receiver (i.e., cannot be determined by absolute positioning). However, the atmospheric effect can be substantially eliminated in a differential GPS mode where the phase of the satellite is measured at a rover station and a base station, $\phi_{A,R}^S(t)$ and $\phi_{A,B}^S(t)$ respectively, and then subtracted from one another. Over the short baseline between the rover and base stations, the atmospheric delay $\tau_{ATM}(t)$ in both of these phases is equal for practical purposes, and the difference in phases is:

$$\phi_{A,R}^S(t) - \phi_{A,B}^S(t) = f_S \cdot D_R(t)/c - f_S \cdot D_B(t)/c. \qquad (4)$$

Figure 2:
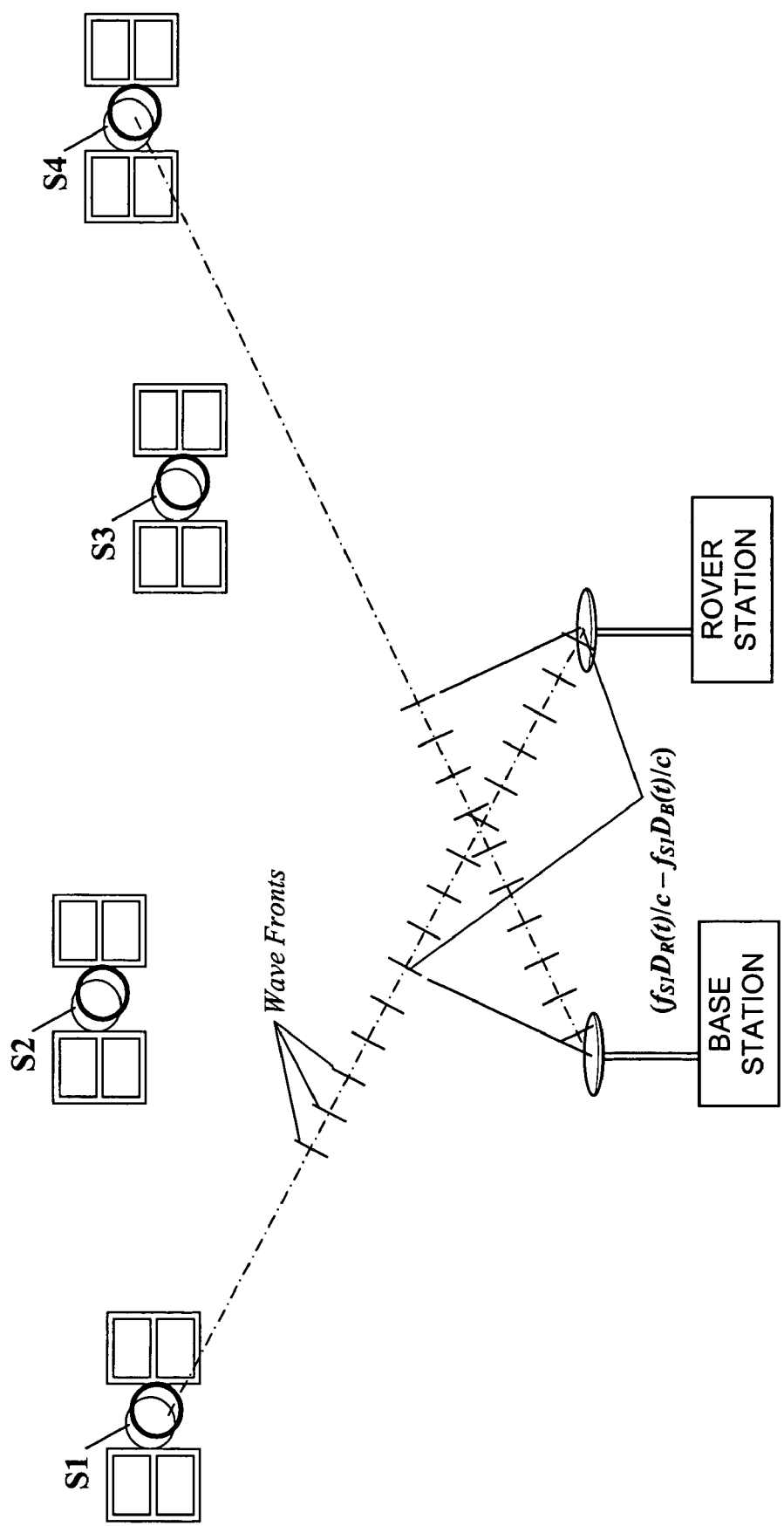
FIG. 2 is a perspective view of a rover station and a base station in a first exemplary coinfiguration according to the present invention.

The terms $\Phi_0^S$ and $f_S \cdot t$ have also been cancelled from the difference. In FIG. 2, we show a base station, a rover station, and four satellites, in schematic form. The wave fronts of the satellite carrier signal are nearly planar by the time they reach the base and rover stations since the satellites are at least 22,000 km away. These wave fronts are illustrated in FIG. 2 for the first and fourth satellites (S1 and S4). Assuming that a wave front of the satellite carrier reaches one of the antennas first (either rover or base), the above difference is the number of additional wave fronts that the satellite carrier must travel before it reaches the second antenna (either base or rover). We have illustrated this for the first satellite S1 as $f_{S1} \cdot D_R(t)/c - f_{S1} \cdot D_B(t)/c$. Using the angle between the base-rover baseline vector and the line-of-sight vector to the satellite from either of the stations, the number of carrier cycles that lie along the baseline can be determined by trigonometry, and thus the baseline can, in theory, be accurately determined from the differential phase.

However, the task of measuring carrier phase is not as easy as it appears. In practice, we must use non-ideal receivers to measure the phases $\phi_{A,R}^S(t)$ and $\phi_{A,B}^S(t)$, with each receiver having a different clock offset with respect to the GPS time, and with each receiver having phase errors occurring during the measurement process. In addition, at the present time, it is not practical to individually count the carrier cycles as they are received by the receiver's antenna since the frequency of the carrier signal is over 1 GHz. However, the PLL loop can easily track the Doppler-shift frequency $f_D$ of the carrier signal, which is in the kHz range. With a few assumptions, the phases $\phi_{A,R}^S(t)$ and $\phi_{A,B}^S(t)$ can be related to their respective Doppler-shift frequencies. As is known in the art, the satellite transmits at a fixed frequency of $f_S$, but the relative motion between the satellite and receiver causes the frequency seen by the receiver to be slightly shifted from the value of $f_S$ by the Doppler frequency $f_D$. We may write the frequency seen by the receiver's antenna as $f_S + f_D$, where $f_D$ has a positive value when the distance between the satellite and receiver's antenna is shrinking, and a negative value when the distance is increasing. Each receiver can then assume that the received phase is proportional to the predictable amount of $f_S \cdot t$, minus the amount $f_D \cdot t$ due to the Doppler-shift. The Doppler amount $f_D \cdot t$ is subtracted from $f_S \cdot t$ because the Doppler frequency increases as the distance between the satellite and receiver's antenna decreases. The predictable amount $f_S \cdot t$ will be the same for each receiver, but the Doppler frequencies will usually be different.

As previously mentioned with reference to FIG. 1, the reference oscillator (e.g., NCO) of the PLL circuit tracks the frequency of a selected one of the down-converted satellite signals. As a result, it inherently tracks the Doppler-shift frequency of the satellite's carrier signal. Before being provided to the PLL circuit, the carrier signal is down-converted from the GHz range by a local oscillator having a frequency $f_L$. The frequency seen by the PLL circuit is $(f_S + f_D) - f_L$, which can be rearranged as: $(f_S - f_L) + f_D$. The quantity $(f_S - f_L)$ is known as the pedestal frequency $f_p$, which is typically around 10 MHz to 20 MHz. The PLL's reference oscillator tracks the down-converted frequency of $f_p + f_D$. We would like to integrate the frequency of the reference oscillator to obtain a phase observable which is proportional to $-f_D \cdot t$. Starting at a time moment $T_p$ when the PLL circuit initially locks onto the down-converted satellite signal, with the time moment $T_p$ being measured by the receiver's clock, we will generate a phase observable $\phi_j(T_j)$ at discrete time moments $T_j$ of the receiver's clock T as follows:

$$\phi_j(T_j) = f_{p,nom} \cdot (T_j - T_p) - \phi_{jNCO}(T_j) \quad (5)$$

where $f_{p,nom}$ is the nominal value of the pedestal frequency, and where $\phi_{jNCO}(T_j)$ is the phase (integrated frequency) of the PLL's reference oscillator (e.g., NCO). The time moments $T_j$ are spaced apart from each other by a time interval $\Delta T_j$, as measured by the receiver's clock, and may be express as $T_j = j \cdot \Delta T_j$, where j is an integer. $\phi_j(T_j)$ is in units of cycles, and is proportional to the negative of the integrated Doppler-shift frequency. This is because $\phi_{jNCO}(T_j)$ changes value in proportional to the quantity $(f_p + f_D) \cdot (T_j - T_p)$.

While it may be possible to set $\phi_{jNCO}(T_p)$ to any value at the initial lock moment $T_p$, it is preferably to set $\phi_{jNCO}(T_p)$ to a value substantially equal to $(f_{p,nom} \cdot T_p - f_S \cdot \tilde{D}p/c)$, where $T_p$ is measured from the start of GPS time, and where $\tilde{D}p$ is the approximate distance between the satellite and the receiver, as found by the pseudorange measured by the DLL, or as found by a single point positioning solution. This setting of $\phi_{jNCO}(T_p)$ is conventional and provides values of $\phi_j(T_j)$ for the base and rover stations which are referenced from the same starting time point.

In U.S. Pat. No. 6,268,824, which is commonly assigned with the present application, it is shown how the observable $\phi_j(T_j)$ is related to the distance D between the receiver and the satellite. We summarize the relationship here, neglecting the atmospheric delay $\tau_{ATM}(t_j)$ since this delay will be canceled out when we take the difference between receivers, and refer the reader to the patent for the derivation:

$$\phi_j(T_j) = f_S \cdot D_j/c + f_S \cdot (\tau_j - T_p) + (\phi'_0 - \Phi_0^S) - N_{nco} - \zeta_{\phi j} \quad (6)$$

where $f_S$ is the satellite carrier frequency, $D_j$ is the distance between satellite and receiver at time moment $T_j$, c is speed of light in the atmosphere, $\tau_j$ is the offset between the satellite time clock t and the receiver time clock T ($T_j = t_j + \tau_j$), $\tau_j$ varies with time, $T_p$ is the time moment when the PLL circuit initially locks onto the down-converted satellite signal, $\phi'_0 = \Phi_{LO} + f_{L,nom} \cdot T_p$, where $\Phi_{LO}$ is the phase offset of the receiver's local oscillator and $f_{L,nom}$ is the nominal frequency of the receiver's local oscillator, $\Phi_0^S$ is an initial phase value of the satellite, $N_{nco}$ is an unknown integer number of carrier cycles due to the PLL not knowing which carrier cycle it first locks onto, $N_{nco}$ may be positive or negative, and $\zeta_{\phi j}$ is a small tracking error due to the operation of the PLL circuit.

As it turns out, if we chose the time increments $\Delta T_j$ for $T_j$ ($T_j = j \cdot \Delta T_j$) to be equal to $\Delta T_j = 2$ ms or an integer multiple of 2 ms, then the term $-f_S \cdot T_p$ is an integer number which can be consolidated with the integer ambiguity $-N_{nco}$ into a single ambiguity +N.

$$\phi_j(T_j) = f_S \cdot D_j/c + f_S \cdot \tau_j + (\phi'_0 - \Phi_0^S) + N - \zeta_{\phi j} \quad (7)$$

Thus, our Doppler phase observable $\phi_j(T_j)$ has been related to the distance $D_j$ between the satellite and receiver, the time offset $\tau_j$ of the receiver, an integer ambiguity N, and some initial phase offsets $(\phi'_0 - \Phi_0^S)$ which can be readily determined.

We will now write equation (7) for the base and rover stations, adding superscripts "B" and "R" for the base and rover stations, and subscript "m" to indicate the m-th satellite signal and the m-th individual tracking channel.

$$\phi_{j,m}^B(T_j) = f_S \cdot D_{j,m}^B/c + f_S \cdot \tau_j^B + (\phi'_0^B - \Phi_0^S) + N_m^B - \zeta_{\phi j,m}^B \quad (8A)$$

$$\phi_{j,m}^R(T_j) = f_S \cdot D_{j,m}^R/c + f_S \cdot \tau_j^R + (\phi'_0^R - \Phi_0^S) + N_m^R - \zeta_{\phi j,m}^R \quad (8B)$$

For the differential navigation mode, the difference of these phases is formed:

$$\phi_{j,m}^B(T_j) - \phi_{j,m}^R(T_j) = f_S \cdot D_{j,m}^B/c - f_S \cdot D_{j,m}^R/c + \quad (9)$$
$$f_S \cdot (\tau_j^B - \tau_j^R) + (N_m^B - N_m^R) + (\phi'_0^B - \phi'_0^R) - (\zeta_{\phi j,m}^B - \zeta_{\phi j,m}^R)$$

Using $N^m = (N_m^B - N_m^R)$ to represent the difference between the ambiguities, and using the well-known relationship $f_S/c = 1/\lambda_m$, where $\lambda_m$ is the wavelength of the satellite carrier signal, we have:

$$\phi_{j,m}^B(T_j) - \phi_{j,m}^R(T_j) = (1/\lambda_m) \cdot (D_{j,m}^B - D_{j,m}^R) + \quad (10)$$
$$f_S \cdot (\tau_j^B - \tau_j^R) + N^m + (\phi'_0^B - \phi'_0^R) - (\zeta_{\phi j,m}^B - \zeta_{\phi j,m}^R)$$

The values for $\phi'_0^B$ and $\phi'_0^R$ can be readily determined. The values of $\zeta_{\phi j,m}^B$ and $\zeta_{\phi j,m}^R$ cannot be determined, but they have zero mean values (and should average to zero over time).

Now, we relate this back to the initial objective and problem that we expressed with respect to FIG. 2. As indicated, we wanted to find the phase difference quantity $(f_S \cdot D_R(t)/c - f_S \cdot D_B(t)/c)$ associated with each satellite in order to determine the number of carrier cycles that lie along the baseline, and thus provide a better estimate of the coordinates of the baseline. By examination of the phase difference quantity and equations (9) and (10), we seek that $(f_S \cdot D_R(t)/c - f_S \cdot D_B(t)/c)$ is equal to $\phi_{j,m}^B(T_j) - \phi_{j,m}^R(T_j)$, which we can measure, minus the cycle ambiguity $N^m$, minus the error in the clocks $f_S \cdot (\tau_j^B - \tau_j^R)$, minus the phase offsets $(\phi'_0^B - \phi'_0^R)$, and minus the errors $(\zeta_{\phi j,m}^B - \zeta_{\phi j,m}^R)$, the last of which can be removed by averaging. Thus, estimating the cycle ambiguities N will be important in using the phase information to improve the estimated coordinates of the baseline.

Our Inventions Related to Ambiguity Resolution—Estimating Floating Ambiguities

Figure 3:
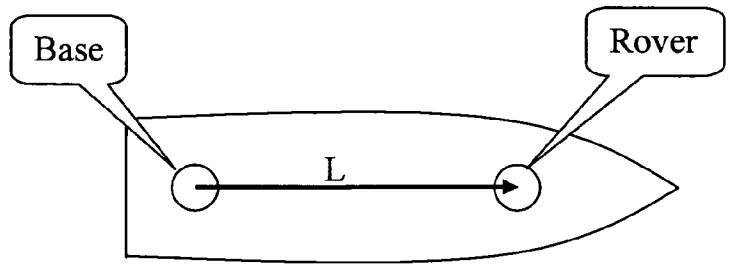
FIG. 3 is a perspective view of a rover station and a base station in a second exemplary coinfiguration according to the present invention.

Our inventions can be applied to a number of application areas. In general application areas, the rover and base stations can move with respect to one another. In one set of specific application areas, the base and rover stations are fixed to a body or vehicle (e.g., planes and ships) and separated by a fixed distance L, as shown in FIG. 3. We refer to these applications as the constant distance constraint applications. The movement of the vehicle may be arbitrary while the distance between two antennas is held constant due to the rigidity of the vehicle body. This distance $L_{RB}$ is known with a certain degree of confidence is considered as an additional constraint or measurement available at every time instant, because it depends on both Base and Rover positions. The constraint can be mathematically expressed as:

$$((x_R - x_B)^2 + (y_R - y_B)^2 + (z_R - z_B)^2)^{1/2} = L_{RB} \quad (11)$$

where $x_R$, $y_R$, and $z_R$, represent the rover station coordinates and where $x_B$, $y_B$, and $z_B$ represent the base station coordinates. The information from the constraint can be used to better estimate the Rover position relative to the Base. For this, it is preferably to form a cost penalty function mathematically equivalent to the form:

$$F(x_R - x_B, y_R - y_B, z_R - z_B) = \qquad (12)$$
$$\frac{1}{2}\left(((x_R - x_B)^2 + (y_R - y_B)^2 + (z_R - z_B)^2)^{\frac{1}{2}} - L_{RB}\right)^2$$

where, in preferred embodiments, the cost function $F(*)$ will be minimized such that and its the first derivatives with respect to the rover coordinates (or alternatively the base coordinates) are reduced to values near zero:

$$F(*) \approx 0, \frac{\partial F}{\partial x_R} \approx 0, \frac{\partial F}{\partial y_R} \approx 0, \frac{\partial F}{\partial z_R} \approx 0$$

In the preferred methods described below, the amount of weighting given to minimizing the cost function $F(*)$ will set by a weighting parameter q (e.g., $q \cdot F(*)$), with no weighting being given when q=0, and increasing degrees of weighting being given by selecting q>0. The case of setting q=0 is also equivalent to removing the constraint that the rover and base stations are separated by a fixed distance L.

The ambiguity resolution task generally comprises the following three main parts:

1. Generation of the floating ambiguity estimations (estimating the floating ambiguities),
2. Generation of the integer ambiguities, and
3. Formation of a signal of integer ambiguities resolution.

The present invention pertains to the first part, that of generating the floating ambiguity estimates. The second and third parts may be accomplished by apparatuses and methods known in the art. The apparatuses and methods of our present invention use as an input data:

(a) the pseudo-ranges and full phase measurements obtained in the Base and Rover receivers;
(b) the satellites coordinates (which are highly predictable can be readily determined from the GPS time and information provided in the 50 Hz low-frequency information signal by methods well known to the art);
(c) the estimated coordinates of the Base and Rover stations (as measured at their antennas); which may be generated from then pseudo-range data by single point solutions, and oftentimes the coordinates of the base station are precisely known;
(d) optionally, a set of weight coefficients characterizing the accuracy of the measurements; and
(e) optionally, an estimate $r_j'$ of the baseline coordinates $r_j$ and the value of $L_{RB}$ if the cost function $F(*)$ is used.

According to the input data, a vector of observations and a covariance matrix of measurements are formed. After that a state vector is generated, components of which are floating ambiguities, the number of which is equal to the number of satellites. On the basis of the floating ambiguity values, a search of the integer ambiguities is performed with use of a least-squares method that is modified for integer estimations.

Improvement of the floating ambiguity estimations can take place step-by-step, and the probability of correct ambiguity resolution increases step-by-step as information is accumulated. Preferred finishing of this process is registered by appearance of the signal of integer ambiguities resolution, which indicates that ambiguity resolution was performed sufficiently safely. After that, the integer ambiguities together with other input data are used for accurate determination of the base line vector. The tasks of determining the integer ambiguities and of generating the signal of integer ambiguities resolution are known to the art and do not form part of our invention. These tasks, therefore, are not described in greater detail.

Our invention is suitable for both the RTP mode and for the PP mode under movable Rover, where the Rover coordinates may be random and independent in adjacent clock moments. Our invention is also suitable for both the RTP mode and for the PP mode when both the base and rover stations are moving, where the coordinates of the stations may be random, but constrained by fixed distance $L_{RB}$, in adjacent clock moments.

We start by rewriting equation (10), which has the integer ambiguities $N^m$ in vector form:

$$\phi_j^B(T_i) - \phi_j^R(T_i) = \qquad (13)$$
$$\Lambda^{-1} \cdot (D_j^B - D_j^R) + f_S \cdot (\tau_j^B - \tau_j^R) + N + (\phi_0'^B - \phi_0'^R) - (\zeta_{\phi j}^B - \zeta_{\phi j}^R),$$

where $\Lambda^{-1}$ is a diagonal matrix of inverse wavelengths. We note that the components of $(\phi'_0{}^B - \phi'_0{}^R)$ can be selected to be integer constants, and can therefore be incorporated into the integer ambiguities N, which may be called the modified integer ambiguities N. Thus, we may simplify the above equation:

$$\phi_j^B(T_j) - \phi_j^R(T_j) = \Lambda^{-1} \cdot (D_j^B - D_j^R) + f_S \cdot (\tau_j^B - \tau_j^R) + N - (\zeta_{\phi j}^B - \zeta_{\phi j}^R) \qquad (14)$$

After this modified N are found, the "true" N may be found by subtracting $(\phi'_0{}^B - \phi'_0{}^R)$ from the modified N.

As an alternative equivalent to the above, the vector $(\phi'_0{}^B - \phi'_0{}^R)$ can be computed and carried over to the left-hand side of equation (14) and subtracted from $(\phi_j^B(T_i) - \phi_j^R(T_i))$. As such, the N that is determined will be the "true" N. Once the "true" N is found, then the underlying unknown integer number of carrier cycles $N_{nco}$ may be found by negating the "true" N (i.e., multiplying by −1) and then subtracting $f_S \cdot T_p$ ($N_{nco} = $"true" $N - f_S \cdot T_p$). However, for the ultimate goal of computing more accurate coordinates of the baseline, the modified ambiguities N in equation (14) can be used, and they greatly simplify the computations. Nonetheless, it will be appreciated that the present invention may be practiced by using the "true" N or $N_{nco}$ in equation (14) by suitable modification of the left-hand side of equation (14), and that the appended claims cover such practices.

Our approach comprises solving the above equations (14) at a plurality of time moments jointly to find an estimation for vector N. We cannot readily find measured values for vectors $\tau_j^B$, $\tau_j^R$, $\zeta_{\phi j}^B$, and $\zeta_{\phi j}^R$, and we have some errors in the range vectors $D_j^B$ nd $D_j^R$. Our approach is to represent (model) the errors in the range vectors $D_j^B$ and $D_j^R$ and the terms $f_S \cdot (\tau_j^B - \tau_j^R) - (\zeta_{\phi j}^B - \zeta_{\phi j}^R)$ by the following error vector: $\Lambda^{-1} \cdot H_j^\gamma \cdot [\Delta x, \Delta y, \Delta z, c \cdot \Delta \tau]^T$, where $H_j^\gamma$ is the Jacobian matrix (e.g., directional cosine matrix), and where $[\Delta x, \Delta y, \Delta z, c \cdot \Delta \tau]^T$ are corrections to the baseline coordinates and clock offsets of the receivers. Thus, we will model the above equation as:

$$(\phi_j^R - \phi_j^B) - \Lambda^{-1} \cdot (D_j^R - D_j^B) = N + \Lambda^{-1} \cdot H_j^\gamma \cdot [\Delta x, \Delta y, \Delta z, c \cdot \Delta \tau_j]^T \quad (15)$$

The pseudoranges will be used to estimate the vector $H_j^\gamma \cdot [\Delta x, \Delta y, \Delta z, c \cdot \Delta \tau]^T$ as follows:

$$(\gamma_j^R - \gamma_j^B) - (D_j^R - D_j^B) = H_j^\gamma \cdot [\Delta x, \Delta y, \Delta z, c \cdot \Delta \tau_j]^T \quad (16)$$

This will be done through the formation of observation vectors, state vectors, and observation matrices, and an estimation process over a plurality of time moments, as described below in greater detail. Vector N will be jointly estimated in this process.

Generation of the Vector of Observations.

A vector of observations $\mu_j$ is generated at each clock time moment $t_j = j \cdot \Delta T_j$ and comprises $2 \cdot n$ components, where n is the number of the satellite channels. The first n components are the residuals of the single differences of the Base and Rover pseudo-ranges, which we denote in vector form as $\Delta \gamma_j$:

$$\Delta \gamma_j = \gamma_j - D_j \quad (17)$$

with $\gamma_j = \gamma_j^R - \gamma_j^B$, and $D_j = D_j^R - D_j^B$; and where $\gamma_j^R$ and $\gamma_j^B$ are vectors containing the pseudo-ranges of the satellites, measured in the Base and Rover receivers, respectively; and $D_j^R$ and $D_j^B$ are vectors of the estimated ranges of the satellites from Base and Rover stations at the moment of j-th signal radiation $D_j^R$ and $D_j^B$ are computed from the known positions of the satellites, the estimated position of the rover, and the known or estimated position of the base station by standard geometry.

The next n components of the observation vector $\mu_j$ are the residuals of the single differences of the Base and Rover full phases ($\Delta \phi_j$), which we indicate here in vector form:

$$\Delta \phi_j = \phi_j - \Lambda^{-1} \cdot D_j \quad (18)$$

where $\phi_j = \phi_j^R - \phi_j^B$;

$\phi_j^R$ and $\phi_j^B$ are vectors of the full phases of the given satellite signal, measured at the Base and Rover receivers, respectively (the phases are measured in cycles); and $\Lambda^{-1}$ is a diagonal matrix of inverse wavelengths, where each diagonal component corresponds to a channel and is equal to $1/\lambda$, where $\lambda$ is the wavelength of the carrier signal in the given channel.

The full phase vectors $\phi_j^B$ and $\phi_j^R$ may be constructed in the form provided by equation (5):

$$\phi_j^B(T_j) = f_{p,nom} \cdot (T_j - T_p^B) - \phi_{j,NCO}^B(T_j),$$

$$\phi_j^R(T_j) = f_{p,nom} \cdot (T_j - T_p^R) - \phi_{j,NCO}^R(T_j),$$

or may be constructed in the form which includes the phase offsets of the base receiver:

$$\phi_j^B(T_j) = [f_{p,nom} \cdot (T_j - T_p^B) - \phi_{j,NCO}^B(T_j)] - \phi'_0{}^B,$$

$$\phi_j^R(T_j) = [f_{p,nom} \cdot (T_j - T_p^R) - \phi_{j,NCO}^R(T_j)] - \phi'_0{}^R.$$

In either case, we will use the convention practice and have the base receiver correct its clock so that the base time $T_j$ will be equivalent to the GPS time $t_j$ for the purposes of implementing our inventions (the time offset has already been accounted for in the above equations). For all practical purposes, times $T_j$ and $t_j$ will refer to the same processing time increment, and can be interchanged in the above equations.

State Vector Representation.

The forms represented by Equations (15)–(18) maybe represented in matrix form equivalent to:

$$\mu_j = H_j^\mu \cdot A_j, \quad (19)$$

where vector $A_j$ is a state vector related to observation matrix $\mu_j$, and where matrix $H_j^\mu$ is an observation matrix that specifies the relationship between the components of the observations vector $\mu_j$ and the state vector $A_j$. State vector vector $A_j$ comprises (4+n) components. The first three components are increments ($\Delta x$, $\Delta y$, $\Delta z$) to the coordinates ($x^o$, $y^o$, $z^o$) of the baseline vector unknown at the j-th clock moment, the fourth component is the unknown increment of the reference oscillator phases ($c \cdot \Delta \tau$). The remaining n components are the unknown floating ambiguities, different in different channels ($N^1$, $N^2$ ... $N^n$). Matrix $H_j^\mu$ comprises 2n rows and (4+n) columns, and may be divided into the following 4 parts (sub-matrices):

$$H_j^\mu = \left[ \begin{array}{c|c} H_j^\gamma & 0_{n \times n} \\ \hline \Lambda^{-1} \cdot H_j^\gamma & I_n \end{array} \right]. \quad (20)$$

The first part, the left upper corner of this matrix (the first four columns by the first n rows), is occupied by the observation matrix $H_j^\gamma$ relating to the pseudo-range measurements, each row corresponding to one channel (from the 1-st to the n-th). For the n-th channel, the corresponding row appears like this:

$$[\alpha_{jn}, \beta_{jn}, h_{jn}, 1],$$

where $\alpha_{jn}$, $\beta_{jn}$, $h_{jn}$—the directional cosines of the range vector to the n-th satellite from Rover for the j-th time moment. Methods of computing directional cosines are well known to the art and a description thereof herein is not needed for one of ordinary skill in the art to make and use the present invention.

The second part of matrix $H_j^\mu$, the left lower corner (the first four columns by the last n rows), is occupied by the matrix product $\Lambda^{-1} \cdot H_j^\gamma$ relating to the full phase measurements, each row corresponding to one channel (from the 1-st to the n-th). For the n-th channel, the corresponding row appears like this:

$$[\alpha_{jn}/\lambda_n, \beta_{jn}/\lambda_n, h_{jn}/\lambda_n, 1/\lambda_n],$$

where $\lambda_n$ is the wavelength of the carrier signal in the n-th channel.

The third part of matrix $H_j^\mu$, the right upper corner (the last n columns by the first n rows) is occupied by zeroes. And the fourth part, the right lower corner (the last n rows by the last n columns) is occupied by the elements relating to the floating ambiguities. This part represents the identity matrix $I_n$ with dimensions of n×n. For the discussion that follows below, it will be convenient to identified sub-blocks of matrix $H_j^\mu$ as follows $H_j^\mu = [Q_j | G]$, where $Q_j$ is a compound matrix formed by $H_j^\gamma$ and $\Lambda$ as follows:

$$Q_j = \left[ \begin{array}{c} H_j^\gamma \\ \hline \Lambda^{-1} H_j^\gamma \end{array} \right] \text{ (having dimensions of } 2n \times 4\text{),}$$

and where G is a compound matrix the zero matrix $O_{n\times n}$ and the identity matrix $I_n$ as follows:

$$G = \begin{bmatrix} 0_{n\times n} \\ I_n \end{bmatrix} \text{(having dimensions of } 2n \times n\text{)}.$$

Equation (18) has 2n equations (according to the number of components of the observation vector), and may be used to determine the state vector $A_j$ at the j-th clock moment (i.e., to determine 4+n unknown values). Solution of such a system of equations at $n \geq 4$ may be performed by the method of least squares. However, our invention relates to solving for the ambiguity vector N, which is a component of $A_j$, over a plurality of time moments. Before we describe that process, however, we want to first describe the groundwork of how we can integrate the minimization of the cost function F(*) for constrained distance between receivers, if used, with the solution of Equation (19), and to then describe some covariance matrices that characterize the accuracy of the measured data used to generate $\mu_j$. These covariance matrices are helpful to our invention, but not strictly necessary.

The cost function F(*) may be expressed in the following form:

$$F(r_j + a_j) = \frac{1}{2}\left(((x_j^\circ + \Delta x_j)^2 + (y_j^\circ + \Delta y_j)^2 + (z_j^\circ + \Delta z_j)^2)^{1/2} - L_{RB}\right)^2$$

where:

$$a_j = \begin{pmatrix} \Delta x_j \\ \Delta y_j \\ \Delta z_j \\ c \cdot \Delta \tau_j \end{pmatrix} \text{ is a vector of the first four components of } A_j, \text{ and}$$

$$r_j = \begin{pmatrix} x_j^\circ \\ y_j^\circ \\ z_j^\circ \\ 0 \end{pmatrix} \text{ is a vector of the coordinates of the baseline vector,}$$

with a zero as the four vector component. Using a second-order truncation of the Taylor series expansion, the cost function F(*) may be approximated as:

$$F(r_j + a_j) - F(r_j) \approx a_j^T \frac{\partial F}{\partial r} + \frac{1}{2} a_j^T \frac{\partial^2 F}{\partial r^2} a_j = a_j^T h_j + \frac{1}{2} a_j^T S_j a_j \quad (21)$$

where $$h_j = \left(1 - \frac{L_{RB}}{\|r_j\|}\right) r_j, \text{ and} \quad (22)$$

$$S_j = \left(1 - \frac{L_{RB}}{\|r_j\|}\right)\begin{pmatrix} I_3 & O_{3\times 1} \\ O_{1\times 3} & 0 \end{pmatrix} + \frac{L_{RB}}{\|r_j\|} r_j r_j^T. \quad (23)$$

Because forms (21)–(23) share common variables with equation (18), the minimization of q·F(*) can be integrated with the solution of equation (18), as described below in greater detail.

Generation of the Measurements Covariance Matrix.

Measurements covariance matrix $R_J$ is preferably formed in the following way on the basis of weight coefficients obtained in Base and Rover receivers:

$$R_j = \begin{bmatrix} R_j^\gamma & 0_{n\times n} \\ 0_{n\times n} & R_j^\varphi \end{bmatrix}, \quad (24)$$

where (25)

$$R_j^\gamma = \begin{bmatrix} (K_{j,1}^\gamma)^{-1} & 0 & \cdots & 0 \\ 0 & (K_{j,2}^\gamma)^{-1} & \cdots & 0 \\ \vdots & \vdots & \ddots & \vdots \\ 0 & 0 & \cdots & (K_{j,n}^\gamma)^{-1} \end{bmatrix}, \text{ and}$$

$$R_j^\varphi = \begin{bmatrix} (K_{j,1}^\varphi)^{-1} & 0 & \cdots & 0 \\ 0 & (K_{j,2}^\varphi)^{-1} & \cdots & 0 \\ \vdots & \vdots & \ddots & \vdots \\ 0 & 0 & \cdots & (K_{j,n}^\varphi)^{-1} \end{bmatrix}.$$

The weight coefficients ($K_{j1}^\gamma$, $K_{j2}^\gamma$, ..., $K_{jn}^\gamma$) characterize the accuracy of the measurements of the residuals $\Delta\gamma_j$ of the pseudo-range single differences for the corresponding satellite channels (1-st, 2-nd, ..., n-th). The generation of the weight coefficients is not a critical part of the present invention, and one may use his particular method of weighting. We present here one of our ways, where each of these coefficients may be determined according to the weight coefficients measured in each channel by Base and Rover receivers for the pseudo-ranges, i.e., by values $K_j^{\gamma B}$ and $K_j^{\gamma R}$.

Thus, for example, for the n-th channel:

$(K_{jn}^\gamma)^{-1} = (K_{jn}^{\gamma B})^{-1} + (K_{jn}^{\gamma R})^{-1}$, where $K_j^{\gamma B}$ and $K_j^{\gamma R}$ are determined taking into account the measured signal-to-noise ratio in the receivers and the satellite elevation angles in the n-th channel (of Base and Rover, respectively). Specifically, for each of the receivers (no superscript used), $K_{j,n}^\gamma = Z_{k,n}^2 \cdot \sin(\xi_{k,n} - \xi_{min}) \cdot \sigma_\gamma^2$ when $\xi_{k,n} > \xi_{min}$, and $K_{j,n}^\gamma = 0$ when $\xi_{k,n} \leq \xi_{min}$, where $Z_{k,m}^2$ is the signal strength of the m-th satellite carrier signal as received by the receiver (it has been normalized to a maximum value and made dimensionless), where $\xi_{k,m}$ is the elevation angle of the m-th satellite as seen by the receiver, where a minimum elevation angle $\xi^B_{min}$ at which the signal becomes visible at the receiver, where $\sigma_\gamma^2$ is the variance of the code measurements ($\sigma_\gamma \approx 1$ m). The factor $Z_{k,m}^2 \cdot \sin(\xi_{k,m} - \xi_{min})$ is dimensionless.

Weight coefficients $K_{j1}^\varphi$, $K_{j2}^\varphi$, ..., $K_{jn}^\varphi$ characterize the accuracy of the measurements of the residuals $\Delta\varphi j$ of the phase single differences, and are determined similarly. Here the same input data is used: the signal-to-noise ratio and the angle of elevation, but another scale for the phase measurements is considered (e.g., $\sigma_\phi^2$ instead of $\sigma_\gamma^2$). Specifically, for each of the receivers (no superscript used), $$K_{j,m}^\phi = Z_{k,m}^2 \cdot \sin(\xi_{k,m} - \xi_{min}) \cdot \sigma_\phi^2 \text{ when } \xi_{k,m} > \xi_{min}, \text{ and}$$

$$K_{j,m}^\phi = 0 \text{ when } \xi_{k,m} \leq \xi_{min},$$

where $Z_{k,m}^2$, $\xi_{k,m}$ and $\xi^B_{min}$ are as they are above, and where $\sigma_\phi^2$ is the variance of the code measurements ($\sigma_\phi \approx 1$ mm).

When the magnitudes of either of weight coefficients $K_{j,m}^{\gamma B}$ or $K_{j,m}^{\gamma R}$ is less than a first selected small threshold value, the value of $K_{j,m}^\gamma$ is generated as a first small number which is less than the first threshold value. This is equivalent to setting $(K_{j,m}^\gamma)^{-1}$ to a large number equal to the inverse of the first small number. Similarly, when the magnitudes of either of weight coefficients $K_{j,m}^{\phi B}$ or $K_{j,m}^{\phi R}$ is less than a second selected small threshold value, the value of $K_{j,m}^\phi$ is generated as a second small number which is less than the second threshold value. This is equivalent to setting $(K_{j,m}^\phi)^{-1}$ to a large number equal to the inverse of the second small number.

In some instances, satellite signals are blocked from view and should be excluded from the ambiguity resolution process. The elements of the covariance matrix $R_j$ corresponding to these satellite signals are replaced by a very large number. The very large number is selected in advance, and has a value which exceeds by several orders of magnitude the nominal values of the covariance matrix components $(K_j^\gamma)^{-1}$ or $(K_j^\phi)^{-1}$ encountered during operation. Consequently, in further computations, the weights of all measurements relating to these channels become so small that they do not influence the result.

As a more simple approach, but currently less preferred, one can use the following form of covariance matrix $R_j$, or a scaled version thereof:

$$R_j = \begin{bmatrix} \frac{1}{\sigma_\gamma^2} \cdot I_{n \times n} & 0_{n \times n} \\ 0_{n \times n} & \frac{1}{\sigma_\phi^2} \cdot I_{n \times n} \end{bmatrix}.$$

This form gives an equal weighting of $1/\sigma_\gamma^2$ of to the rows of pseudorange data provided by $\Delta\gamma_j$, and an equal weighting of $1/\sigma_\phi^2$ to the rows of phase data provided by $\Delta\phi_j$. When a satellite is blocked from view or not visible, the elements of the covariance matrix $R_j$ corresponding to the satellite are preferably replaced by a very large number, as described above.

Central Aspects of the Present Invention

Summarizing equation (19), the linearized measurement model at the j-th epoch takes the form:

$$H_j^\mu A_j = \mu_j, \quad A_j = \begin{pmatrix} \Delta x_j \\ \Delta y_j \\ \Delta z_j \\ c \cdot \Delta \tau_j \\ N_j \end{pmatrix} = \begin{pmatrix} a_j \\ N_j \end{pmatrix} \quad (26)$$

We expect that the vector of floating ambiguities $N_j$ will be constant in time, and therefore we will drop the subscript index j. Instead, we will denote $N_j$ the evaluation of N obtained through the epoch from 1 to j.

Generation of the Floating Ambiguity Estimations

We create the following scalar quantity J in equation (27) which integrates the minimization of equation (26) with the minimization of the truncated cost functions $F_k$ for the constrained distance condition (if used) according to equations (21)–(23):

$$J = \frac{1}{2} \sum_{k=1}^{j} \|H_k^\mu A_k - \mu_k\|_{R_k^{-1}}^2 + q \sum_{k=1}^{j} F_k \quad (27)$$

$$= \frac{1}{2} \sum_{k=1}^{j} \|Q_k a_k + G \cdot N - \mu_k\|_{R_k^{-1}}^2 +$$

$$q \sum_{k=1}^{j} \left( a_k^T h_k + \frac{1}{2} a_k^T S_k a_k \right) \to \min$$

As mentioned above, q is a scalar weighting factor (penalty parameter) which is equal to or greater than 0 ($q \geq 0$). We seek to minimize J in value in order to obtain $a_k$, k=1, ..., j and N. The minimization of scalar J essentially seeks to minimize the errors in the individual forms of $\|H_k^\mu \cdot A_k - \mu_k\|^2$ and conditions (11), if applicable, for data of all of the j epochs being considered, but with the constraint that floating ambiguity vector N in each individual state vector $A_k$ be the same. The individual vectors $a_k$ are allowed to have different values. If the fixed distance constraint between rover and base stations is not considered to be present, then cost function $F_k$ is omitted from equation (27), and all following equations based on equation (27). This may be simply done by setting weighting parameter q=0. If the fixed distance constraint is used, values for the weighting parameter q can range from approximately 0.5 to approximately 4, with a typical range being between approximately 1 and approximately 3. The best value of q often depends upon the amount of noise in the signals and the receivers, and can be found by trying several values within the above ranges (i.e., fine tuning). The inventors have found a value of q=2 to be useful for their test applications. In the case where the distance between the receivers is constrained to a fixed value, we emphasize that the use of the cost function qF is optional, and that one is not required to use it. Using the methods of the present invention without the cost function qF will still provide estimates of the floating ambiguities. The inclusion of the cost function qF generally enables more accurate estimates.

The inventors have discovered that a set of N which minimizes scalar J can be found by solving the following block linear system for the set N, which is a vector.

$$\begin{bmatrix} Q_1^T R_1^{-1} Q_1 + qS_1 & O & \cdots & O & Q_1^T R_1^{-1} G \\ O & Q_2^T R_2^{-1} Q_2 + qS_2 & \cdots & O & Q_2^T R_2^{-1} G \\ \vdots & \vdots & \ddots & \vdots & \vdots \\ O & O & \cdots & Q_j^T R_j^{-1} Q_j + qS_j & Q_j^T R_j^{-1} G \\ \hline G^T R_1^{-1} Q_1 & G^T R_2^{-1} Q_2 & \cdots & G^T R_j^{-1} Q_j & \sum_{k=1}^{j} G^T R_k^{-1} G \end{bmatrix} \begin{bmatrix} a_1 \\ a_2 \\ \vdots \\ a_j \\ \hline N \end{bmatrix} = \begin{bmatrix} Q_1^T R_1^{-1} \mu_1 - qh_1 \\ Q_2^T R_2^{-1} \mu_2 - qh_2 \\ \vdots \\ Q_j^T R_j^{-1} \mu_j - qh_j \\ \hline \sum_{k=1}^{j} G^T R_k^{-1} \mu_k \end{bmatrix} \quad (28)$$

To the inventors' knowledge, the form of scalar J provide by equation (27) and form of the linear system provided by equation (28) are not found in the prior art. While it is preferred to use the weighting matrices R and their inverse matrices, it may be appreciated that the present invention can be practiced without them. In the latter case, each weighting matrix R may be replaced by an identity matrix of similar dimension in Equation (28) and the following equations; each inverse matrix $R^{-1}$ is similarly replaced by an identity matrix.

The inventors have further constructed an inverse matrix for the block matrix on the left-hand side of the equation (28), and from this inverse matrix have found a form of N which satisfies equation (28) as follows:

$$N = \begin{bmatrix} \sum_{k=1}^{j} (G^T R_k^{-1} G - G^T R_k^{-1} Q_k \\ (Q_k^T R_k^{-1} Q_k + qS_k)^{-1} Q_k^T R_k^{-1} G) \end{bmatrix}^{-1} \times \begin{bmatrix} \sum_{k=1}^{j} (G^T R_k^{-1} \mu_k - G^T R_k^{-1} Q_k \\ (Q_k^T R_k^{-1} Q_k + qS_k)^{-1} (Q_k^T R_k^{-1} \mu_k - qh_k)) \end{bmatrix}, \quad (29)$$

where this form comprises an n×n inverse matrix multiplying an n×1 vector. In the discussion that follows, we will identify the n×n inverse matrix as $M^{-1}$ and the n×1 vector as B, with $N = M^{-1} B$. The above form may be more simply expressed if we form a matrix matrix $P_k$ for the data of the k-th time moment in the following form:

$$P_k = R_k^{-1} - R_k^{-1} Q_k (Q_k^T R_k^{-1} Q_k + qS_k)^{-1} Q_k^T R_k^{-1}$$

and a vector:

$$g_k = G^T R_k^{-1} Q_k (Q_k^T R_k^{-1} Q_k + qS_k)^{-1} h_k$$

With matrix $P_k$, equation (29) may now be written as:

$$N = \left[ \sum_{k=1}^{j} (G^T P_k G) \right]^{-1} \times \left[ \sum_{k=1}^{j} (G^T P_k \mu_k + qg_k) \right] \quad (30)$$

We refer to $P_k$ as a projection-like matrix for q=0 and a quasi-projection matrix for q>0. Each component matrix $$G^T P_k G \text{ of } M = \left[ \sum_{k=1}^{j} (G^T P_k G) \right]$$

is symmetric positive definite and may be inverted. Moreover, a matrix comprised of a summation of symmetric positive definite matrices is also symmetric positive definite. Thus, matrix M is symmetric positive definite and can be inverted. In preferred implementations of the present invention, the inverse of M is not directly computed. Instead, a factorization of M into a lower triangular matrix L and an upper triangular matrix U is produced as follows: M=LU. Several different factorizations are possible, and L and U are not unique for a given matrix M. The LU factorization of matrix M enables us to compute the floating ambiguities N through a sequence of forward and reverse substitutions. These substitutions are well known to the art (cf any basic text on numerical analysis or matrix computations). With symmetric positive definite matrices, one may choose L and U such that $U = L^T$, which gives a factorization of $M = LL^T$. This is known as the Cholesky factorization, and it generally has low error due to numerical rounding than other factorizations.

With N being generated from this form, the inventors have further found that each individual vector $a_k$ can be generated according to the following form:

$$a_k = (Q_k^T R_k^{-1} Q_k + qS_k)^{-1} (Q_k^T R_k^{-1} (\mu_k - GN) - qg_k). \quad (31)$$

The generation of the individual vectors $a_k$ is optional to the process of generating a set of floating ambiguities N. However, when using cost function F(*) and equations (22) and (23), one can generate $a_k$ in order to update $r_k$. The forms of N and $a_k$ which the inventors have discovered enable one to generate a vector N without having to first generate the individual vectors $a_k$.

When using the cost function F(*), $S_k$ and $h_k$ (and $g_k$ which is derived from $h_k$ and $S_k$), an estimate of the baseline vector $r_k$ at time moment "k" has to be generated. As indicated by equations (22) and (23), both $S_k$ and $h_k$ depend upon $L_{RB}$, which does not normally change, and upon $r_k$, which can change and often does change. For generating $S_k$ and $h_k$, it is usually sufficient to use an estimate of $r_k$, which we denote at $r_k'$ and which may be provided by the user or general process that is using the present invention. As part of generating the calculated distances $D_k^R$ and $D_k^B$, the user or general process uses the estimated position of the rover and the known or estimated position of the base station. An estimate $r_k'$ can be generated by subtracting the position of the base station from the estimated position of the rover. If desired, one can refine the estimate by generating $a_k$ from equation (31), and then using the combination $(r_k' + a_k)$ as a more refined estimate of $r_k$ in generating $S_k$ and $h_k$. To do this, one may first generate an estimate N' to N by using equation (30) with $S_k = 0$ and $g_k = 0$. Then equation (31) can be evaluated using N=N', $S_k = 0$, and $g_k = 0$ to generate refined baseline vectors $r_k = (r_k' + a_k)$, and initial values of $S_k'$, $h_k'$, and $g_k'$. Equation (30) is then again evaluated using the initial values $S_k'$, $h_k'$, and $g_k'$ for $S_k$, $h_k$, and $g_k$, respectively. The process may be repeated again. To speed convergence, one can consider using prior values of $S_k'$ and $g_k'$ in generating $a_k$ for k>1 as follows:

$$a_k = (Q_k^T R_k^{-1} Q_k + qS_{k-1})^{-1}(Q_k^T R_k^{-1}(\mu_k - GN') - qg_{k-1}).$$

First Exemplary Set of Method Implementations of the Present Invention

The inventors have discovered a number of ways to employ the form of N provided by Equation (30). For post-processing application, the satellite data may be collected for a plurality j of time moments, the matrices $R_k$ and $Q_k$ (and optionally $S_k$) and the vectors $\mu_k$ (and optionally $h_k$ and $g_k$) for each k-th time moment may then be computed, and the n×n inverse matrix $M^{-1}$ and the n×1 vector B may then be generated and thereafter multiplied together to generate the vector N. The plurality of time moments may be spaced apart from one another by equal amounts of time or by unequal amounts of time. As indicated above, instead of generating the inverse matrix $M^{-1}$, one may generate the LU factorization of M and perform the forward and reverse substitutions. The factorization-substitution process is faster than generating the inverse matrix, and more numerically stable than most matrix inversion processes. If necessary, Equations (30) and (31) may be iterated as described above until convergence for significantly nonlinear dependency of quantities in equations (22) and (23) on the Rover position.

For real-time applications, $M^{-1}$ and B may be initially computed at a first time moment from a first set of data (e.g., $R_1$, $Q_1$, $\mu_1$, $R_2$, $Q_2$, $\mu_2$) and then recomputed at subsequent time moments when additional data becomes available. For instance, we can initially compute M and B based on l time moments k=1 to k=l as follows:

$$M_l = \left[\sum_{k=1}^{l}(G^T P_k G)\right] \quad (31A)$$

$$B_l = \left[\sum_{k=1}^{l}(G^T P_k \mu_k + qg_k)\right], \quad (31B)$$

where the subscript "l" has been used with $M_l$ and $B_l$ to indicate that they are based on the l time moments k=1 to k=l. The floating ambiguity may then be computed from $N_l = [M_l^{-1}] \cdot B_l$, using matrix inversion or LU-factorization and substitution. Data from the next time moment l+1 can then be used to generate the updated quantities $M_{l+1}$ and $B_{l+1}$ as follows using the previously computed quantities $M_l$ and $B_l$:

$$M_{l+1} = M_l + G^T P_{l+1} G \quad (31C)$$

$$B_{l+1} = B_l + G^T P_{l+1} \mu_{l+1} + qg_{l+1}, \quad (31D)$$

With an updated set of floating ambiguities being computed from $N_{l+1} = [M_{l+1}]^{-1} B_{l+1}$, using matrix inversion or LU-factorization and substitution. It may be appreciated that the above forms of $M_{l+1}$ and $B_{l+1}$ may be employed recursively (e.g., iteratively) in time to compute updated floating ambiguities $N_{l+1}$ from previously-computed values of the quantities $M_l$ and $B_l$ as satellite data is collected. The recursion may be done with each recursive step adding data from one epoch, or with each recursive step adding data from multiple epochs, such as provided by the following forms:

$$M_m = M_l + \left[\sum_{k=l+1}^{k=m}(G^T P_k G)\right] \quad (31E)$$

$$B_m = B_l + \left[\sum_{k=l+1}^{k=m}(G^T P_k \mu_k + qg_k)\right], \quad (31F)$$

where $M_l$ and $B_l$ are based upon j time moments, and $M_m$ and $B_m$ are based on these time moments plus the time moments l+1 through to m, where m>l+1. While these recursion methods are preferably applied to real-time applications, it may be appreciated that they may be equally used in post processing applications. Furthermore, while one typically arranges the time moments such that each time moment k+1 occurs after time moment k, it may be appreciated that other ordering of the data may be used, particularly for post processing applications.

Figure 4:
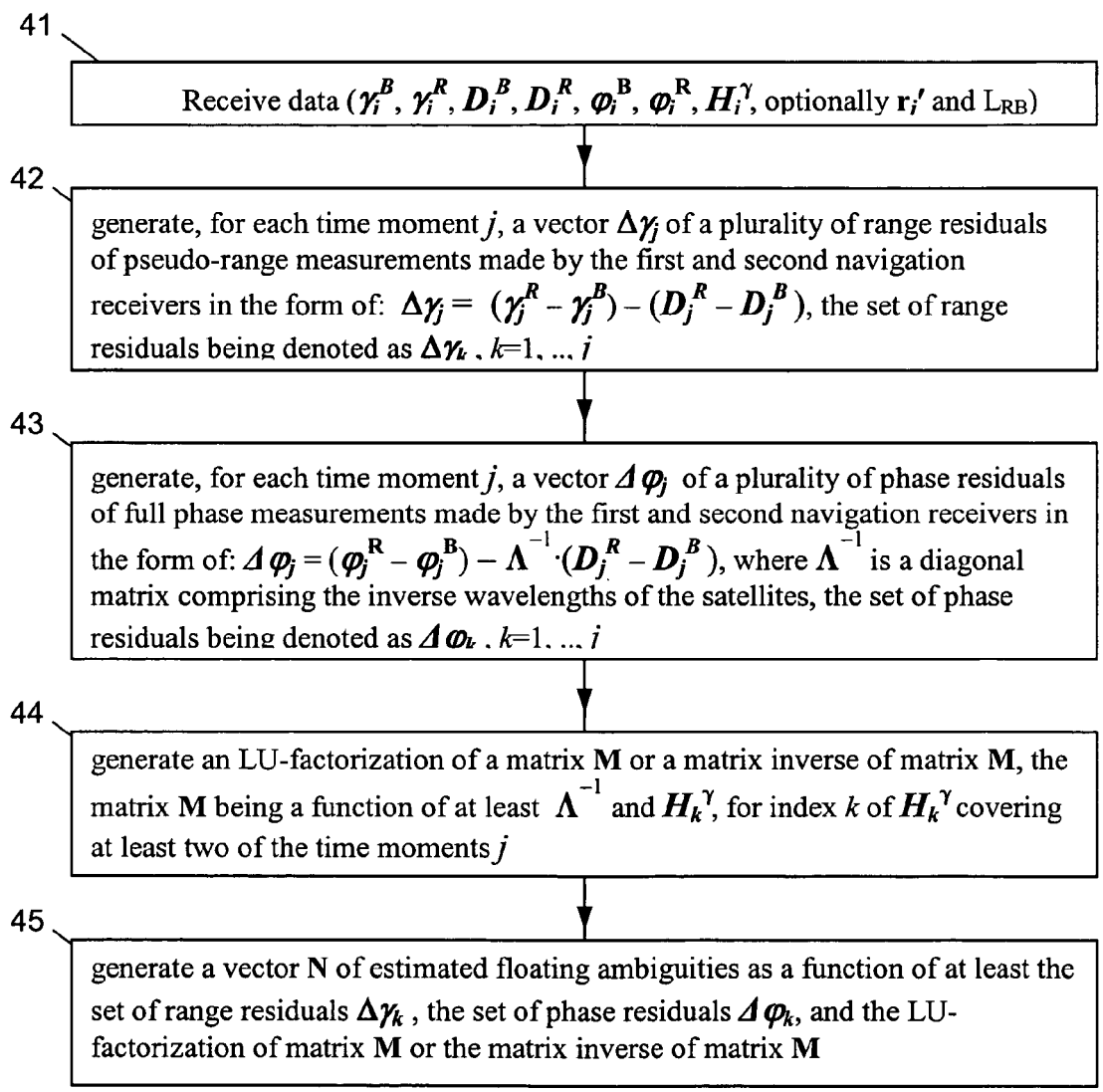
FIG. 4 is a flow diagram illustrating a general set of exemplary embodiments according to the present invention.

The steps of the above method are generally illustrated in a flow diagram 40 shown in FIG. 4. Initially, the data is received (e.g., $\gamma_j^B$, $\gamma_j^R$, $D_j^B$, $D_j^R$, $\phi_j^B$, $\phi_j^R$, $H_j^\gamma$ and optionally $r_j'$ and $L_{RB}$) as indicated at reference number 41. At step 42, the method generates, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$. At step 43, the method generates, for each time moment j, a vector $\Delta\phi_j$ of a plurality of phase residuals of full phase measurements made by the first and second navigation receivers in the form of: $\Delta\phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites, the set of phase residuals being denoted as $\Delta\phi_k$, k=1, . . . , j. At step 44, the method generates an LU-factorization of a matrix M or a matrix inverse of matrix M, the matrix M being a function of at least $\Lambda^{-1}$ and $H_k^\gamma$, for index k of $H_k^\gamma$ covering at least two of the time moments j. Exemplary forms of matrix M have been provided above. At step 45, the method generates a vector N of estimated floating ambiguities as a function of at least the set of range residuals $\Delta\gamma_k$, the set of phase residuals $\Delta\phi_k$, and the LU-factorization of matrix M or the matrix inverse of matrix M. Exemplary forms of vector N have been provided above. If the cost function F(*) is included, then steps 44 and 45 may be reiterated, along with a step of generating $a_k$ for refined estimates of $r_k$, as indicated above.

It may be appreciated that the above steps may be performed other sequences than that specifically illustrated in FIG. 4, as long as the data needed to perform a specific step is available. For example, parts of steps 41, 42, and 43 may be performed as matrix M is being assembled in step 44.

The above method may be carried out on the exemplary apparatus 100 shown in FIG. 5. Apparatus 100 comprises a data processor 110, an instruction memory 112 and data memory 114 for data processor 110, an optional keyboard/display 115 for interfacing between data processor 110 and a human user, and a generalized data portal 120 for receiving the measured data r, $\gamma_j^B$, $\gamma_j^R$, $D_j^B$, $D_j^R$, $\phi_j^B$, $\phi_j^R$, $H_j^\gamma$, and optionally $r_j'$ and $L_{RB}$, each data having been described in detail above. Memories 112 and 114 may be separate, or difference sections of the same memory bank. Generalized data portal 120 may take any number of conventional forms, such as one or more input/output ports, or one or more files stored on disk, tape, non-volatile memory, volatile memory, or other forms of computer readable medium. The data can be placed in data portal 120 by any number of means, such as by a user of the apparatus, or by a more general apparatus that utilizes the apparatus of the present invention in carrying out its functions (such as, for example, computing precise estimates of the position of the rover or the coordinates of the baseline vector). In the former case, the keyboard/display 115 may be used to receive information from the user as to when new data has been provided to data portal 120 (this may be useful in post-processing applications). In the latter case, a more general apparatus may comprise the rover station (including receiver channels such as that shown in FIG. 1) and radio transceiver for receiving data from the base station. In the case that both the base and rover stations are located on the same vessel, the more general apparatus may comprise the base and rover stations.

Data processor 110 may be configured to implement the above-described method embodiments, such as exemplified by the steps in FIG. 4, by running under the direction of a computer product program present within instruction memory 112. An exemplary computer program product 60 is illustrated in FIG. 6. Computer program product 60 may be stored on any computer-readable medium and then loaded into instruction memory 112 as needed. Instruction memory 112 may comprises a non-volatile memory, a programmable ROM, and hard-wired ROM, or a volatile memory.

Computer program produce 60 comprises five instruction sets. Instruction Set #1 directs data processor 110 to receive the measured data from data portal 120. The measured data from portal 120 may be loaded into data memory 114 by Instruction Set #1. As another implementation, the data may be loaded into memory 114 by subsequent instruction sets as the data is needed. In the latter case, Instruction Set #1 can take the form of a low-level I/O routine that is called by the other instruction sets as needed. As such, data portal 120 and data processor 110 under the direction of instruction set #1 provide means for receiving the measured data for apparatus 100. Instruction Set #2 directs data processor to generate, for each time moment j, a vector $\Delta\gamma_j$ of a plurality of range residuals of pseudo-range measurements made by the first and second navigation receivers in the form of: $\Delta\gamma_j=(\gamma_j^R-\gamma_j^B)-(D_j^R-D_j^B)$. As such, data processor 110 under the direction of instruction set #2 provides means for generating the range residuals $\Delta\gamma_j$ for apparatus 100. Instruction Set #3 directs data processor 110 to generate, for each time moment j, a vector $\Delta\phi_j$ of a plurality of phase residuals of full phase measurements made by the first and second navigation receivers in the form of: $\Delta\phi_j=(\phi_j^R-\phi_j^B)-\Lambda^{-1}\cdot(D_j^R-D_j^B)$, where $\Lambda^{-1}$ is a diagonal matrix comprising the inverse wavelengths of the satellites. As such, data processor 110 under the direction of instruction set #3 provides apparatus 100 with means for generating the phase residuals $\Delta\phi_j$. The residuals may be stored in data memory 114.

Instruction Set #4 directs data processor 110 to generate an LU-factorization of matrix M or a matrix inverse of matrix M, the matrix M being a function of at least $\Lambda^{-1}$ and $H_k^\gamma$, for index k of $_H\gamma$ covering at least two of the time moments j. Exemplary forms of matrix M have been provided above. Matrix M and its LU-factorization or inverse may be stored in data memory 114. As such, data processor 110 under the direction of instruction set #4 provide apparatus 100 with means for generating matrix M and its LU-factorization or inverse. Finally, instruction Set #5 directs data processor 110 to generate a vector N of estimated floating ambiguities as a function of at least the set of range residuals $\Delta\gamma_k$, the set of phase residuals $\Delta\phi_k$, and the LU-factorization of matrix M or the matrix inverse of matrix M. Exemplary forms of vector N have been provided above.

Vector N may be stored in data memory 114. As such, data processor 110 under the direction of instruction set #5 provide apparatus 100 with means for generating an vector N, which is an estimate of the floating ambiguities.

The resulting estimates provided by vector N may be outputted on keyboard/display 115, or may be provided to the more general process through data portal 120 or by other transfer means (such as by memory 114 if data processor 110 is also used to implement the more general process).

Second Exemplary Set of Method Implementations of the Present Invention

The inventors have developed additional recursive methods that are generally better suited to real-time applications. The second exemplary set of methods generally facilitate implementations which require less memory storage space and fewer computations. We previously defined a projection-like matrix $P_k$ for the data of the k-th time moment as follows:

$$P_k=R_k^{-1}-R_k^{-1}Q_k(Q_k^TR_k^{-1}Q_k+qS_k)^{-1}Q_k^TR_k^{-1}. \tag{32}$$

Equation (32) was then applied to the form of equation (30) to provide the form:

$$N_j = \left[\sum_{k=1}^{j}(G^TP_kG)\right]^{-1}\left[\sum_{k=1}^{j}(G^TP_k\mu_k+qg_k)\right], \tag{33A}$$

where M and B are identified in the forms of:

$$M_j = \left[\sum_{k=1}^{j}(G^TP_kG)\right] \text{ and } B_j = \left[\sum_{k=1}^{j}(G^TP_k\mu_k+qg_k)\right]. \tag{33B}$$

The forms of equations (33B) can be expressed in the following recursion form:

$$M_j=M_{j-1}+G^TP_jG \text{ and } B_j=B_{j-1}+G^TP_j\mu_j+qg_j \tag{34}$$

Then $$N_j=(M_{j-1}+G^TP_jG)^{-1}(B_{j-1}+G^TP_j\mu_j+qg_j) \tag{35A}$$

noting that $N_j=[M_j]^{-1}B_j$ for the data from time moments 1 through j, we can write $N_{j-1}=[M_{j-1}]^{-1}B_{j-1}$ for the data from time moments 1 through j−1. The latter can be rearranged as $M_{j-1}N_{j-1}=B_{j-1}$ and used to substitute for the term $B_{j-1}$ in equation (35A) to provide:

$$N_j=(M_{j-1}+G^TP_jG)^{-1}(M_{j-1}N_{j-1}+G^TP_j\mu_j+qg_j) \tag{35B}$$

To equation (35B), we now add and subtract the term $G^TP_jGN_{j-1}$ from the second bracketed quantity to obtain:

$$N_j=(M_{j-1}+G^TP_jG)^{-1}(M_{j-1}N_{j-1}+G^TP_jGN_{j-1}-G^TP_jGN_{j-1}+G^TP_j\mu_j+qg_j) \tag{35C}$$

Noting that the first two terms of the second bracketed quantity can be factored as $(M_{j-1}+G^TP_jG)N_{j-1}$ and that the factor $(M_{j-1}+G^TP_jG)$ is the inverse of the first bracketed quantity in equation (35C), it can be seen that the first bracketed quantity multiplied onto $(M_{j-1}+G^TP_jG)N_{j-1}$ is simply $N_{j-1}$. Therefore, equation (35C) can be simplified as:

$$N_j=N_{j-1}+(M_{j-1}+G^TP_jG)^{-1}(-G^TP_jGN_{j-1}+G^TP_j\mu_j+qg_j) \tag{35D}$$

The second bracketed quantity of equation (35D) can be further simplified as:

$$N_j = N_{j-1} + (M_{j-1} + G^T P_j G)^{-1} (G^T P_j (\mu_j - G N_{j-1}) + q g_j) \quad (35E)$$

Using equation (34) this becomes:

$$N_j = N_{j-1} + M_j^{-1} (G^T P_j (\mu_j - G N_{j-1}) + q g_j) \quad (36)$$

With this, the following recursive method may be used in a real time application:
(1) Generate initial values of $M_0$ and $N_0$, set epoch counter k to zero (k=0).
(2) Increment the epoch counter by one; obtain the data needed to generate the matrices $R_k$ and $Q_k$, and the vector $\mu_k$.
(3) Generate $R_k$ and $Q_k$, and $\mu_k$. If the constant distance constraint is to be used, then also compute $S_k$, $h_k$, and $g_k$, and select a value for q greater than zero; otherwise, set $qS_k=0$ and $qg_k=0$ in steps (4)–(7) below.
(4) Generate $P_k$ in a form equivalent to:

$$P_k = R_k^{-1} - R_k^{-1} Q_k (Q_k^T R_k^{-1} Q_k + q S_k)^{-1} Q_k^T R_k^{-1}.$$

(5A) Generate an LU-factorization of $M_k$, where $M_k$ is in a form equivalent to $M_k = M_{k-1} + G^T P_k G$. Exemplary ways of generating LU factorizations are described in greater detail below.
—OR—
(5B) Generate an inverse matrix $M_k^{-1}$ of $M_k$, where $M_k$ is in a form equivalent to $M_k = M_{k-1} + G^T P_k G$. In general, this approach requires more computation than the approach of step (5A), and is currently the less preferred approach.
(6) Generate $N_k = N_{k-1} + M_k^{-1} (G^T P_k (\mu_k - G N_{k-1}) + q g_k)$. If the inverse matrix $M_k^{-1}$ has been generated according to step (5B), this form may be generated by conventional multiplication of $M_k^{-1}$ onto a vector $F_k$, where $F_k = (G^T P_k (\mu_k - G N_{k-1}) + q g_k)$. If the LU factorization for $M_k$ has been generated according to step (5A), then the quantity $\chi_k = M_k^{-1} (G^T P_k (\mu_k - G N_{k-1}) + q g_k)$ may be generated from a forward and reverse substitution on the form: $L_k U_k \chi_k = F_k$, where $L_k$ is the lower triangular matrix and $U_k$ is the upper triangular matrix of the factorization. The quantity $\chi_k$ is then added to $N_{k-1}$ to form $N_k$.
(7) Optionally generate $a_k = (Q_k^T R_k^{-1} Q_k)^{-1} (Q_k^T R_k^{-1} (\mu_k - G N_k) - q g_k)$
(8) Reiterate steps (2)–(7).

For initial values it is convenient to use $M_0=0$ and $N_0=0$. One can also use satellite data from a single epoch to generate values for $M_0$ and $N_0$ using forms (4), (5A), (7A). This is in fact what is done with the above steps (2)–(6) are performed on the data for the first epoch with $M_0=0$ and $N_{0=0}$. In step (3), if the distance constraint is to be used, one may use $r_k'$ to generate $S_k$, $h_k$, and $g_k$, or one may generate more refined estimate as $(r_k' + a_k)$, with $a_k$ being generated as:

$$a_k = (Q_k^T R_k^{-1} Q_k)^{-1} (Q_k^T R_k^{-1} (\mu_k - G N_{k-1})), \text{ or as}$$

$$a_k = (Q_k^T R_k^{-1} Q_k + q S_{k-1})^{-1} (Q_k^T R_k^{-1} (\mu_k - G N_{k-1}) - q g_{k-1}).$$

During the first few recursion steps, matrix $M_k$ may be ill-conditioned, and thus the generation of the LU factorization or inverse of $M_k$ may incur some rounding errors. This problem can be mitigated by using $R_k = I$ during the few recursions, or using an $R_k$ with more equal weightings between the pseudorange and phase data, and then switching a desired form for $R_k$.

Figure 7:
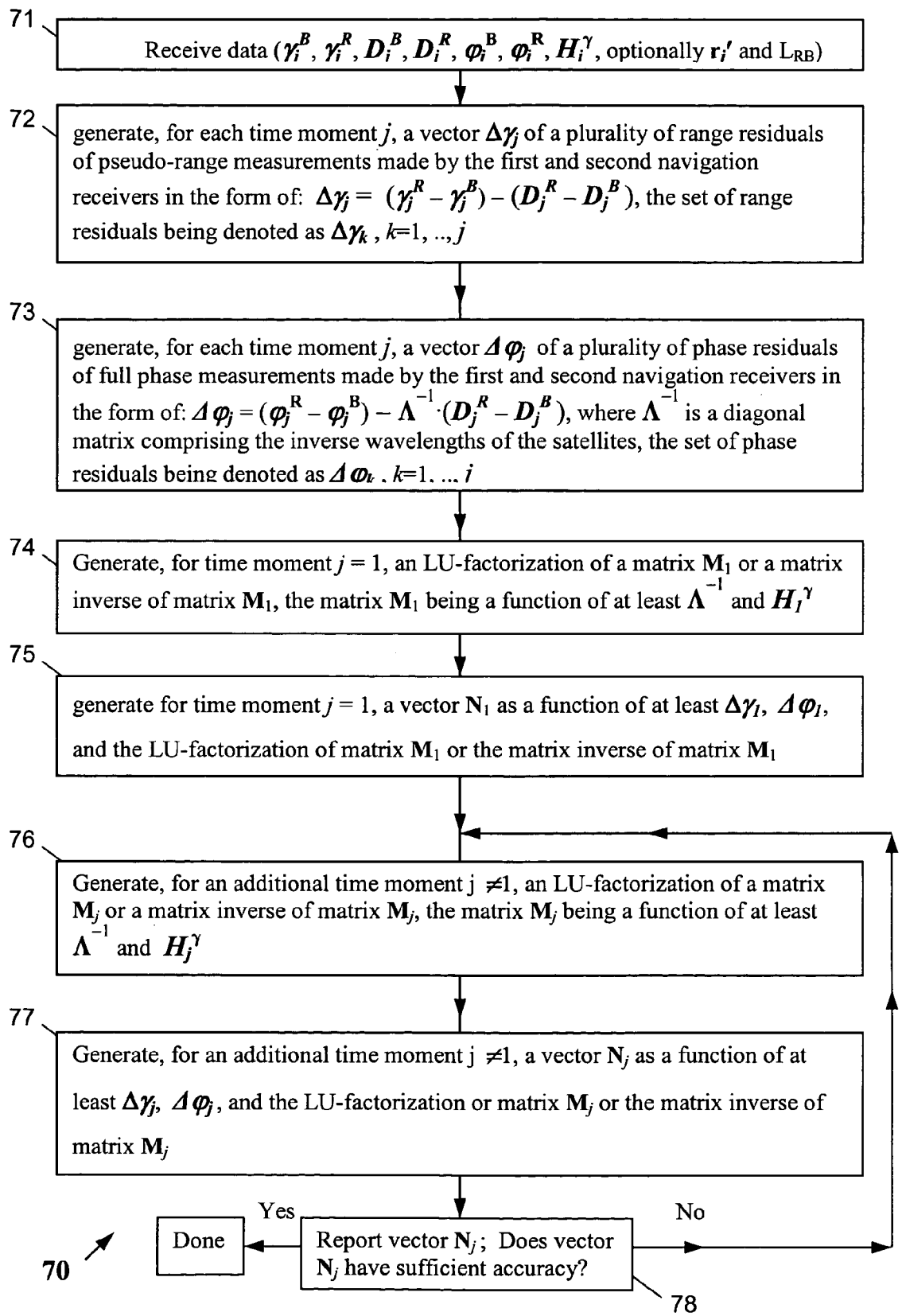
FIG. 7 is a flow diagram illustrating another general set of exemplary embodiments according to the present invention.

The steps of the above method are generally illustrated in a flow diagram 70 shown in FIG. 7. Initially, the data is received (e.g., $\gamma_j^B$, $\gamma_j^R$, $D_j^B$, $D_j^R$, $\phi_j^B$, $\phi_j^R$, $H_j^\gamma$ and optionally $r_j'$ and $L_{RB}$) as indicated at reference number 71. At step 72, the method generates, for each time moment j, a vector $\Delta \gamma_j$ of a plurality of range residuals of pseudo-range measurements made by the first and second navigation receivers in the form of: $\Delta \gamma_j = (\gamma_j^R - \gamma_j^B) - (D_j^R - D_j^B)$. At step 73, the method generates, for each time moment j, a vector $\Delta \phi_j$ of a plurality of phase residuals of full phase measurements made by the first and second navigation receivers in the form of: $\Delta \phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites, the set of phase residuals being denoted as $\Delta \phi_k$, k=1, ..., j.

At step 74, the method generates, for time moment j=1, an LU-factorization of a matrix $M_1$ or a matrix inverse of matrix $M_1$, the matrix $M_1$ being a function of at least $\Lambda^{-1}$ and $H_j^\gamma$. Any of the forms for M described above may be used. At step 75, the method generates, for time moment j=1, a vector $N_1$ as a function of at least $\Delta \gamma_1$, $\Delta \phi_1$, and the LU-factorization of matrix $M_1$ or the matrix inverse of matrix $M_1$. At step 76, the method generates, for an additional time moment $j \neq 1$, an LU-factorization of a matrix $M_j$ or a matrix inverse of matrix $M_j$, the matrix $M_j$ being a function of at least $\Lambda^{-1}$ and $H_j^\gamma$. At step 77, the method generates, for an additional time moment $j \neq 1$, a vector $N_j$ as a function of at least $\Delta \gamma_j$, $\Delta \phi_j$, and the LU-factorization or matrix $M_j$ or the matrix inverse of matrix $M_j$. At step 78, the estimated ambiguity vector $N_j$ is reported. If the estimated ambiguity vector has not achieved sufficient accuracy, as set by the user, steps 76 and 77 are repeated, with steps 76–78 forming a loop. If the estimated ambiguity vector has achieved a sufficient degree of accuracy, or it steps 76–78 have been repeated for a maximum number of times set by the user, the process is ended. If the cost function F(*) is included, then step 76 may include the generation of $a_k$ for refined estimates of $r_k$, as indicated above.

It may be appreciated that the above steps may be performed other sequences than that specifically illustrated in FIG. 7, as long as the data needed to perform a specific step is available. For example, parts of steps 71–73 may be performed as matrix $M_1$ is being assembled in step 74, and as matrix $M_j$ is being assembled in step 76. It may also be appreciated that the data set provided to the process may span several tens of time moments to several thousands of time moments, and that the time moment j=1 illustrated above may correspond to any of the time moments in the data set, not just the earliest time moment or the first received time moment. It may also be appreciated that steps 74–75 may generated their respective M matrices and N vectors from data measured over two or more time moments as discussed above with regard to equations (31A)–(31F), as well as just one time moment, and that steps 76–77 may generated their respective M matrices and N vectors from data measured over two or more time moments as discussed above with regard to equations (31A)–(31F), as well as just one time moment. It may be further appreciated that appropriate ones of the appended claims are intended to cover these possibilities.

The above method embodiments may be carried out on the exemplary apparatus 100 shown in FIG. 5, using a different set of instructions in memory 112. Specifically, data processor 110 may be configured to implement the above-described method embodiments exemplified by the steps in FIG. 7, by running under the direction of a computer product program present within instruction memory 112. An exemplary computer program product 80 is illustrated in FIG. 8.

Computer program product 80 may be stored on any computer-readable medium and then loaded into instruction memory 112 as needed. Instruction memory 112 may comprises a non-volatile memory, a programmable ROM, and hard-wired ROM, or a volatile memory.

Computer program produce 80 comprises eight instruction sets. Instruction Set #1 directs data processor 110 to receive the measured data from data portal 120. The measured data from portal 120 may be loaded into data memory 114 by Instruction Set #1. As another implementation, the data may be loaded into memory 114 by subsequent instruction sets as the data is needed. In the latter case, Instruction Set #1 can take the form of a low-level I/O routine that is called by the other instruction sets as needed. As such, data portal 120 and data processor 110 under the direction of instruction set #1 provide means for receiving the measured data for apparatus 100. Instruction Set #2 directs data processor to generate, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$. As such, data processor 110 under the direction of instruction set #2 provides means for generating the range residuals $\Delta\gamma_j$ for apparatus 100. Instruction Set #3 directs data processor 110 to generate, for each time moment j, a vector $\Delta\phi_j$ of a plurality of phase residuals of full phase measurements made by the first and second navigation receivers in the form of: $\Delta\phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites. As such, data processor 110 under the direction of instruction set #3 provides apparatus 100 with means for generating the phase residuals $\Delta\phi_j$. The residuals may be stored in data memory 114.

Instruction Set #4 directs data processor 110 to generate, for time moment j=1, an LU-factorization of a matrix $M_1$ or a matrix inverse of matrix $M_1$, the matrix $M_1$ being a function of at least $\Lambda^{-1}$ and $H_1$ and $H_1^\gamma$. Exemplary forms of matrix $M_1$ have been provided above. Matrix $M_1$ and its LU-factorization or inverse may be stored in data memory 114. As such, data processor 110 under the direction of instruction set #4 provide apparatus 100 with means for generating matrix $M_1$ and its LU-factorization or inverse. Instruction Set #5 directs the data processor 110 to generate, for time moment j=1, an estimated ambiguity vector $N_1$ as a function of at least $\Delta\gamma_1$, $\Delta\phi_1$, and the LU-factorization of matrix $M_1$ or the matrix inverse of matrix $M_1$. Exemplary forms of vector $N_1$ have been provided above. Vector $N_1$ may be stored in data memory 114. As such, data processor 110 under the direction of instruction set #5 provide apparatus 100 with means for generating an vector $N_1$, which is an estimate of the floating ambiguities.

Instruction Set #6 directs data processor 110 to generate, for one or more additional time moments j≠1, an LU-factorization of a matrix $M_j$ or a matrix inverse of matrix $M_j$, the matrix $M_j$ being a function of at least $\Lambda^{-1}$ and $H_j^\gamma$. Exemplary forms of matrix $M_j$ have been provided above. Matrix $M_j$ and its LU-factorization or inverse may be stored in data memory 114. As such, data processor 110 under the direction of instruction set #6 provide apparatus 100 with means for generating matrix $M_j$ and its LU-factorization or inverse. Because of their similar operations, Instruction Set #6 may share or duplicate portions of Instruction Set #4. Instruction Set #7 directs the data processor 110 to generate, for one or more additional time moments j≠1, a vector $N_j$ as a function of at least $\Delta\gamma_j$, $\Delta\phi_j$, and the LU-factorization or matrix $M_j$ or the matrix inverse of matrix $M_j$. Exemplary forms of vector $N_j$ have been provided above. Vector $N_j$ may be stored in data memory 114. As such, data processor 110 under the direction of instruction set #7 provide apparatus 100 with means for generating an vector $N_j$, which is an estimate of the floating ambiguities. Because of their similar operations, Instruction Set #7 may share or duplicate portions of Instruction Set #5.

Instruction Set #8 directs the data processor 110 to report vector $N_j$ as having estimates of the floating ambiguities, and to repeat Instruction Sets #6 and #7 if vector does not have sufficient (or desired) accuracy, or if it is desired to keep the process going even through sufficient accuracy has been reached. The resulting estimates provided by vector N may be outputted on keyboard/display 115, or may be provided to the more general process through data portal 120 or by other transfer means (such as by memory 114 if data processor 110 is also used to implement the more general process).

Give the detailed description of the present Specification, it is well within the ability of one skilled in the GPS art to construct all of the above Instruction Sets without undue experimentation, and a detailed code listing thereof is not needed for one of ordinary skill in the art to make and use the present invention.

Methods of LU-Factorization of Matrix M

First Method.

We now discuss methods of LU-factorization for matrix M. The factorization methods may be used in any of the above steps or computer instruction sets where an LU-factorization is generated or where an inverse matrix is generated, such as in step (5A) described above, and also used in step (5B) to construct an inverse matrix for M, although such is computationally costly. In one approach of LU-factorization, the matrix $M_{k-1}$ from the previous iteration is retained for the current iteration, and $G^T P_k G$ from the current iteration is added to it to form the matrix $M_k$ for the current iteration of step (5B). Then, any LU-factorization method may be used to find a lower triangular matrix $L_k$ and an upper triangular matrix $U_k$ which satisfies $M_k = L_k U_k$. Since $M_k$ is symmetric positive definite, the Cholesky method may be used. This method has good numerical stability, and generates upper triangular matrix $U_k$ such that it equals the transpose of lower triangular matrix $L_k$: $U_k = L_k^T$. With this factorization, $M_k = L_k L_k^T$. The standard Cholesky method requires a square-root operation for each row of the matrix (n rows requires n square-root operations). Such operations may be difficult or time consuming to perform on mid-range processor chips. A modification of the Cholesky method developed by Wilkinson and Reinsch may be used to avoid these square-root operations. In this method, the factorization of $M_k = LDL^T$ is used, where D is a diagonal matrix. We refer readers who are not familiar with this area of the art to the following references for further information:

1. Kendall E. Atkinson, *An Introduction to Numerical Analysis*, publisher: John Wiley & Sons, 1978, pages 450–454;
2. J. Wilkinson and C. Reinsch, *Linear Algebra, Handbook for Automatic Computation*, Vol. 2, publisher: Springer-Verlag, New York, 1971, pages 10–30;
3. Gene Golub and Charles Van Loan, *Matrix Computations*, publisher: The Johns Hopkins University Press, Baltimore, Md., pages 81–86.

The above described main instruction sets that generate LU factorizations of matrix M can be constructed to include instructions that direct data processor 110 to carry out the above forms of Cholesky factorization of matrix M under this first method. The combination of these instructions and data processor 110 provides apparatus 100 with means for performing the Cholesky factorizations.

Second Method.

Instead of using the modified Cholesky method, the following method developed by the inventors may be used. The inventors currently prefer this method. Given that we have generated the previous factorization $M_{k-1}=L_{k-1}L_{k-1}^T$, we generate a factorization $T_k T_k^T$ for the quantity $G^T P_k G$ as follows: $T_k T_k^T = G^T P_k G$. Later, we will describe how this factorization $T_k T_k^T$ may be generated. Using $T_k T_k^T = G^T P_k G$, the factorization $L_k L_k^T$ of $M_k$ may be written as:

$$L_k L_k^T = L_{k-1} L_{k-1}^T + T_k T_k^T. \tag{37}$$

It is known in the matrix computation art that the product of two n×n matrices X and Y is equal to the sum of the outer products of the columns of these matrices, as specified below:

$$XY^T = \sum_{s=1}^{n} x_s y_s^T, \tag{38}$$

where $\{x_1, x_2, \ldots, x_n\}$ are the columns of matrix X, and where $\{y_1, y_2, \ldots, y_n\}$ are the columns of matrix Y. The inventors have applied this general knowledge to their development of the invention to recognize that $$T_k T_k^T = \sum_{s=1}^{n} t_{k,s} t_{k,s}^T, \tag{39}$$

where $\{t_{k,1}, t_{k,2}, \ldots, t_{k,n}\}$ are the columns of matrix $T_k$. Each outer product $t_{k,s} t_{k,s}^T$ is an n×n matrix of rank one. It is known from the article entitled "Methods for Modifying Matrix Factorizations" by P. E. Gill, G. H. Golub, W. Murray, and M. A. Saunders (Mathematics of Computation, Vol. 28, No. 126, April 1974, pp. 505–535) that when a rank-one matrix of the form $z\, z^T$ is added to a symmetric positive definite matrix A, a previously computed Cholesky factorization of matrix A may be modified with a relatively few number of computations (much less than the number of computations need to generate a factorization of $A+z\, z^T$). The inventors have further recognized that performing n such rank-one modifications on the previous factorization $L_{k-1} L_{k-1}^T$ for $M_{k-1}$ using $z\, z^T = t_{k,s} t_{k,s}^T$ for s=1 to s=n would also require less computations and would have better accuracy that a new factorization for $M_k$.

Let us illustrate this approach by first defining a set of intermediate factorization matrices $\tilde{L}_1, \tilde{L}_2, \ldots, \tilde{L}_n$, each of which has the same dimensions as $L_{k-1}$ and $L_k$. We now go through a sequence of n rank-one modifications which will sequentially generate the matrices $\tilde{L}_1$ through $\tilde{L}_n$, with the last matrix $\tilde{L}_n$ being in a form which is substantially equal to the desired factorization $L_k$. The first rank-one modification starts with any of the matrices $t_{k,s} t_{k,s}^T$. Without loss of generality, we will start with s=1 in order to simplify the presentation. We then write:

$$\tilde{L}_1 \tilde{L}_1^T = L_{k-1} L_{k-1}^T + t_{k,1} t_{k,1}^T \tag{40}$$

which can be factored as:

$$\tilde{L}_1 \tilde{L}_1^T = L_{k-1}(I+c_1 c_1^T) L_{k-1}^T, \tag{41}$$

where vectors $c_1$ and $t_{k,1}$ are related to one another as follows: $L_{k-1}^T c_1 = t_{k,1}$. Vector $c_1$ is readily obtained from vector $t_{k,1}$ with a forward substitution process with the previously computed matrix $L_{k-1}$, since $L_{k-1}$ is lower triangular. Then, the above reference by Gill, et al. teaches how to readily obtain a Cholesky factorization of $(I+c_1 c_1^T)$, which we denote here as $\overline{L}_1 \overline{L}_1^T$. The reader is referred to that reference, as well any other references teaching such factorizations, for the implementation details. From this it can be seen that the form of equation (35) becomes:

$$\tilde{L}_1 \tilde{L}_1^T = L_{k-1}(\overline{L}_1 \overline{L}_1^T) L_{k-1}^T, \tag{42}$$

and thus $\tilde{L}_1 = L_{k-1} \overline{L}_1$. The multiplication of two lower triangular matrices is relatively easy to perform and computationally inexpensive.

We now perform the second rank-one modification using rank-one modification the matrix $t_{k,2} t_{k,2}^T$ (s=2) in a similar manner by writing:

$$\tilde{L}_2 \tilde{L}_2^T = \tilde{L}_1 \tilde{L}_1^T + t_{k,2} t_{k,2}^T \tag{43}$$

which can be factored as:

$$\tilde{L}_2 \tilde{L}_2^T = \tilde{L}_1 (I+c_2 c_2^T) \tilde{L}_1^T, \tag{44}$$

where vector $C_2$ is generated from $t_{k,2}$ by forward substitution according to: $\tilde{L}_1 c_2 = t_{k,2}$. A Cholesky factorization of $(I+c_2 c_2^T)$ is then obtained, which we denote here as $\overline{L}_2 \overline{L}_2^T$. Thus, $\tilde{L}_2 = \tilde{L}_1 \overline{L}_2$. The recursion process continues in this manner until $\tilde{L}_n$ is computed. The following recursion sequence can be used:

(1) Allocate matrices $\tilde{L}_0, \tilde{L}_1, \tilde{L}_2, \ldots, \tilde{L}_n$, and $\overline{L}_1, \overline{L}_2, \ldots, \overline{L}_n$, and vectors $c_1, c_2, \ldots, c_n$.

(2) Set an index j=1, and set $\tilde{L}_0 = L_{k-1}$.

(3) Repeat the following steps (4)–(7) n times:

(4) Generate vector $c_j$ from vector $t_{k,j}$ by forward substitution according to:

$$\tilde{L}_{j-1} c_j = t_{k,j}.$$

(5) Generate matrix $\overline{L}_j$ as a Cholesky factorization of the quantity $(I+c_j c_j^T)$.

(6) Generate matrix $\tilde{L}_j$ as the matrix multiplication of $\tilde{L}_{j-1}$ and $\overline{L}_j$:

$$\tilde{L}_j = \tilde{L}_{j-1} \overline{L}_j.$$

(7) Increment index j.

(8) Provide $\tilde{L}$ as $L_k$.

Third Method.

Close examination of the second method shows that the following more compact recursion sequence may be used:

(1) Allocate matrices $\tilde{L}$ and $\overline{L}$ and a vectors c.

(2) Set an index j=1, and set $\tilde{L} = L_{k-1}$.

(3) Repeat the following steps (4)–(7) n times:

(4) Generate vector c from $t_{k,j}$ by forward substitution according to: $\tilde{L} c_j = t_{k,j}$.

(5) Generate matrix $\overline{L}$ as a Cholesky factorization of the quantity $(I+cc^T)$.

(6) Generate the matrix multiplication product $\tilde{L}\overline{L}$, and store the result as $\tilde{L}$ (e.g., overwrite the storage location of $\tilde{L}$ with the product $\tilde{L}\overline{L}$).

(7) Increment index j.

(8) Provide $\tilde{L}$ as $L_k$.

The above-described n sequential rank-one modifications require approximately half as many operations as direct re-factorization. In addition, low rank modifications to a matrix factorization are generally more numerically stable than direct re-factorization.

The previously-described main instruction sets that generate LU factorizations of matrix M can be constructed to include instructions that direct data processor 110 to carry out the above forms steps of factorizing matrix M under the above second and third methods. Specifically, there would be a first subset of instructions that direct the data processor to generate an LU-factorization of matrix $M_{j-1}$ in a form equivalent to $L_{j-1} L_{j-1}^T$ wherein $L_{j-1}$ is a low-triangular matrix and $L_{j-1}^T$ is the transpose of $L_{j-1}$. In addition, there would be a second subset of instructions that direct the data processor to generate a factorization of $G^T P_j G$ in a form equivalent to $T_j T_j^T = G^T P_j G$, where $T_j^T$ is the transpose of $T_j$ (examplary methods for this are described below). There would also be a third subset of instructions that direct the data processor to generate an LU-factorization of matrix $M_j$ in a form equivalent to $L_j L_j^T$ from a plurality n of rank-one modifications of matrix $L_{j-1}$, as described above, each rank-one modification being based on a respective column of matrix $T_j$, where n is the number of rows in matrix $M_j$. The combination of these subsets of instructions and data processor 110 provides apparatus 100 with means for performing the above tasks.

Generation of Matrix $T_k$

The last two factorization methods requires finding $T_k T_k^T = G^T P_k G$ so that the column vectors $t_{k,s}$ may be used. One can use the Cholesky factorization method to generate $T_k$ since $G^T P_k G$ is symmetric positive definite (we call this the first method of generating matrix $T_k$). The above second subset of instructions be constructed to include further instructions that direct data processor 110 to carry out the any form of Cholesky factorization of $G^T P_k G$. to generate $T_k$. The combination of these further instructions and data processor 110 provides apparatus 100 with means for generate matrix $T_j$ from a Cholesky factorization of $G^T P_j G$. However, the inventors have developed the following more efficient second method of generation of matrix $T_k$. It must be noted that this second method of generation of matrix $T_k$ is applicable if the penalty parameter q related to the constant distance constraints defined by equation (11), and appearing starting with the Equation (27), is set to zero. In other words, the second method of generating matrix $T_k$ described below is applicable if the constant distant constraints are not used.

The Second Method of Generating Matrix $T_k$

The second method is based on a novel block Householder transformation of the matrix $G^T P_k G$ which the inventors have developed. This method is based on constraining the weighting matrices $R^\gamma$ and $R^\varphi$ to the following forms that are based on a common weighing matrix W:

$$(R^\gamma)^{-1} = \frac{1}{\sigma_\gamma^2} W, (R^\varphi)^{-1} = \frac{1}{\sigma_\varphi^2 \lambda_{GPS}^2} \Lambda W \Lambda,$$

where $\sigma_\gamma$ and $\sigma_\varphi$ are scalar parameters selected by the user, and where $\lambda_{GPS}^2$ is either the L1-band wavelength or the L2-band wavelength of the GPS system. If all the wavelengths in $\Lambda$ are the same, the above forms reduce to:

$$(R^\gamma)^{-1} = \frac{1}{\sigma_\gamma^2} W, \text{ and } (R^\varphi)^{-1} = \frac{1}{\sigma_\varphi^2} W,$$

With W, $\sigma_\gamma$, $\sigma_\varphi$, $\lambda_{GPS}^2$, $R^\gamma$ and $R^\varphi$ selected, the following steps are employed to generate matrix $T_k$ 1. Generate a scalar b in a form equivalent to:

$$b = \frac{\sigma_\gamma^2 \lambda_{GPS}^2}{\sigma_\gamma^2 + \lambda_{GPS}^2 \sigma_\varphi^2}$$

(in the case of dual band measurements $$b = \frac{\sigma_\gamma^2 \lambda_1^2 \lambda_2^2}{2\sigma_\varphi^2 \lambda_1^2 \lambda_2^2 + \sigma_\gamma^2 \lambda_1^2 + \sigma_\gamma^2 \lambda_2^2}$$

2. Generate a matrix $\tilde{H}$ in a form equivalent to $\tilde{H} = W^{1/2} H_k$.
3. Generate a Householder matrix $S_{HH}$ for matrix $\tilde{H}$.
4. Generate matrix $T_k$ in a form equivalent to:

$$T_k = \frac{1}{\sigma_\varphi} W^{1/2} S_{HH} \left[ \begin{array}{c|c} \sqrt{\left(1-\frac{b}{\lambda_{GPS}^2}\right)} I_4 & O_{4\times(n-4)} \\ \hline O_{(n-4)\times 4} & I_{(n-4)\times(n-4)} \end{array} \right]$$

or in the case of dual band measurements:

$$T = \frac{1}{\sigma_\varphi} \left[ \begin{array}{c|c} A11 & O_{n\times n} \\ \hline A21 & A22 \end{array} \right],$$

where sub-matrixces A11, A21, and A22 are as follows:

$$A11 = (W^{(1)})^{\frac{1}{2}} S_{HH} \left[ \begin{array}{c|c} \sqrt{1-b/\lambda_1^2} \, I_4 & O_{4\times(n-4)} \\ \hline O_{(n-4)\times 4} & I_{(n-4)} \end{array} \right],$$

$$A21 = (W^{(2)})^{\frac{1}{2}} S_{HH} \left[ \begin{array}{c|c} -\frac{b}{\lambda_1 \lambda_2 \sqrt{1-b/\lambda_1^2}} I_4 & O_{4\times(n-4)} \\ \hline O_{(n-4)\times 4} & O_{(n-4)\times(n-4)} \end{array} \right], \text{ and}$$

$$A22 = (W^{(2)})^{\frac{1}{2}} S_{HH} \left[ \begin{array}{c|c} \sqrt{\frac{1-b/\lambda_1^2}{1-b/\lambda_1^2}} \, I_4 & O_{4\times(n-4)} \\ \hline O_{(n-4)\times 4} & I_{(n-4)} \end{array} \right].$$

The Derivation of this Method is Explained in Appendix A.

The above second subset of instructions be constructed to include further instructions that direct data processor 110 to carry out the above four general step under this second method of generating matrix $T_k$. The combination of these further instructions and data processor 110 provides apparatus 100 with means for generate matrix $T_j$.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

APPENDIX A—Derivation of the Second Method of Generating Matrix T.

To simplify the presentation of this derivation, we take the case of where the measurements are provided in only one GPS frequency band (e.g., L1-band). Generalization to two-band data and multiband data (GLONASS) is straightforward matter. First, let us relate the range weighting matrix $(R^\gamma)^{-1}$ and the phase weighting matrix $(R^\Phi)^{-1}$ to a common weight matrix W and two scalar parameters $\sigma_\gamma$ and $\sigma_\phi$ as follows:

$$(R^\gamma)^{-1} = \frac{1}{\sigma_\gamma^2} W, \text{ and } (R^\varphi)^{-1} = \frac{1}{\sigma_\varphi^2} W,$$

where W is a diagonal positive definite n×n matrix. We now want to look at the block factorization of the component $(Q_k^T R_k^{-1} Q_k)^{-1}$, which is part of $P_k = R_k^{-1} - R_k^{-1} Q_k (Q_k^T R_k^{-1} Q_k)^{-1} Q_k^T R_k^{-1}$. To simplify the presentation, we are going to omit the time-moment subscript "k" and the pseudorange superscript "$\gamma$" from our notation for $$Q_k = \begin{bmatrix} H_k^\gamma \\ \Lambda^{-1} H_k^\gamma \end{bmatrix},$$ and simply use the notation $$Q = \begin{bmatrix} H \\ \Lambda^{-1} H \end{bmatrix}$$ in the following discussion. With the above, we can write the matrix component $(Q_k^T R_k^{-1} Q_k)^{-1}$ as follows:

$$(Q^T R^{-1} Q)^{-1} = \left( [H^T \mid H^T \Lambda^{-1}] \begin{bmatrix} \frac{1}{\sigma_\gamma^2} W & O_{n \times n} \\ O_{n \times n} & \frac{1}{\sigma_\varphi^2} W \end{bmatrix} \begin{bmatrix} H \\ \Lambda^{-1} H \end{bmatrix} \right)^{-1}$$

With the condition that the measurement data is within one signal band, all of the wavelengths are the same (for the purposes of determining the floating ambiguity), and the diagonal wavelength matrix $\Lambda$ may be replaced by the identity matrix I multiplied by the scalar wavelength value $\lambda$: $\Lambda = \lambda I$. This leads to the simplification:

$$(Q^T R^{-1} Q)^{-1} = \left( \frac{1}{\sigma_\gamma^2} + \frac{1}{\lambda^2 \sigma_\varphi^2} \right)^{-1} (H^T W H)^{-1} = \sigma_\varphi^2 \frac{\sigma_\gamma^2 \lambda^2}{\sigma_\gamma^2 + \lambda^2 \sigma_\varphi^2} (H^T W H)^{-1}.$$

The quantity $$\frac{\sigma_\gamma^2 \lambda^2}{\sigma_\gamma^2 + \lambda^2 \sigma_\varphi^2}$$

may be represented a single scalar value b $$\left( b = \frac{\sigma_\gamma^2 \lambda^2}{\sigma_\gamma^2 + \lambda^2 \sigma_\varphi^2} \right),$$

and the above may be further simplified as:

$$(Q^T R^{-1} Q)^{-1} = \sigma_\varphi^2 b (H^T W H)^{-1}.$$

The matrix W is diagonal positive definite so we can write $W = W^{1/2} W^{1/2}$. Then we have $$G^T P G = \frac{1}{\sigma_\varphi^2} W - \frac{1}{\sigma_\varphi^2} W \frac{1}{\lambda} H \sigma_\varphi^2 b (H^T W H)^{-1} \frac{1}{\lambda} H^T W \frac{1}{\sigma_\varphi^2}$$

$$= \frac{1}{\sigma_\varphi^2} W^{1/2} \left[ I_{n \times n} - \frac{b}{\lambda^2} W^{1/2} H (H^T W^{1/2} W^{1/2} H)^{-1} H^T W^{1/2} \right] W^{1/2}.$$

Denoting the matrix product $W^{1/2} H$ more simply as $\tilde{H}$ (i.e., $W^{1/2} H = \tilde{H}$), the above form can be rewritten as:

$$G^T P G = \frac{1}{\sigma_\varphi^2} W^{1/2} \left[ I_{n \times n} - \frac{b}{\lambda^2} \tilde{H} (\tilde{H}^T \tilde{H})^{-1} \tilde{H}^T \right] W^{1/2}.$$

We now generate reduced forms for $\tilde{H}$ and $\tilde{H}^T$. We apply the Householder transformation to matrix $\tilde{H}^T$, which is indicated by Householder matrix $S_{HH}$:

$$\tilde{H}^T S_{HH} = \tilde{V} = [V \mid O_{4 \times (n-4)}],$$

where matrix V is a lower diagonal 4×4 matrix. Matrix S is an n×n matrix, and is an orthogonal (so that $S_{HH} S_{HH}^T = I_n$) since it is a Householder matrix. Multiplying both sides of the above equation by $S_{HH}^T$, and using the fact that $S_{HH} S_{HH}^T = I_n$, we can find that:

$$\tilde{H}^T [V \mid O_{4 \times (n-4)}] S_{HH}^T = \tilde{V} S_{HH}^T.$$

Then, by the transpose rule, we can find $\tilde{H} = S_{HH} \tilde{V}^T$. We now substitute these reduced forms for $\tilde{H}$ and $\tilde{H}^T$ in the prior equation for $G^T P G$, and perform the following sequence of substitutions, expansions, and regroupings:

$$G^T P G = \frac{1}{\sigma_\varphi^2} W^{1/2} \left[ S_{HH} S_{HH}^T - \frac{b}{\lambda^2} S_{HH} \tilde{V}^T (V V^T)^{-1} \tilde{V} S_{HH}^T \right] W^{1/2}$$

$$= \frac{1}{\sigma_\varphi^2} W^{1/2} S_{HH} \left[ I_n - \frac{b}{\lambda^2} \tilde{V}^T (V^T)^{-1} V^{-1} \tilde{V} \right] S_{HH}^T W^{1/2}$$

$$= \frac{1}{\sigma_\varphi^2} W^{1/2} S_{HH} \left[ I_n - \frac{b}{\lambda^2} \begin{bmatrix} I_4 & O_{4 \times (n-4)} \\ O_{(n-4) \times 4} & O_{(n-4) \times (n-4)} \end{bmatrix} \right] S_{HH}^T W^{1/2}$$

$$= \frac{1}{\sigma_\varphi^2} W^{1/2} S_{HH} \left[ \begin{bmatrix} I_4 - \frac{b}{\lambda^2} I_4 & O_{4 \times (n-4)} \\ O_{(n-4) \times 4} & I_{(n-4) \times (n-4)} \end{bmatrix} \right] S_{HH}^T W^{1/2}.$$

Finally, we obtain $$T = \frac{1}{\sigma_\varphi} W^{1/2} S_{HH} \left[ \begin{array}{c|c} \sqrt{1 - \frac{b}{\lambda^2}} I_4 & O_{4\times(n-4)} \\ \hline O_{(n-4)\times 4} & I_{(n-4)\times(n-4)} \end{array} \right].$$

In the case when we use both GPS and GLONASS measurements, take matrices $(R^\gamma)^{-1}$ and $(R^\Phi)^{-1}$ in the form $$(R^\gamma)^{-1} = \frac{1}{\sigma_\gamma^2} W, \ (R^\varphi)^{-1} = \frac{1}{\sigma_\varphi^2 \lambda_{L1}^2} \Lambda W \Lambda,$$

where $\lambda$ is the GPS wave length, then all the above reasoning hold including the formula for T. However the value $$\frac{b}{\lambda^2}$$

close to 1 (but always less than 1), so $$1 - \frac{b}{\lambda^2}$$

is a small value, the operation of taking a square root does not reduce accuracy.

This method of generating the matrix T may be extended to L1 and L2 band measurements. Let $$W^{(1)} = \frac{1}{\lambda_1^2} \Lambda^{(1)} W \Lambda^{(1)}, \ W^{(2)} = \frac{1}{\lambda_2^2} \Lambda^{(2)} W \Lambda^{(2)},$$

where $\lambda_1$ and $\lambda_2$ are the wavelengths of GPS L1 and L2 bands, respectively, and W is the weighing matrix, as above. Then $$(R_j^\gamma)^{-1} = \left[ \begin{array}{c|c} \frac{1}{\sigma_\gamma^2} W & O_{n\times n} \\ \hline O_{n\times n} & \frac{1}{\sigma_\gamma^2} W \end{array} \right], \ (R_j^\varphi)^{-1} = \left[ \begin{array}{c|c} \frac{1}{\sigma_\varphi^2} W^{(1)} & O_{n\times n} \\ \hline O_{n\times n} & \frac{1}{\sigma_\varphi^2} W^{(2)} \end{array} \right], \text{ and}$$

$$R^{-1} = \left[ \begin{array}{c|c} (R^\gamma)^{-1} & O_{2n\times 2n} \\ \hline O_{2n\times 2n} & (R^\varphi)^{-1} \end{array} \right].$$

Matrix Q thus takes the form $$Q = \left[ \begin{array}{c} H \\ H \\ (\Lambda^{(1)})^{-1} H \\ (\Lambda^{(2)})^{-1} H \end{array} \right],$$

so that $$(Q^T R^{-1} Q) = [H^T \mid H^T \mid H^T (\Lambda^{(1)})^{-1} \mid H^T (\Lambda^{(2)})^{-1}] \times$$

$$\left[ \begin{array}{c|c|c|c} \frac{1}{\sigma_\gamma^2} W & O_{n\times n} & O_{n\times n} & O_{n\times n} \\ \hline O_{n\times n} & \frac{1}{\sigma_\gamma^2} W & O_{n\times n} & O_{n\times n} \\ \hline O_{n\times n} & O_{n\times n} & \frac{1}{\sigma_\varphi^2} W^{(1)} & O_{n\times n} \\ \hline O_{n\times n} & O_{n\times n} & O_{n\times n} & \frac{1}{\sigma_\varphi^2} W^{(2)} \end{array} \right] \cdot \left[ \begin{array}{c} H \\ H \\ (\Lambda^{(1)})^{-1} H \\ (\Lambda^{(2)})^{-1} H \end{array} \right] =$$

$$\left( \frac{2}{\sigma_\gamma^2} + \frac{1}{\sigma_\varphi^2} \left( \frac{1}{\lambda_1^2} + \frac{1}{\lambda_2^2} \right) \right) H^T W H, \text{ and } (Q^T R^{-1} Q)^{-1} =$$

$$\sigma_\varphi^2 \frac{\sigma_\gamma^2 \lambda_1^2 \lambda_2^2}{2\sigma_\varphi^2 \lambda_1^2 \lambda_2^2 + \sigma_\gamma^2 \lambda_1^2 + \sigma_\gamma^2 \lambda_2^2} (H^T W H)^{-1}, \ = \sigma_\varphi^2 b (H^T W H)^{-1}$$

where b is defined as $$b = \frac{\sigma_\gamma^2 \lambda_1^2 \lambda_2^2}{2\sigma_\varphi^2 \lambda_1^2 \lambda_2^2 + \sigma_\gamma^2 \lambda_1^2 + \sigma_\gamma^2 \lambda_2^2}.$$

Note that in this case the matrix G takes the form $$G = \left[ \begin{array}{c} O_{2n\times 2n} \\ \hline I_{2n} \end{array} \right].$$

$$G^T P G = \left[ \begin{array}{c|c} \frac{1}{\sigma_\varphi^2} W^{(1)} & O_{n\times n} \\ \hline O_{n\times n} & \frac{1}{\sigma_\varphi^2} W^{(2)} \end{array} \right] - \left[ \begin{array}{c|c} \frac{1}{\sigma_\varphi^2} W^{(1)} & O_{n\times n} \\ \hline O_{n\times n} & \frac{1}{\sigma_\varphi^2} W^{(2)} \end{array} \right] \left[ \begin{array}{c} (\Lambda^{(1)})^{-1} H \\ (\Lambda^{(2)})^{-1} H \end{array} \right]$$

$$\sigma_\varphi^2 b (H^T W H)^{-1} \times [(\Lambda^{(1)})^{-1} H^T \mid (\Lambda^{(2)})^{-1} H^T] \times$$

$$\left[ \begin{array}{c|c} \frac{1}{\sigma_\varphi^2} W^{(1)} & O_{n\times n} \\ \hline O_{n\times n} & \frac{1}{\sigma_\varphi^2} W^{(2)} \end{array} \right] = \frac{1}{\sigma_\varphi^2} \left[ \begin{array}{c|c} (W^{(1)})^{\frac{1}{2}} & O_{n\times n} \\ \hline O_{n\times n} & (W^{(2)})^{\frac{1}{2}} \end{array} \right] \times \left( I_{2n} - b \left[ \begin{array}{c} \frac{1}{\lambda_1} W^{\frac{1}{2}} H \\ \frac{1}{\lambda_2} W^{\frac{1}{2}} H \end{array} \right] \right.$$

$$\left. (H^T W H)^{-1} \left[ \frac{1}{\lambda_1} H^T W^{\frac{1}{2}} \mid \frac{1}{\lambda_2} H^T W^{\frac{1}{2}} \right] \right) \left[ \begin{array}{c|c} (W^{(1)})^{\frac{1}{2}} & O_{n\times n} \\ \hline O_{n\times n} & (W^{(2)})^{\frac{1}{2}} \end{array} \right]$$

As in the case of L1 measurements, denote $W^{1/2} H = \tilde{H}$, and, implementing Householder transformation:

$$\tilde{H}^T S_{HH} = \tilde{V} = [\tilde{V} O_{4\times(n-4)}], \text{ that is}$$

$$\tilde{H} = S_{HH} \tilde{V}^T, \ \tilde{H}^T = \tilde{V} S_{HH}^T,$$

we obtain:

$$GPG^T = \frac{1}{\sigma_\varphi^2} \left[ \begin{array}{c|c} (W^{(1)})^{\frac{1}{2}} & O_{n\times n} \\ \hline O_{n\times n} & (W^{(2)})^{\frac{1}{2}} \end{array} \right] \times$$

$$\left( I_{2n} - b \left[ \begin{array}{c} \frac{1}{\lambda_1} S_{HH} \tilde{V}^T \\ \frac{1}{\lambda_2} S_{HH} \tilde{V}^T \end{array} \right] (VV^T)^{-1} \left[ \frac{1}{\lambda_1} \tilde{V} S_{HH}^T \Big| \frac{1}{\lambda_2} \tilde{V} S_{HH}^T \right] \right)$$

$$\left[ \begin{array}{c|c} (W^{(1)})^{\frac{1}{2}} & O_{n\times n} \\ \hline O_{n\times n} & (W^{(2)})^{\frac{1}{2}} \end{array} \right] = \frac{1}{\sigma_\varphi^2} \left[ \begin{array}{c|c} (W^{(1)})^{\frac{1}{2}} S_{HH} & O_{n\times n} \\ \hline O_{n\times n} & (W^{(2)})^{\frac{1}{2}} S_{HH} \end{array} \right] \times$$

$$\left( I_{2n} - b \left[ \begin{array}{c} \frac{1}{\lambda_1} I_4 \\ \hline O_{(n-4)\times 4} \\ \hline \frac{1}{\lambda_2} I_4 \\ \hline O_{(n-4)\times 4} \end{array} \right] \left[ \frac{1}{\lambda_1} I_4 \Big| O_{4\times(n-4)} \Big| \frac{1}{\lambda_2} I_4 \Big| O_{4\times(n-4)} \right] \right) \times$$

$$\left[ \begin{array}{c|c} S_{HH}^T (W^{(1)})^{\frac{1}{2}} & O_{n\times n} \\ \hline O_{n\times n} & S_{HH}^T (W^{(2)})^{\frac{1}{2}} \end{array} \right] = \frac{1}{\sigma_\varphi^2} \left[ \begin{array}{c|c} (W^{(1)})^{\frac{1}{2}} S_{HH} & O_{n\times n} \\ \hline O_{n\times n} & (W^{(2)})^{\frac{1}{2}} S_{HH} \end{array} \right] \times$$

$$K \times \left[ \begin{array}{c|c} S_{HH}^T (W^{(1)})^{\frac{1}{2}} & O_{n\times n} \\ \hline O_{n\times n} & S_{HH}^T (W^{(2)})^{\frac{1}{2}} \end{array} \right].$$

Matrix K has the following structure:

$$K = \left[ \begin{array}{cc|cc} \left(1 - \frac{b}{\lambda_1^2}\right) I_4 & O_{4\times(n-4)} & -\frac{b}{\lambda_1\lambda_2} I_4 & O_{4\times(n-4)} \\ O_{(n-4)\times 4} & I_{(n-4)} & O_{(n-4)\times 4} & O_{(n-4)\times(n-4)} \\ \hline -\frac{b}{\lambda_1\lambda_2} I_4 & O_{4\times(n-4)} & \left(1 - \frac{b}{\lambda_2^2}\right) I_4 & O_{4\times(n-4)} \\ O_{(n-4)\times 4} & O_{(n-4)\times(n-4)} & O_{(n-4)\times 4} & I_{(n-4)} \end{array} \right].$$

The Cholesky factorization of matrix K: $K = \tilde{K}\tilde{K}^T$ may be obtained using finite formula:

$$\tilde{K} = \left[ \begin{array}{cc|cc} \sqrt{1 - \frac{b}{\lambda_1^2}} I_4 & O_{4\times(n-4)} & & O_{n\times n} \\ O_{(n-4)\times 4} & I_{(n-4)} & & \\ \hline -\frac{b}{\lambda_1\lambda_2\sqrt{1 - \frac{b}{\lambda_1^2}}} I_4 & O_{4\times(n-4)} & \sqrt{\frac{1 - \frac{b}{\lambda_1^2} - \frac{b}{\lambda_2^2}}{1 - \frac{b}{\lambda_1^2}}} I_4 & O_{4\times(n-4)} \\ O_{(n-4)\times 4} & O_{(n-4)\times(n-4)} & O_{(n-4)\times 4} & I_{(n-4)} \end{array} \right].$$

Thus, for matrix T, where $GPG^T = TT^T$, we may write $$T = \frac{1}{\sigma_\varphi} \left[ \begin{array}{c|c} A11 & O_{n\times n} \\ \hline A21 & A22 \end{array} \right],$$

where sub-matrixces A11, A21, and A22 are as follows:

$$A11 = (W^{(1)})^{\frac{1}{2}} S_{HH} \left[ \begin{array}{c|c} \sqrt{1 - b/\lambda_1^2} I_4 & O_{4\times(n-4)} \\ \hline O_{(n-4)\times 4} & I_{(n-4)} \end{array} \right],$$

$$A21 = (W^{(2)})^{\frac{1}{2}} S_{HH} \left[ \begin{array}{c|c} \frac{b}{\lambda_1\lambda_2\sqrt{1 - b/\lambda_1^2}} I_4 & O_{4\times(n-4)} \\ \hline O_{(n-4)\times 4} & O_{(n-4)\times(n-4)} \end{array} \right], \text{ and}$$

$$A22 = (W^{(2)})^{\frac{1}{2}} S_{HH} \left[ \begin{array}{c|c} \sqrt{\frac{1 - b/\lambda_1^2 - b/\lambda_2^2}{1 - b/\lambda_1^2}} I_4 & O_{4\times(n-4)} \\ \hline O_{(n-4)\times 4} & I_{(n-4)} \end{array} \right].$$

What is claimed is:

1. A method of estimating a set of floating ambiguities associated with a set of phase measurements of a plurality n of satellite carrier signals made by a first navigation receiver (B) and a second navigation receiver (R) separated by a distance, wherein a baseline vector $(x^o, y^o, z^o)$ relates the position of the second receiver to the first receiver, each satellite carrier signal being transmitted by a satellite and having a wavelength, wherein each receiver has a time clock for referencing its measurements and wherein any difference between the time clocks may be represented by an offset, said method receiving, for a plurality of two or more time moments j, the following inputs:

a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, said method comprising the steps of:

(a) generating, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$;

(b) generating, for each time moment j, a vector $\Delta\phi_j$ of a plurality of phase residuals of full phase measurements made by the first and second navigation receivers in the form of:

$\Delta\phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites;

(c) generating, for time moment j=1, an LU-factorization of a matrix $M_1$ or a matrix inverse of matrix $M_1$, the matrix $M_1$ being a function of at least $\Lambda^{-1}$ and $H_1^\gamma$, (d) generating, for time moment j=1, a vector $N_1$ as a function of at least $\Delta\gamma_1$, $\Delta\phi_1$, and the LU-factorization of matrix $M_1$ or the matrix inverse of matrix $M_1$;

(e) generating, for an additional time moment j≠1, an LU-factorization of a matrix $M_j$ or a matrix inverse of matrix $M_j$, the matrix $M_j$ being a function of at least $\Lambda^{-1}$, $H_j^\gamma$ and an instance of matrix M generated for a different time moment; and (f) generating, for an additional time moment j≠1, a vector $N_j$ as a function of at least $\Delta\gamma_j$, $\Delta\phi_j$, and the LU-factorization or matrix $M_j$ or the matrix inverse of matrix $M_j$, the vector $N_j$ having estimates of the floating ambiguities.

2. The method of claim 1 wherein step (c) comprises generating an LU-factorization for a matrix comprising a form equivalent to $(G^T P_1 G)$, where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_1$ has 2n rows, 2n columns, and a form which comprises a matrix equivalent to $(R_1^{-1} - R_1^{-1} Q_1 (Q_1^T R_1^{-1} Q_1 + qS_1)^{-1} Q_1^T R_1^{-1})$ where the matrix $R_1$ is a weighting matrix, where the matrix $R_1^{-1}$ comprises an inverse of matrix $R_1$, where the matrix $Q_1$ has an upper sub-matrix and a lower sub-matrix, one of the sub-matrices of $Q_1$ comprising matrix $H_1^\gamma$ and the other of the sub-matrices of $Q_1$ comprising the matrix product $\Lambda^{-1} H_1^\gamma$, and wherein the matrix $Q_1^T$ comprises the transpose of matrix $Q_1$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

3. The method of claim 2 wherein step (d) comprises the step of generating vector $N_1$ to comprise a vector having a form equivalent to $M_1^{-1}(G^T P_1 \mu_1 + qg_1)$, where the matrix $M_1^{-1}$ comprises an inverse of matrix of matrix $M_1$, and where the vector $\mu_1$ comprises the vector $[\Delta\gamma_1, \Delta\phi_1]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

4. The method of claim 1 wherein step (e) comprises generating an LU-factorization for a matrix comprising a form equivalent to $M_j = M_{j-1} + G^T P_j G$, where:

$M_{j-1}$ comprises the matrix $M_1$ of step (c) when j=2 and comprises the matrix $M_j$ of step (e) for the j-1 time moment when j>2, the matrix G has 2n rows, n columns, an upper sub-matrix, and a lower sub-matrix, one of the sub-matrices comprising an n×n zero matrix and the other sub-matrix comprising an n×n identity matrix, the matrix $G^T$ comprises the transpose matrix of matrix G, and the matrix $P_j$ has 2n rows, 2n columns, and a form which comprise a matrix equivalent to $(R_j^{-1} - R_j^{-1} Q_j (Q_j^T R_j^{-1} Q_j + qS_j)^{-1} Q_j^T R_j^{-1})$ where the matrix $R_j$ is a weighting matrix, where the matrix $R_j^{-1}$ comprises an inverse of matrix $R_j$, where the matrix $Q_j$ has an upper sub-matrix and a lower sub-matrix, one of the sub-matrices of $Q_j$ comprising matrix $H_j^\gamma$ and the other of the sub-matrices of $Q_j$ comprising the matrix product $\Lambda^{-1} H_j^\gamma$, and wherein the matrix $Q_j^T$ comprises the transpose of matrix $Q_j$, and where the quantity $qS_j$ is a zero matrix when the distance between the first and second navigation receivers is unconstrained and where q may be a non-zero weighting parameter and $S_j$ may be a non-zero matrix when the distance between the first and second navigation receivers is constrained.

5. The method of claim 4 wherein step (f) comprises the step of generating vector $N_j$ to comprise a vector having a form equivalent to $N_{j-1} + M_j^{-1}[G^T P_j (\mu_j - GN_{j-1}) + qg_j]$, where the matrix $M_j^{-1}$ comprises an inverse of matrix of matrix $M_j$, where the vector $\mu_j$ comprises the vector $[\Delta\gamma_j, \Delta\phi_j]^T$, and where the vector $N_{j-1}$ comprises the vector $N_1$ generated by step (d) when j=2 and comprises the vector $N_{j-1}$ generated by step (f) for the j−1 time moment when j>2, and where the quantity $qg_j$ is a zero vector when the distance between the first and second navigation receivers is unconstrained and where q may be non-zero and $g_j$ may be a non-zero vector when the distance between the first and second navigation receivers is constrained.

6. The method of claim 3 wherein the distance between the first and second navigation receivers is constrained to a distance $L_{RB}$, wherein step (c) generates matrix $S_1$ in a form equivalent to:

$$S_1 = \left(1 - \frac{L_{RB}}{\|r_1\|}\right)\begin{pmatrix} I_3 & O_{3\times 1} \\ O_{1\times 3} & 0 \end{pmatrix} + \frac{L_{RB}}{\|r_1\|} r_1 r_1^T$$

where $r_1$ is a vector comprising estimates of the three coordinates of the baseline vector for the time moment j=1 and a zero as fourth component, where $r_1^T$ is the vector transpose of $r_1$, where $I_3$ is the 3-by-3 identity matrix, where $O_{1\times 3}$ is a row vector of three zeros, and where $O_{3\times 1}$ is a column vector of three zeros; and wherein step (d) generates vector $g_1$ for the time moment j=1 in a form equivalent to:

$g_1 = G^T R_1^{-1} Q_1 (Q_1^T R_1^{-1} Q_1 + qS_1)^{-1} h_1$, where:

$$h_1 = \left(1 - \frac{L_{RB}}{\|r_1\|}\right) r_1.$$

7. The method of claim 3 wherein weighting matrix $R_1$ comprises an identity matrix multiplied by a scalar quantity.

8. The method of claim 5 wherein the distance between the first and second navigation receivers is constrained to a distance $L_{RB}$, wherein step (e) generates matrix $S_j$ in a form equivalent to:

$$S_j = \left(1 - \frac{L_{RB}}{\|r_j\|}\right)\begin{pmatrix} I_3 & O_{3\times 1} \\ O_{1\times 3} & 0 \end{pmatrix} + \frac{L_{RB}}{\|r_j\|} r_j r_j^T$$

where $r_j$ is a vector comprising estimates of the three coordinates of the baseline vector for the j-th time moment and a zero as fourth vector component, where $r_j^T$ is the vector transpose of $r_j$, where $I_3$ is the 3-by-3 identity matrix, where $O_{1\times 3}$ is a row vector of three zeros, and where $O_{3\times 1}$ is a column vector of three zeros; and wherein step (f) generates vector $g_j$ for the j-th time moment in a form equivalent to:

$$g_j = G^T R_j^{-1} Q_j (Q_j^T R_j^{-1} Q_j + qS_j)^{-1} h_j,$$

where:

$$h_j = \left(1 - \frac{L_{RB}}{\|r_j\|}\right) r_j.$$

9. The method of claim 5 wherein the weighting matrix $R_j$ comprises an identity matrix multiplied by a scalar quantity for at least one time moment j.

10. The method of claim 4 wherein the generation of the LU-factorization in step (e) comprises the steps of:
  (g) generating an LU-factorization of matrix $M_{j-1}$ in a form equivalent to $L_{j-1} L_{j-1}^T$ wherein $L_{j-1}$ is a low-triangular matrix and $L_{j-1}^T$ is the transpose of $L_{j-1}$;
  (h) generating a factorization of $G^T P_j G$ in a form equivalent to $T_j T_j^T = G^T P_j G$, where $T_j^T$ is the transpose of $T_j$;
  (i) generating an LU-factorization of matrix $M_j$ in a form equivalent to $L_j L_j^T$ from a plurality n of rank-one modifications of matrix $L_{j-1}$, each rank-one modification being based on a respective column of matrix $T_j$, where n is the number of rows in matrix $M_j$.

11. The method of claim 10 wherein step (h) generates matrix $T_j$ from a Cholesky factorization of $G^T P_j G$.

12. The method of claim 10 wherein weighting matrix $R_j$ has a form equivalent to:

$$R_j = \begin{bmatrix} R_j^\gamma & 0 \\ 0 & R_j^\varphi \end{bmatrix},$$

where $R^\gamma$ and $R^\Phi$ are weighting matrices;
wherein $R^\gamma$ and $R^\Phi$ are related to a common weighting matrix W and scaling parameters $\sigma_\gamma$ and $\sigma_\varphi$ as follows $$(R^\gamma)^{-1} = \frac{1}{\sigma_\gamma^2} W, \text{ and } (R^\varphi)^{-1} = \frac{1}{\sigma_\varphi^2} W,$$

wherein step (h) of generating matrix $T_j$ comprises the steps of:
generating a scalar b in a form equivalent to:

$$b = \frac{\sigma_\gamma^2 \lambda_{GPS}^2}{\sigma_\gamma^2 + \lambda_{GPS}^2 \sigma_\psi^2},$$

where $\lambda_{GPS}$ is the wavelength of the satellite signals,
generating a matrix $\tilde{H}$ in a form equivalent to $\tilde{H} = W^{1/2} H_j^\gamma$,
generating a Householder matrix $S_{HH}$ for matrix $\tilde{H}$, and
generating matrix $T_j$ in a form equivalent to:

$$T_j = \frac{1}{\sigma_\psi} W^{1/2} S_{HH} \begin{bmatrix} \sqrt{\left(1 - \frac{b}{\lambda_{GPS}^2}\right)} I_4 & O_{4 \times (n-4)} \\ --- & --- \\ O_{(n-4) \times 4} & I_{(n-4) \times (n-4)} \end{bmatrix}.$$

13. The method of claim 10 wherein weighting matrix $R_j$ is applied to a case where there is a first group of satellite signals having carrier signals in a first wavelength band and a second group of satellite signals having a carrier signals in a second wavelength band, the weighting frequency having a form equivalent to:

$$R_j = \begin{bmatrix} R_j^\gamma & 0 \\ 0 & R_j^\psi \end{bmatrix},$$

where $R^\gamma$ and $R^\Phi$ are weighting matrices;
wherein $R^\gamma$ and $R^\Phi$ are related to a common weighting matrix W, the carrier wavelengths of the first group of signals as represented by matrix $\Lambda^{(1)}$, the carrier wavelengths of the second group of signals as represented by matrix $\Lambda^{(2)}$, the center wavelength of the first band as represented by $\lambda_1$, the center wavelength of the first band as represented by $\lambda_2$, and scaling parameters $\sigma_\gamma$ and $\sigma_\varphi$, as follows:

$$(R_j^\gamma)^{-1} = \begin{bmatrix} \frac{1}{\sigma_\gamma^2} W & O_{n \times n} \\ --- & --- \\ O_{n \times n} & \frac{1}{\sigma_\gamma^2} W \end{bmatrix},$$

$$(R_j^\psi)^{-1} = \begin{bmatrix} \frac{1}{\sigma_\psi^2} W^{(1)} & O_{n \times n} \\ --- & --- \\ O_{n \times n} & \frac{1}{\sigma_\gamma^2} W^{(2)} \end{bmatrix},$$

where $$W^{(1)} = \frac{1}{\lambda_1^2} \Lambda^{(1)} W \Lambda^{(1)}, \quad W^{(2)} = \frac{1}{\lambda_2^2} \Lambda^{(2)} W \Lambda^{(2)},$$

wherein step (h) of generating matrix $T_j$ comprises the steps of:
generating a scalar b in a form equivalent to:

$$b = \frac{\sigma_\gamma^2 \lambda_1^2 \lambda_2^2}{2 \sigma_\psi^2 \lambda_1^2 \lambda_2^2 + \sigma_\gamma^2 \lambda_1^2 + \sigma_\gamma^2 \lambda_2^2},$$

where $\lambda_1$ is the wavelength of a first group of satellite signals and $\lambda_2$ is the wavelength of a second group of satellite signals,
generating a matrix $\tilde{H}$ in a form equivalent to $\tilde{H} = W^{1/2} H_j^\gamma$,
generating a Householder matrix $S_{HH}$ for matrix $\tilde{H}$, and
generating matrix $T_j$ in a form equivalent to:

$$T_j = \frac{1}{\sigma_\varphi} \begin{bmatrix} A11 & O_{n \times n} \\ A21 & A22 \end{bmatrix},$$

where sub-matrixces A11, A21, and A22 are as follows:

$$A11 = (W^{(1)})^{\frac{1}{2}} S_{HH} \begin{bmatrix} \sqrt{1-b/\lambda_1^2}\, I_4 & | & O_{4\times(n-4)} \\ \hline O_{(n-4)\times 4} & | & I_{(n-4)} \end{bmatrix},$$

$$A21 = (W^{(2)})^{\frac{1}{2}} S_{HH} \begin{bmatrix} -\dfrac{b}{\lambda_1 \lambda_2 \sqrt{1-b/\lambda_1^2}} I_4 & | & O_{4\times(n-4)} \\ \hline O_{(n-4)\times 4} & | & O_{(n-4)\times(n-4)} \end{bmatrix},$$

and $$A22 = (W^{(2)})^{\frac{1}{2}} S_{HH} \begin{bmatrix} \sqrt{\dfrac{1-b/\lambda_1^2 - b/\lambda_2^2}{1-b/\lambda_1^2}}\, I_4 & | & O_{4\times(n-4)} \\ \hline O_{(n-4)\times 4} & | & I_{(n-4)} \end{bmatrix}.$$

14. The method of claim 4 wherein step (d) comprises generating a vector $B_1$ to comprise a vector having a form equivalent to $G^T P_1 \mu_1 + q g_1$, where the vector $\mu_1$ comprises the vector $[\Delta\gamma_1, \Delta\phi_1]^T$, and where the quantity $q g_j$ is a zero vector when the distance between the first and second navigation receivers is unconstrained and where q may be non-zero and $g_j$ may be a non-zero vector when the distance between the first and second navigation receivers is constrained; and wherein step (f) further comprises generating, for each time moment $j \neq 1$, a vector $B_j$ to comprise a matrix having a form equivalent to $B_{j-1} + G^T P_j \mu_j + q g_j$, where the vector $\mu_j$ comprises the vector $[\Delta\gamma_j, \Delta\phi_j]^T$, and where the vector $B_{j-1}$ is the vector $B_1$ generated by step (d) when j=2 and comprises the vector generated by step (f) for the for the j−1 time moment when j>2, and where the quantity $q g_j$ is a zero vector when the distance between the first and second navigation receivers is unconstrained and where q may be non-zero and $g_j$ may be a non-zero vector when the distance between the first and second navigation receivers is constrained; and wherein step (f) further comprises generating vector $N_j$ to comprise a vector having a form equivalent to $N_j = [M_j]^{-1} B_j$, where the matrix $M_j^{-1}$ comprises an inverse of matrix of matrix $M_j$.

15. The method of claim 14 wherein the distance between the first and second navigation receivers is constrained to a distance $L_{RB}$, wherein step (c) generates matrix $S_1$ in a form equivalent to:

$$S_1 = \left(1 - \frac{L_{RB}}{\|r_1\|}\right)\begin{pmatrix} I_3 & O_{3\times 1} \\ O_{1\times 3} & 0 \end{pmatrix} + \frac{L_{RB}}{\|r_1\|} r_1 r_1^T$$

where $r_1$ is a vector comprising estimates of the three coordinates of the baseline vector for the time moment j=1 and a zero as fourth component, where $r_1^T$ is the vector transpose of $r_1$, where $I_3$ is the 3-by-3 identity matrix, where $O_{1\times 3}$ is a row vector of three zeros, and where $O_{3\times 1}$ is a column vector of three zeros; and wherein step (d) generates vector $g_1$ for the time moment j=1 in a form equivalent to:

$g_1 = G^T R_1^{-1} Q_1 (Q_1^T R_1^{-1} Q_1 + q S_1)^{-1} h_1,$ where:

$$h_1 = \left(1 - \frac{L_{RB}}{\|r_1\|}\right) r_1.$$

16. The method of claim 14 wherein the distance between the first and second navigation receivers is constrained to a distance $L_{RB}$, wherein step (e) generates matrix $S_j$ in a form equivalent to:

$$S_j = \left(1 - \frac{L_{RB}}{\|r_j\|}\right)\begin{pmatrix} I_3 & O_{3\times 1} \\ O_{1\times 3} & 0 \end{pmatrix} + \frac{L_{RB}}{\|r_j\|} r_j r_j^T$$

where $r_j$ is a vector comprising estimates of the three coordinates of the baseline vector for the j-th time moment and a zero as fourth vector component, where $r_j^T$ is the vector transpose of $r_j$, where $I_3$ is the 3-by-3 identity matrix, where $O_{1\times 3}$ is a row vector of three zeros, and where $O_{3\times 1}$ is a column vector of three zeros; and wherein step (f) generates vector $g_j$ for the j-th time moment in a form equivalent to:

$g_j = G^T R_j^{-1} Q_j (Q_j^T R_j^{-1} Q_j + q S_j)^{-1} h_j,$ where:

$$h_j = \left(1 - \frac{L_{RB}}{\|r_j\|}\right) r_j.$$

17. The method of claim 14 wherein the weighting matrix $R_j$ comprises an identity matrix multiplied by a scalar quantity for at least one time moment j.

18. A method of estimating a set of floating ambiguities associated with a set of phase measurements of a plurality n of satellite carrier signals made by a first navigation receiver (B) and a second navigation receiver (R), wherein a baseline vector $(x^\circ, y^\circ, z^\circ)$ relates the position of the second receiver to the first receiver, each satellite carrier signal being transmitted by a satellite and having a wavelength, wherein each receiver has a time clock for referencing its measurements and wherein any difference between the time clocks may be represented by an offset, said method receiving, for a plurality of two or more time moments j, the following inputs for each time moment j:

a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, said method comprising the steps of:

(a) generating, for each time moment j, a vector $\Delta\gamma_j$ of a plurality of range residuals of pseudo-range measurements made by the first and second navigation receivers in the form of: $\Delta\gamma_j=(\gamma_j^R-\gamma_j^B)-(D_j^R-D_j^B)$, said step generating a set of range residuals $\Delta\gamma_k$, k=1, ..., j;

(b) generating, for each time moment j, a vector $\Delta\phi_j$ of a plurality of phase residuals of full phase measurements made by the first and second navigation receivers in the form of: $\Delta\phi_j=(\phi_j^R-\phi_j^B)-\Lambda^{-1}\cdot(D_j^R-D_j^B)$, where $\Lambda^{-1}$ is a diagonal matrix comprising the inverse wavelengths of the satellites, said step generating a set of phase residuals $\Delta\phi_k$, k=1, ..., j;

(c) generating an LU-factorization of a matrix M or a matrix inverse of matrix M, the matrix M being a function of at least $\Lambda^{-1}$ and $H_k^\gamma$, for index k of $H_k^\gamma$ covering at least two of the time moments j;

(d) generating a vector N of estimated floating ambiguities as a function of at least the set of range residuals $\Delta\gamma_k$, the set of phase residuals $\Delta\phi_k$, and the LU-factorization of matrix M or the matrix inverse of matrix M.

19. The method of claim 18 wherein step (c) comprises generating matrix M in a form equivalent to the summation $$\left[\sum_{k=1}^{j}(G^T P_k G)\right],$$

where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_k$ has 2n rows, 2n columns, and a form which comprises a matrix equivalent to $P_k=R_k^{-1}-R_k^{-1}Q_k(Q_k^T R_k^{-1}Q_k+qS_k)^{-1}Q_k^T R_k^{-1}$, where the matrix $R_k$ is a weighting matrix, where the matrix $R_k^{-1}$ comprises an inverse of matrix $R_k$, where the matrix $Q_k$ has an upper sub-matrix and a lower sub-matrix, one of the sub-matrices of $Q_k$ comprising matrix $H_k^\gamma$ and the other of the sub-matrices of $Q_k$ comprising the matrix product $\Lambda^{-1}H_k^\gamma$, and wherein the matrix $Q_k^T$ comprises the transpose of matrix $Q_k$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

20. The method of claim 19 wherein step (d) comprises generating matrix N in a form equivalent to:

$$N = M^{-1} \times \left[\sum_{k=1}^{j}(G^T P_k \mu_k + qg_k)\right],$$

where the matrix $M^{-1}$ comprises an inverse of matrix M, where the vector $\mu_k$ comprises the vector $[\Delta\gamma_k, \Delta\phi_k]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

21. The method of claim 20 wherein the distance between the first and second navigation receivers is constrained to a distance $L_{RB}$, wherein step (c) generates matrix $S_k$ for the k-th time moment in a form equivalent to:

$$S_k = \left(1 - \frac{L_{RB}}{\|r_k\|}\right)\begin{pmatrix} I_3 & O_{3\times 1} \\ O_{1\times 3} & 0 \end{pmatrix} + \frac{L_{RB}}{\|r_k\|}r_k r_k^T$$

where $r_k$ is a vector comprising estimates of the three coordinates of the baseline vector at the k-th time moment, and a zero as fourth component, where $r_k^T$ is the vector transpose of $r_k$, where $I_3$ is the 3-by-3 identity matrix, where $O_{1\times 3}$ is a row vector of three zeros, and where $O_{3\times 1}$ is a column vector of three zeros; and wherein step (d) generates vector $g_k$ for the k-th time moment in a form equivalent to:

$$g_k=G^T R_k^{-1}Q_k(Q_k^T R_k^{-1}Q_k+qs_k)^{-1}h_k,$$

where:

$$h_k = \left(1 - \frac{L_{RB}}{\|r_k\|}\right)r_k.$$

22. The method of claim 19 wherein at least one of the weighting matrices $R_k$ comprises an identity matrix multiplied by a scalar quantity.

23. A computer program product for directing a data processor to estimate a set of floating ambiguities associated with a set of phase measurements of a plurality n of satellite carrier signals made by a first navigation receiver (B) and a second navigation receiver (R) separated by a distance, wherein a baseline vector (x°,y°,z°) relates the position of the second receiver to the first receiver, each satellite carrier signal being transmitted by a satellite and having a wavelength, wherein each receiver has a time clock for referencing its measurements and wherein any difference between the time clocks may be represented by an offset, the process receiving, for a plurality of two or more time moments j, the following inputs:

a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, the computer program product comprising:

a computer-readable medium;

a first set of instructions embodied on the computer-readable medium which directs the data processor to generate, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^{R-D\,B})$;

a second set of instructions embodied on the computer-readable medium which directs the data processor to generate, for each time moment j, a vector $\Delta\phi_j$ of a plurality of phase residuals of full phase measurements made by the first and second navigation receivers in the form of: $\Delta\phi_j = (\phi_j^R - \phi_j^B) - \Lambda^{-1}\cdot(D_j^R - D_j^B)$, where $\Lambda^{-1}$ is a diagonal matrix comprising the inverse wavelengths of the satellites;

a third set of instructions embodied on the computer-readable medium which directs the data processor to generate, for time moment j=1, an LU-factorization of a matrix $M_1$ or a matrix inverse of matrix $M_1$, the matrix $M_1$ being a function of at least $\Lambda^{-1}$ and $H_1^\gamma$;

a fourth set of instructions embodied on the computer-readable medium which directs the data processor to generate, for time moment j=1, a vector $N_1$ as a function of at least $\Delta\gamma_1$, $\Delta\phi_1$, and the LU-factorization of matrix $M_1$ or the matrix inverse of matrix $M_1$;

a fifth set of instructions embodied on the computer-readable medium which directs the data processor to generate, for an additional time moment j≠1, an LU-factorization of a matrix $M_j$ or a matrix inverse of matrix $M_j$, the matrix $M_j$ being a function of at least $\Lambda^{-1}$ and $H_j^\gamma$; and a sixth set of instructions embodied on the computer-readable medium which directs the data processor to generate, for an additional time moment j≠1, a vector $N_j$ as a function of at least $\Delta\gamma_j$, $\Delta\phi_j$, and the LU-factorization or matrix $M_j$ or the matrix inverse of matrix $M_j$, the vector $N_j$ having estimates of the floating ambiguities.

24. The computer program product of claim 23 wherein the third set of instructions directs the data processor to generate an LU-factorization for a matrix comprising a form equivalent to $(G^T P_1 G)$, where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_1$ has 2n rows, 2n columns, and a form which comprises a matrix equivalent to $(R_1^{-1} - R_1^{-1} Q_1 (Q_1^T R_1^{-1} Q_1 + qS_1)^{-1} Q_1^T R_1^{-1})$ where the matrix $R_1$ is a weighting matrix, where the matrix $R_1^{-1}$ comprises an inverse of matrix $R_1$, where the matrix $Q_1$ has an upper sub-matrix and a lower sub-matrix, one of the sub-matrices of $Q_1$ comprising matrix $H_1^\gamma$ and the other of the sub-matrices of $Q_1$ comprising the matrix product $\Lambda^{-1} H_1^\gamma$, and wherein the matrix $Q_1^T$ comprises the transpose of matrix $Q_1$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

25. The computer program product of claim 24 wherein the fourth set of instructions directs the data processor to generate vector $N_1$ to comprise a vector having a form equivalent to $M_1^{-1}(G^T P_1 \mu_1 + qg_1)$, where the matrix $M_1^{-1}$ comprises an inverse of matrix of matrix $M_1$, and where the vector $\mu_1$ comprises the vector $[\Delta\gamma_1, \Delta\phi_1]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

26. The computer program product of claim 23 wherein the fifth set of instructions directs the data processor to generate an LU-factorization for a matrix comprising a form equivalent to $M_j = M_{j-1} + G^T P_j G$, where:

$M_{j-1}$ comprises the matrix $M_1$ of step (c) when j=2 and comprises the matrix $M_j$ of step (e) for the j−1 time moment when j>2, the matrix G has 2n rows, n columns, an upper sub-matrix, and a lower sub-matrix, one of the sub-matrices comprising an n×n zero matrix and the other sub-matrix comprising an n×n identity matrix, the matrix $G^T$ comprises the transpose matrix of matrix G, and the matrix $P_j$ has 2n rows, 2n columns, and a form which comprise a matrix equivalent to $(R_j^{-1} - R_j^{-1} Q_j (Q_j^T R_j^{-1} Q_j + qS_j)^{-1} Q_j^T R_j^{-1})$ where the matrix $R_j$ is a weighting matrix, where the matrix $R_j^{-1}$ comprises an inverse of matrix $R_j$, where the matrix $Q_j$ has an upper sub-matrix and a lower sub-matrix, one of the sub-matrices of $Q_j$ comprising matrix $H_j^\gamma$ and the other of the sub-matrices of $Q_j$ comprising the matrix product $\Lambda^{-1} H_j^\gamma$, and wherein the matrix $Q_j^T$ comprises the transpose of matrix $Q_j$, and where the quantity $qS_j$ is a zero matrix when the distance between the first and second navigation receivers is unconstrained and where q may be a non-zero weighting parameter and $S_j$ may be a non-zero matrix when the distance between the first and second navigation receivers is constrained.

27. The computer program product of claim 26 wherein the sixth set of instructions directs the data processor to generate a vector $N_j$ to comprise a vector having a form equivalent to $N_{j-1} + M_j^{-1}[G^T P_j(\mu_j - GN_{j-1}) + qg_j]$, where the matrix $M_j^{-1}$ comprises an inverse of matrix of matrix $M_j$, where the vector $\mu_j$ comprises the vector $[\Delta\gamma_j, \Delta\phi_j]^T$, and where the vector $N_{j-1}$ comprises the vector $N_1$ generated by step (d) when j=2 and comprises the vector $N_{j-1}$ generated by step (f) for the j−1 time moment when j>2, and where the quantity $qg_j$ is a zero vector when the distance between the first and second navigation receivers is unconstrained and where q may be non-zero and $g_j$ may be a non-zero vector when the distance between the first and second navigation receivers is constrained.

28. The computer program product of claim 27 wherein the distance between the first and second navigation receivers is constrained to a distance $L_{RB}$, and wherein the fifth set of instructions directs the data processor to generate matrix $S_j$ in a form equivalent to:

$$S_j = \left(1 - \frac{L_{RB}}{\|r_j\|}\right)\begin{pmatrix} I_3 & O_{3\times 1} \\ O_{1\times 3} & 0 \end{pmatrix} + \frac{L_{RB}}{\|r_j\|} r_j r_j^T$$

where $r_j$ is a vector comprising estimates of the three coordinates of the baseline vector for the j-th time moment and a zero as fourth vector component, where $r_j^T$ is the vector transpose of $r_j$, where $I_3$ is the 3-by-3 identity matrix, where $O_{1\times 3}$ is a row vector of three zeros, and where $O_{3\times 1}$ is a column vector of three zeros; and wherein the sixth set of instructions directs the data processor to generate vector $g_j$ for the j-th time moment in a form equivalent to:

$$g_j = G^T R_j^{-1} Q_j (Q_j^T R_j^{-1} Q_j + q s_j)^{-1} h_j,$$

where:

$$h_j = \left(1 - \frac{L_{RB}}{\|r_j\|}\right) r_j.$$

29. The computer program product of claim 28 wherein the fifth set of instructions comprises:

a seventh set of instructions that direct the data processor to generate an LU-factorization of matrix $M_{j-1}$ in a form equivalent to $L_{j-1} L_{j-1}^T$ wherein $L_{j-1}$ is a low-triangular matrix and $L_{j-1}^T$ is the transpose of $L_{j-1}$;

an eighth set of instructions that direct the data processor to generate a factorization of $G^T P_j G$ in a form equivalent to $T_j T_j^T = G^T P_j G$, where $T_j^T$ is the transpose of $T_j$; and a ninth set of instructions that direct the data processor to generate an LU-factorization of matrix $M_j$ in a form equivalent to $L_j L_j^T$ from a plurality n of rank-one modifications of matrix $L_{j-1}$, each rank-one modification being based on a respective column of matrix $T_j$, where n is the number of rows in matrix $M_j$.

30. The computer program product of claim 29 wherein the eighth set of instructions directs the data processor to generate matrix $T_j$ from a Cholesky factorization of $G^T P_j G$.

31. The computer program product of claim 29 wherein weighting matrix $R_j$ has a form equivalent to:

$$R_j = \begin{bmatrix} R_j^\gamma & 0 \\ 0 & R_j^\varphi \end{bmatrix},$$

where $R^\gamma$ and $R^\Phi$ are weighting matrices;

wherein $R^\gamma$ and $R^\Phi$ are related to a common weighting matrix W and scaling parameters $\sigma_\gamma$ and $\sigma_\varphi$ as follows $$(R^\gamma)^{-1} = \frac{1}{\sigma_\gamma^2} W, \text{ and } (R^\varphi)^{-1} = \frac{1}{\sigma_\varphi^2} W;$$

and wherein the eighth set of instructions comprises:

instructions that direct the data processor to generate a scalar b in a form equivalent to:

$$b = \frac{\sigma_\gamma^2 \lambda_{GPS}^2}{\sigma_\gamma^2 + \lambda_{GPS}^2 \sigma_\varphi^2},$$

where $\lambda_{GPS}^2$ is the wavelength of the satellite signals, instructions that direct the data processor to generate a matrix $\tilde{H}$ in a form equivalent to $\tilde{H} = W^{1/2} H_j^\gamma$, instructions that direct the data processor to generate a Householder matrix $S_{HH}$ for matrix $\tilde{H}$, and instructions that direct the data processor to generate matrix $T_j$ in a form equivalent to:

$$T_j = \frac{1}{\sigma_\varphi} W^{1/2} S_{HH} \left[ \begin{array}{c|c} \sqrt{\left(1 - \frac{b}{\lambda_{GPS}^2}\right)} I_4 & O_{4\times(n-4)} \\ \hline O_{(n-4)\times 4} & I_{(n-4)\times(n-4)} \end{array} \right].$$

32. The method of claim 29 wherein weighting matrix $R_j$ is applied to a case where there is a first group of satellite signals having carrier signals in a first wavelength band and a second group of satellite signals having a carrier signals in a second wavelength band, the weighting frequency having a form equivalent to:

$$R_j = \begin{bmatrix} R_j^\gamma & 0 \\ 0 & R_j^\varphi \end{bmatrix},$$

where $R^\gamma$ and $R^\Phi$ are weighting matrices;

wherein $R^\gamma$ and $R^\Phi$ are related to a common weighting matrix W, the carrier wavelengths of the first group of signals as represented by matrix $\Lambda^{(1)}$, the carrier wavelengths of the second group of signals as represented by matrix $\Lambda^{(2)}$, the center wavelength of the first band as represented by $\lambda_1$, the center wavelength of the first band as represented by $\lambda_2$, and scaling parameters $\sigma_\gamma$ and $\sigma_\varphi$, as follows:

$$(R_j^\gamma)^{-1} = \left[ \begin{array}{c|c} \frac{1}{\sigma_\gamma^2} W & O_{n\times n} \\ \hline O_{n\times n} & \frac{1}{\sigma_\gamma^2} W \end{array} \right],$$

$$(R_j^\varphi)^{-1} = \left[ \begin{array}{c|c} \frac{1}{\sigma_\varphi^2} W^{(1)} & O_{n\times n} \\ \hline O_{n\times n} & \frac{1}{\sigma_\varphi^2} W^{(2)} \end{array} \right],$$

where $$W^{(1)} = \frac{1}{\lambda_1^2} \Lambda^{(1)} W \Lambda^{(1)}, \quad W^{(2)} = \frac{1}{\lambda_2^2} \Lambda^{(2)} W \Lambda^{(2)},$$

wherein step (h) of generating matrix $T_j$ comprises the steps of:

generating a scalar b in a form equivalent to:

$$b = \frac{\sigma_\gamma^2 \lambda_1^2 \lambda_2^2}{2\sigma_\varphi^2 \lambda_1^2 \lambda_2^2 + \sigma_\gamma^2 \lambda_1^2 + \sigma_\gamma^2 \lambda_2^2},$$

where $\lambda_1$ is the wavelength of a first group of satellite signals and $\lambda_2$ is the wavelength of a second group of satellite signals, generating a matrix $\tilde{H}$ in a form equivalent to $\tilde{H} = W^{1/2} H_j^\gamma$, generating a Householder matrix $S_{HH}$ for matrix $\tilde{H}$, and generating matrix $T_j$ in a form equivalent to:

$$T_j = \frac{1}{\sigma_\varphi} \left[ \begin{array}{c|c} A11 & O_{n\times n} \\ \hline A21 & A22 \end{array} \right],$$

where sub-matrixces A11, A21, and A22 are as follows:

$$A11 = (W^{(1)})^{\frac{1}{2}} S_{HH} \left[ \begin{array}{c|c} \sqrt{1-b/\lambda_1^2}\, I_4 & O_{4\times(n-4)} \\ \hline O_{(n-4)\times 4} & I_{(n-4)} \end{array} \right],$$

$$A21 = (W^{(2)})^{\frac{1}{2}} S_{HH} \left[ \begin{array}{c|c} -\frac{b}{\lambda_1 \lambda_2 \sqrt{1-b/\lambda_1^2}} I_4 & O_{4\times(n-4)} \\ \hline O_{(n-4)\times 4} & O_{(n-4)\times(n-4)} \end{array} \right], \text{ and}$$

$$A22 = (W^{(2)})^{\frac{1}{2}} S_{HH} \left[ \begin{array}{c|c} \sqrt{\frac{1-b/\lambda_1^2 - b/\lambda_2^2}{1-b/\lambda_1^2}}\, I_4 & O_{4\times(n-4)} \\ \hline O_{(n-4)\times 4} & I_{(n-4)} \end{array} \right].$$

33. A computer program product for directing a data processor to estimate a set of floating ambiguities associated with a set of phase measurements of a plurality n of satellite carrier signals made by a first navigation receiver (B) and a second navigation receiver (R) separated by a distance, wherein a baseline vector $(x^o, y^o, z^o)$ relates the position of the second receiver to the first receiver, each satellite carrier signal being transmitted by a satellite and having a wavelength, wherein each receiver has a time clock for referencing its measurements and wherein any difference between the time clocks may be represented by an offset, the process receiving, for a plurality of two or more time moments j, the following inputs:

a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, the computer program product comprising:

a computer-readable medium;

a first set of instructions embodied on the computer-readable medium which directs the data processor to generate, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$;

a second set of instructions embodied on the computer-readable medium which directs the data processor to generate, for each time moment j, a vector $\Delta\phi_j$ of a plurality of phase residuals of full phase measurements made by the first and second navigation receivers in the form of: $\Delta\phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites;

a third set of instructions embodied on the computer-readable medium which directs the data processor to generate an LU-factorization of a matrix M or a matrix inverse of matrix M, the matrix M being a function of at least $\Lambda^{-1}$ and $H_k^\gamma$, for index k of $H_k^\gamma$ covering at least two of the time moments j; and a fourth set of instructions embodied on the computer-readable medium which directs the data processor to generate a vector N of estimated floating ambiguities as a function of at least the set of range residuals $\Delta\gamma_k$, the set of phase residuals $\Delta\phi_k$, and the LU-factorization of matrix M or the matrix inverse of matrix M.

34. The computer program product of claim 33 wherein the third set of instructions directs the data processor to generate matrix M in a form equivalent to the summation $$\left[ \sum_{k=1}^{j} (G^T P_k G) \right],$$

where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_k$ has 2n rows, 2n columns, and a form which comprises a matrix equivalent to $P_k = R_k^{-1} - R_k^{-1} Q_k (Q_k^T R_k^{-1} Q_k + qS_k)^{-1} Q_k^T R_k^{-1}$, where the matrix $R_k$ is a weighting matrix, where the matrix $R_k^{-1}$ comprises an inverse of matrix $R_k$, where the matrix $Q_k$ has an upper sub-matrix and a lower sub-matrix, one of the sub-matrices of $Q_k$ comprising matrix $H_k^\gamma$ and the other of the sub-matrices of $Q_k$ comprising the matrix product $\Lambda^{-1} H_k^\gamma$, and wherein the matrix $Q_k^T$ comprises the transpose of matrix $Q_k$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

35. The computer program product of claim 34 wherein the fourth set of instructions directs the data processor to generate matrix N in a form equivalent to:

$$N = M^{-1} \times \left[ \sum_{k=1}^{j} (G^T P_k \mu_k + qg_k) \right],$$

where the matrix $M^{-1}$ comprises an inverse of matrix of matrix M, where the vector $\mu_k$ comprises the vector $[\Delta\gamma_k, \Delta\phi_k]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

36. The computer program product of claim 35 wherein the distance between the first and second navigation receivers is constrained to a distance $L_{RB}$, wherein the third set of instructions directs the data processor to generate matrix $S_k$ for the k-th time moment in a form equivalent to:

$$S_k = \left(1 - \frac{L_{RB}}{\|r_k\|}\right) \begin{pmatrix} I_3 & O_{3\times 1} \\ O_{1\times 3} & 0 \end{pmatrix} + \frac{L_{RB}}{\|r_k\|} r_k r_k^T$$

where $r_k$ is a vector comprising estimates of the three coordinates of the baseline vector at the k-th time moment, and a zero as fourth component, where $r_k^T$ is the vector transpose of $r_k$, where $I_3$ is the 3-by-3 identity matrix, where $O_{1\times 3}$ is a row vector of three zeros, and where $O_{3\times 1}$ is a column vector of three zeros; and wherein step (d) generates vector $g_k$ for the k-th time moment in a form equivalent to:

$$g_k = G^T R_k^{-1} Q_k (Q_k^T R_k^{-1} Q_k + qS_k)^{-1} h_k,$$

where:

$$h_k = \left(1 - \frac{L_{RB}}{\|r_k\|}\right) r_k.$$

37. An apparatus for estimating a set of floating ambiguities associated with a set of phase measurements of a plurality n of satellite carrier signals made by a first navigation receiver (B) and a second navigation receiver (R) separated by a distance, wherein a baseline vector $(x^\circ, y^\circ, z^\circ)$ relates the position of the second receiver to the first receiver, each satellite carrier signal being transmitted by a satellite and having a wavelength, wherein each receiver has a time clock for referencing its measurements and wherein any difference between the time clocks may be represented by an offset, said apparatus receiving, for a plurality of two or more time moments j, the following inputs:

a vector $\gamma_j^B$ representative of a plurality of pseudo-ranges measured by the first navigation receiver (B) and corresponding to the plurality of satellite carrier signals, a vector $\gamma_j^R$ representative of a plurality of pseudo-ranges measured by the second navigation receiver (R) and corresponding to the plurality of satellite carrier signals, a vector $D_j^B$ representative of a plurality of estimated distances between the satellites and the first navigation receiver (B), a vector $D_j^R$ representative of a plurality of estimated distances between the satellites and the second navigation receiver (R), a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, said apparatus comprising:

(a) means for generating, for each time moment j, a vector $\Delta\gamma_j$ of a plurality of range residuals of pseudo-range measurements made by the first and second navigation receivers in the form of: $\Delta\gamma_j = (\gamma_j^R - \gamma_j^B) - (D_j^R - D_j^B)$;

(b) means for generating, for each time moment j, a vector $\Delta\phi_j$ of a plurality of phase residuals of full phase measurements made by the first and second navigation receivers in the form of: $\Delta\phi_j = (\phi_j^R - \phi_j^B) - \Lambda^{-1} \cdot (D_j^R - D_j^B)$, where $\Lambda^{-1}$ is a diagonal matrix comprising the inverse wavelengths of the satellites;

(c) means for generating, for time moment j=1, an LU-factorization of a matrix $M_1$ or a matrix inverse of matrix $M_1$, the matrix $M_1$ being a function of at least $\Lambda^{-1}$ and $H_1^\gamma$;

(d) means for generating, for time moment j=1, a vector $N_1$ as a function of at least $\Delta\gamma_1$, $\Delta\phi_1$, and the LU-factorization of matrix $M_1$ or the matrix inverse of matrix $M_1$;

(e) means for generating, for an additional time moment j≠1, an LU-factorization of a matrix $M_j$ or a matrix inverse of matrix $M_j$, the matrix $M_j$ being a function of at least $\Lambda^{-1}$ and $H_j^\gamma$; and (f) means for generating, for an additional time moment j≠1, a vector $N_j$ as a function of at least $\Delta\gamma_j$, $\Delta\phi_j$, and the LU-factorization or matrix $M_j$ or the matrix inverse of matrix $M_j$, the vector $N_j$ having estimates of the floating ambiguities.

38. The apparatus of claim 37 wherein means (c) comprises means for generating an LU-factorization for a matrix comprising a form equivalent to $(G^T P_1 G)$, where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_1$ has 2n rows, 2n columns, and a form which comprises a matrix equivalent to $(R_1^{-1} - R_1^{-1} Q_1 (Q_1^T R_1^{-1} Q_1 + qS_1)^{-1} Q_1^T R_1^{-1})$ where the matrix $R_1$ is a weighting matrix, where the matrix $R_1^{-1}$ comprises an inverse of matrix $R_1$, where the matrix $Q_1$ has an upper sub-matrix and a lower sub-matrix, one of the sub-matrices of $Q_1$ comprising matrix $H_1^\gamma$ and the other of the sub-matrices of $Q_1$ comprising the matrix product $\Lambda^{-1} H_1^\gamma$, and wherein the matrix $Q_1^T$ comprises the transpose of matrix $Q_1$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

39. The apparatus of claim 38 wherein means (d) comprises means for generating vector $N_1$ to comprise a vector having a form equivalent to $M_1^{-1}(G^T P_1 \mu_1 + qg_1)$, where the matrix $M_1^{-1}$ comprises an inverse of matrix $M_1$, and where the vector $\mu_1$ comprises the vector $[\Delta\gamma_1, \Delta\phi_1]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

40. The apparatus of claim 37 wherein means (e) comprises means for generating an LU-factorization for a matrix comprising a form equivalent to $$M_j = M_{j-1} + G^T P_j G, \text{ where:}$$

$M_{j-1}$ comprises the matrix $M_1$ of generated by means (c) when j=2 and comprises the matrix $M_j$ generated by means (e) for the j−1 time moment when j>2, the matrix G has 2n rows, n columns, an upper sub-matrix, and a lower sub-matrix, one of the sub-matrices comprising an n×n zero matrix and the other sub-matrix comprising an n×n identity matrix, the matrix $G^T$ comprises the transpose matrix of matrix G, and the matrix $P_j$ has 2n rows, 2n columns, and a form which comprise a matrix equivalent to $(R_j^{-1} - R_j^{-1} Q_j (Q_j^T R_j^{-1} Q_j + qS_j)^{-1} Q_j^T R_j^{-1})$ where the matrix $R_j$ is a weighting matrix, where the matrix $R_j^{-1}$ comprises an inverse of matrix $R_j$, where the matrix $Q_j$ has an upper sub-matrix and a lower sub-matrix, one of the sub-matrices of $Q_j$ comprising matrix $H_j^\gamma$ and the other of the sub-matrices of $Q_j$ comprising the matrix product $\Lambda^{-1} H_j^\gamma$, and wherein the matrix $Q_j^T$ comprises the transpose of matrix $Q_j$, and where the quantity $qS_j$ is a zero matrix when the distance between the first and second navigation receivers is unconstrained and where q may be a non-zero weighting parameter and $S_j$ may be a non-zero matrix when the distance between the first and second navigation receivers is constrained.

41. The apparatus of claim 40 wherein means (f) comprises means for generating vector $N_j$ to comprise a vector having a form equivalent to $N_{j-1} + M_j^{-1}[G^T P_j(\mu_j - GN_{j-1}) + qg_j]$, where the matrix $M_j^{-1}$ comprises an inverse of matrix of matrix $M_j$, where the vector $\mu_j$ comprises the vector $[\Delta\gamma_j, \Delta\phi_j]^T$, and where the vector $N_{j-1}$ comprises the vector $N_1$ generated by means (d) when j=2 and comprises the vector $N_{j-1}$ generated by means (f) for the j−1 time moment when j>2, and where the quantity $qg_j$ is a zero vector when the distance between the first and second navigation receivers is unconstrained and where q may be non-zero and $g_j$ may be a non-zero vector when the distance between the first and second navigation receivers is constrained.

42. The apparatus of claim 39 wherein the distance between the first and second navigation receivers is constrained to a distance $L_{RB}$, wherein means (c) comprises means for generating matrix $S_1$ in a form equivalent to:

$$S_1 = \left(1 - \frac{L_{RB}}{\|r_1\|}\right)\begin{pmatrix} I_3 & O_{3\times 1} \\ O_{1\times 3} & 0 \end{pmatrix} + \frac{L_{RB}}{\|r_1\|} r_1 r_1^T$$

where $r_1$ is a vector comprising estimates of the three coordinates of the baseline vector for the time moment j=1 and a zero as fourth component, where $r_1^T$ is the vector transpose of $r_1$, where $I_3$ is the 3-by-3 identity matrix, where $O_{1\times 3}$ is a row vector of three zeros, and where $O_{3\times 1}$ is a column vector of three zeros; and wherein means (d) comprises means for generating vector $g_1$ for the time moment j=1 in a form equivalent to:

$$g_1 = G^T R_1^{-1} Q_1 (Q_1^T R_1^{-1} Q_1 + qS_1)^{-1} h_1,$$

where:

$$h_1 = \left(1 - \frac{L_{RB}}{\|r_1\|}\right) r_1.$$

43. The apparatus of claim 41 wherein the distance between the first and second navigation receivers is constrained to a distance $L_{RB}$, wherein means (e) comprises means for generating matrix $S_j$ in a form equivalent to:

$$S_j = \left(1 - \frac{L_{RB}}{\|r_j\|}\right)\begin{pmatrix} I_3 & O_{3\times 1} \\ O_{1\times 3} & 0 \end{pmatrix} + \frac{L_{RB}}{\|r_j\|} r_j r_j^T$$

where $r_j$ is a vector comprising estimates of the three coordinates of the baseline vector for the j-th time moment and a zero as fourth vector component, where $r_j^T$ is the vector transpose of $r_j$, where $I_3$ is the 3-by-3 identity matrix, where $O_{1\times 3}$ is a row vector of three zeros, and where $O_{3\times 1}$ is a column vector of three zeros; and wherein means (f) comprises means for generating vector $g_j$ for the j-th time moment in a form equivalent to:

$$g_j = G^T R_j^{-1} Q_j (Q_j^T R_j^{-1} Q_j + qS_j)^{-1} h_j,$$

where:

$$h_j = \left(1 - \frac{L_{RB}}{\|r_j\|}\right) r_j.$$

44. The apparatus of claim 40 wherein means (e) for generating the LU-factorization of $M_j$ comprises:

(g) means for generating an LU-factorization of matrix $M_{j-1}$ in a form equivalent to $L_{j-1} L_{j-1}^T$ wherein $L_{j-1}$ is a low-triangular matrix and $L_{j-1}^T$ is the transpose of $L_{j-1}$;

(h) means for generating a factorization of $G^T P_j G$ in a form equivalent to $T_j T_j^T = G^T P_j G$, where $T_j^T$ is the transpose of $T_j$; and (i) means for generating an LU-factorization of matrix $M_j$ in a form equivalent to $L_j L_j^T$ from a plurality n of rank-one modifications of matrix $L_{j-1}$, each rank-one modification being based on a respective column of matrix $T_j$, where n is the number of rows in matrix $M_j$.

45. The apparatus of claim 44 wherein means (h) generates matrix $T_j$ from a Cholesky factorization of $G^T P_j G$.

46. The apparatus of claim 44 wherein weighting matrix $R_j$ has a form equivalent to:

$$R_j = \begin{bmatrix} R_j^\gamma & 0 \\ 0 & R_j^\varphi \end{bmatrix},$$

where $R^\gamma$ and $R^\Phi$ are weighting matrices;

wherein $R^\gamma$ and $R^\Phi$ are related to a common weighting matrix W and scaling parameters $\sigma_\gamma$ and $\sigma_\phi$ as follows $$(R^\gamma)^{-1} = \frac{1}{\sigma_\gamma^2} W, \text{ and } (R^\varphi)^{-1} = \frac{1}{\sigma_\varphi^2} W,$$

wherein means (h) of generating matrix $T_j$ comprises:
means for generating a scalar b in a form equivalent to:

$$b = \frac{\sigma_\gamma^2 \lambda_{GPS}^2}{\sigma_\gamma^2 + \lambda_{GPS}^2 \sigma_\varphi^2},$$

where $\lambda_{GPS}^2$ is the wavelength of the satellite signals,
means for generating a matrix $\tilde{H}$ in a form equivalent to $\tilde{H} = W^{1/2} H_j^\gamma$,
means for generating a Householder matrix $S_{HH}$ for matrix $\tilde{H}$, and
means for generating matrix $T_j$ in a form equivalent to:

$$T_j = \frac{1}{\sigma_\varphi} W^{1/2} S_{HH} \left[ \begin{array}{c|c} \sqrt{\left(1 - \frac{b}{\lambda_{GPS}^2}\right)} I_4 & O_{4\times(n-4)} \\ \hline O_{(n-4)\times 4} & I_{(n-4)\times(n-4)} \end{array} \right].$$

47. The method of claim 44 wherein weighting matrix $R_j$ is applied to a case where there is a first group of satellite signals having carrier signals in a first wavelength band and a second group of satellite signals having a carrier signals in a second wavelength band, the weighting frequency having a form equivalent to:

$$R_j = \begin{bmatrix} R_j^\gamma & 0 \\ 0 & R_j^\varphi \end{bmatrix},$$

where $R^\gamma$ and $R^\varphi$ are weighting matrices;
wherein $R^\gamma$ and $R^\varphi$ are related to a common weighting matrix W, the carrier wavelengths of the first group of signals as represented by matrix $\Lambda^{(1)}$, the carrier wavelengths of the second group of signals as represented by matrix $\Lambda^{(2)}$, the center wavelength of the first band as represented by $\lambda_1$, the center wavelength of the first band as represented by $\lambda_2$, and scaling parameters $\sigma_\gamma$ and $\sigma_\varphi$ as follows:

$$(R_j^\gamma)^{-1} = \begin{bmatrix} \frac{1}{\sigma_\gamma^2} W & O_{n\times n} \\ \hline O_{n\times n} & \frac{1}{\sigma_\gamma^2} W \end{bmatrix},$$

$$(R_j^\varphi)^{-1} = \begin{bmatrix} \frac{1}{\sigma_\varphi^2} W^{(1)} & O_{n\times n} \\ \hline O_{n\times n} & \frac{1}{\sigma_\varphi^2} W^{(2)} \end{bmatrix},$$

where $$W^{(1)} = \frac{1}{\lambda_1^2} \Lambda^{(1)} W \Lambda^{(1)}, \quad W^{(2)} = \frac{1}{\lambda_2^2} \Lambda^{(2)} W \Lambda^{(2)},$$

wherein step (h) of generating matrix $T_j$ comprises the steps of:
generating a scalar b in a form equivalent to:

$$b = \frac{\sigma_\gamma^2 \lambda_1^2 \lambda_2^2}{2\sigma_\varphi^2 \lambda_1^2 \lambda_2^2 + \sigma_\gamma^2 \lambda_1^2 + \sigma_\gamma^2 \lambda_2^2},$$

where $\lambda_1$ is the wavelength of a first group of satellite signals and $\lambda_2$ is the wavelength of a second group of satellite signals,
generating a matrix $\tilde{H}$ in a form equivalent to $\tilde{H} = W^{1/2} H_j^\gamma$,
generating a Householder matrix $S_{HH}$ for matrix $\tilde{H}$, and
generating matrix $T_j$ in a form equivalent to:

$$T_j = \frac{1}{\sigma_\varphi} \left[ \begin{array}{c|c} A11 & O_{n\times n} \\ \hline A21 & A22 \end{array} \right],$$

where sub-matrixces A11, A21, and A22 are as follows:

$$A11 = (W^{(1)})^{\frac{1}{2}} S_{HH} \left[ \begin{array}{c|c} \sqrt{1 - b/\lambda_1^2}\, I_4 & O_{4\times(n-4)} \\ \hline O_{(n-4)\times 4} & I_{(n-4)} \end{array} \right],$$

$$A21 = (W^{(2)})^{\frac{1}{2}} S_{HH} \left[ \begin{array}{c|c} -\frac{b}{\lambda_1 \lambda_2 \sqrt{1 - b/\lambda_1^2}} I_4 & O_{4\times(n-4)} \\ \hline O_{(n-4)\times 4} & O_{(n-4)\times(n-4)} \end{array} \right], \text{ and}$$

$$A22 = (W^{(2)})^{\frac{1}{2}} S_{HH} \left[ \begin{array}{c|c} \sqrt{\frac{1 - b/\lambda_1^2 - b/\lambda_2^2}{1 - b/\lambda_1^2}}\, I_4 & O_{4\times(n-4)} \\ \hline O_{(n-4)\times 4} & I_{(n-4)} \end{array} \right].$$

48. An apparatus for estimating a set of floating ambiguities associated with a set of phase measurements of a plurality n of satellite carrier signals made by a first navigation receiver (B) and a second navigation receiver (R) separated by a distance, wherein a baseline vector $(x^o, y^o, z^o)$ relates the position of the second receiver to the first receiver, each satellite carrier signal being transmitted by a satellite and having a wavelength, wherein each receiver has a time clock for referencing its measurements and wherein any difference between the time clocks may be represented by an offset, said apparatus receiving, for a plurality of two or more time moments j, the following inputs:
a vector $\gamma_j^B$ representative of a plurality of pseudo-ranges measured by the first navigation receiver (B) and corresponding to the plurality of satellite carrier signals,
a vector $\gamma_j^R$ representative of a plurality of pseudo-ranges measured by the second navigation receiver (R) and corresponding to the plurality of satellite carrier signals,
a vector $D_j^B$ representative of a plurality of estimated distances between the satellites and the first navigation receiver (B),
a vector $D_j^R$ representative of a plurality of estimated distances between the satellites and the second navigation receiver (R),
a vector $\phi_j^B$ representative of a plurality of full phase measurements of the satellite carrier signals measured by the first navigation receiver (B), a vector $\phi_j^R$ representative of a plurality of full phase measurements of the satellite carrier signals measured by the second navigation receiver (R), a geometric Jacobian matrix $H_j^\gamma$ whose matrix elements are representative of the changes in the distances between the satellites and one of the receivers that would be caused by changes in that receiver's position and time clock offset, said apparatus comprising:

(a) means for generating, for each time moment j, a vector $\Delta\gamma_j$ of a plurality of range residuals of pseudo-range measurements made by the first and second navigation receivers in the form of: $\Delta\gamma_j=(\gamma_j^R-\gamma_j^B)-(D_j^R-D_j^B)$, said means generating a set of range residuals $\Delta\gamma_k$, k=1, ..., j;

(b) means for generating, for each time moment j, a vector $\Delta\phi_j$ of a plurality of phase residuals of full phase measurements made by the first and second navigation receivers in the form of: $\Delta\phi_j=(\phi_j^R-\phi_j^B)-\Lambda^{-1}\cdot(D_j^R-D_j^B)$, where $\Lambda^{-1}$ is a diagonal matrix comprising the inverse wavelengths of the satellites, said means generating a set of phase residuals $\Delta\phi_k$, k=1, ..., j;

(c) means for generating an LU-factorization of a matrix M or a matrix inverse of matrix M, the matrix M being a function of at least $\Lambda^{-1}$ and $H_k^\gamma$, for index k of $H_k^\gamma$ covering at least two of the time moments j;

(d) means for generating a vector N of estimated floating ambiguities as a function of at least the set of range residuals $\Delta\gamma_k$, the set of phase residuals $\Delta\phi_k$, and the LU-factorization of matrix M or the matrix inverse of matrix M.

49. The apparatus of claim 48 wherein means (c) comprises means for generating matrix M in a form equivalent to the summation $$\left[\sum_{k=1}^{j}(G^T P_k G)\right],$$

where:

the matrix G has 2n rows, n columns, an upper sub-matrix, and a lower sub-matrix, one of the sub-matrices comprises an n×n zero matrix and the other sub-matrix comprising an n×n identity matrix, the matrix $G^T$ comprises the transpose matrix of matrix G, and the matrix $P_k$ has 2n rows, 2n columns, and a form which comprises a matrix equivalent to $P_k=R_k^{-1}-R_k^{-1}Q_k(Q_k^T R_k^{-1}Q_k+qS_k)^{-1}Q_k^T R_k^{-1}$, where the matrix $R_k$ is a weighting matrix, where the matrix $R_k^{-1}$ comprises an inverse of matrix $R_k$, where the matrix $Q_k$ has an upper sub-matrix and a lower sub-matrix, one of the sub-matrices of $Q_k$ comprising matrix $H_k^\gamma$ and the other of the sub-matrices of $Q_k$ comprising the matrix product $\Lambda^{-1}H_k^\gamma$, and wherein the matrix $Q_k^T$ comprises the transpose of matrix $Q_k$, and where the quantity $qS_k$ is a zero matrix when the distance between the first and second navigation receivers is unconstrained and where q may be a non-zero weighting parameter and $S_k$ may be a non-zero matrix when the distance between the first and second navigation receivers is constrained.

50. The apparatus of claim 49 wherein means (d) comprises means for generating matrix N in a form equivalent to:

$$N = M^{-1} \times \left[\sum_{k=1}^{j}(G^T P_k \mu_k + q g_k)\right],$$

where the matrix $M^{-1}$ comprises an inverse of matrix of matrix M, where the vector $\mu_k$ comprises the vector $[\Delta\gamma_k, \Delta\phi_k]^T$, and where the quantity $qg_k$ is a zero vector when the distance between the first and second navigation receivers is unconstrained and where q may be non-zero and $g_k$ may be a non-zero vector when the distance between the first and second navigation receivers is constrained.

51. The apparatus of claim 50 wherein the distance between the first and second navigation receivers is constrained to a distance $L_{RB}$, wherein means (c) comprises means for generating matrix $S_k$ for the k-th time moment in a form equivalent to:

$$S_k = \left(1 - \frac{L_{RB}}{\|r_k\|}\right)\begin{pmatrix} I_3 & O_{3\times 1} \\ O_{1\times 3} & 0 \end{pmatrix} + \frac{L_{RB}}{\|r_k\|}r_k r_k^T$$

where $r_k$ is a vector comprising estimates of the three coordinates of the baseline vector at the k-th time moment, and a zero as fourth component, where $r_k^T$ is the vector transpose of $r_k$, where $I_3$ is the 3-by-3 identity matrix, where $O_{1\times 3}$ is a row vector of three zeros, and where $O_{3\times 1}$ is a column vector of three zeros; and wherein means (d) generates vector $g_k$ for the k-th time moment in a form equivalent to:

$$g_k = G^T R_k^{-1} Q_k (Q_k^T R_k^{-1} Q_k + qS_k)^{-1} h_k,$$

where:

$$h_k = \left(1 - \frac{L_{RB}}{\|r_k\|}\right) r_k.$$

* * * * *